United States Patent [19]

Brearey et al.

[11] Patent Number: 4,538,228

[45] Date of Patent: Aug. 27, 1985

[54] HYDRAULIC PRESSURE ACTUATED BRAKE SYSTEM FOR RAIL VEHICLES

[75] Inventors: Nicholas J. Brearey; Rolf Baumgarth, both of Gaithersburg, Md.

[73] Assignee: Knorr-Bremse GmbH, Munich, Fed. Rep. of Germany

[21] Appl. No.: 427,385

[22] Filed: Sep. 29, 1982

[51] Int. Cl.³ .................. B60T 13/68; G06F 15/20
[52] U.S. Cl. ..................................... 364/426; 303/3; 303/15; 303/20
[58] Field of Search ................... 364/424, 426; 246/182 R, 182 A, 182 B, 182 C, 187 R, 187 A, 187 B, 187 C, 167 R; 303/3, 4, 8, 15, 16, 20, 92; 105/61

[56] References Cited

U.S. PATENT DOCUMENTS

| | | | |
|---|---|---|---|
| 3,626,177 | 12/1971 | Franke | 246/182 B |
| 3,920,285 | 11/1975 | Maskery | 303/3 |
| 3,934,125 | 1/1976 | Macano | 364/426 |
| 4,043,608 | 8/1977 | Bourg et al. | 364/426 |
| 4,093,162 | 6/1978 | Takaoka et al. | 364/426 |
| 4,190,220 | 2/1980 | Hahn et al. | 364/426 |
| 4,270,716 | 6/1981 | Anderson | 364/426 |
| 4,321,677 | 3/1982 | Takahashi et al. | 364/426 |
| 4,344,138 | 8/1982 | Frasier | 364/426 |
| 4,402,047 | 8/1983 | Newton et al. | 364/426 |
| 4,459,668 | 7/1984 | Inoue et al. | 364/426 |

Primary Examiner—Gary Chin
Attorney, Agent, or Firm—Pollock, Vande Sande & Priddy

[57] ABSTRACT

In a brake system the actuator pressure is controlled using a closed loop feedback system where, a system pressure, indicated by a pressure transducer is compared with a predetermined reference value. During the individual control routines, pressures corresponding operation times of inlet and outlet valves are stored in a memory. In the event of a failure of the pressure transducer, a switch is made to an open loop control mode where, starting from a previously established reference pressure, the system pressure can be read from the memory and controlled by appropriate operation of the inlet or outlet valves, to achieve the desired level.

31 Claims, 22 Drawing Figures

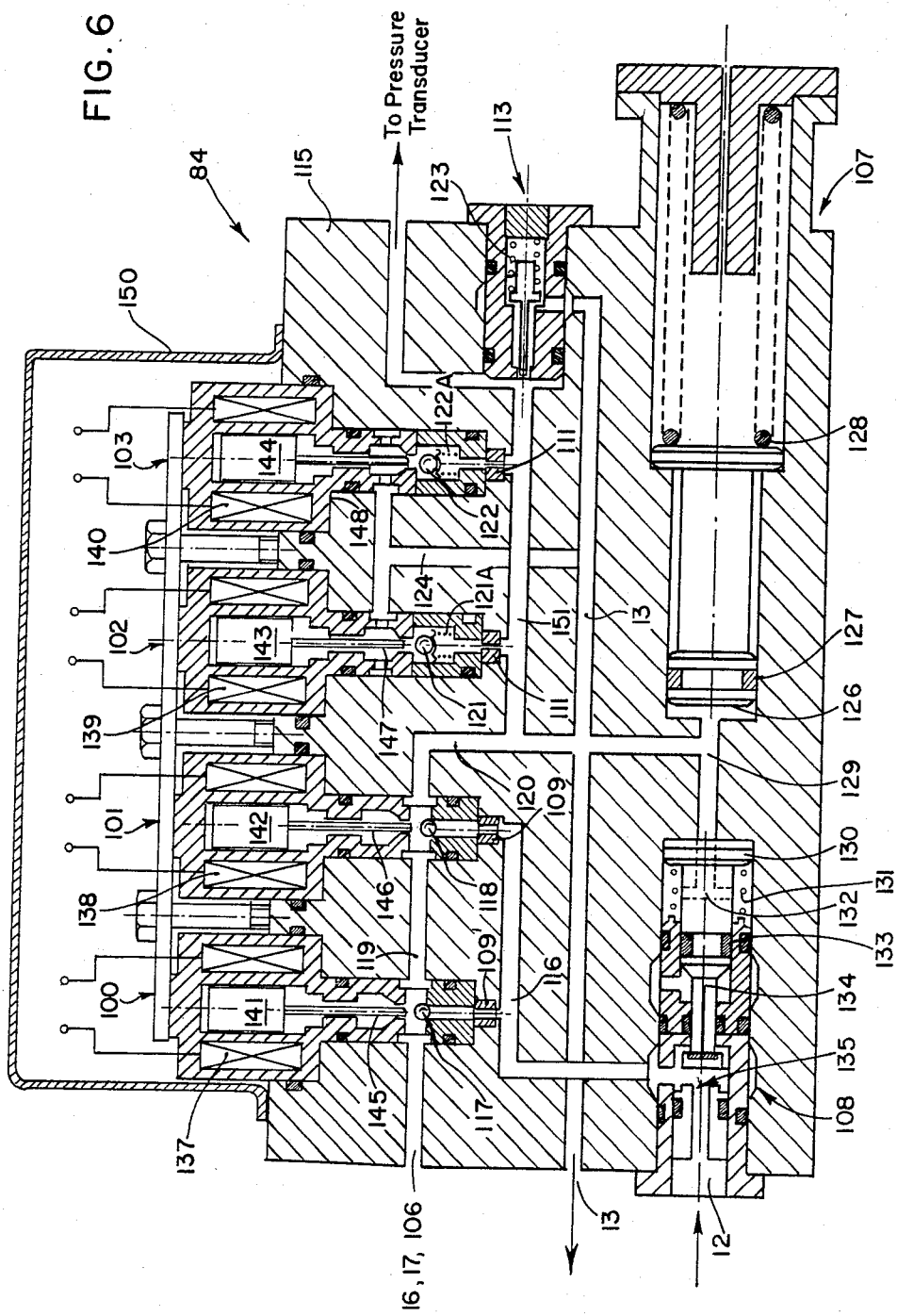

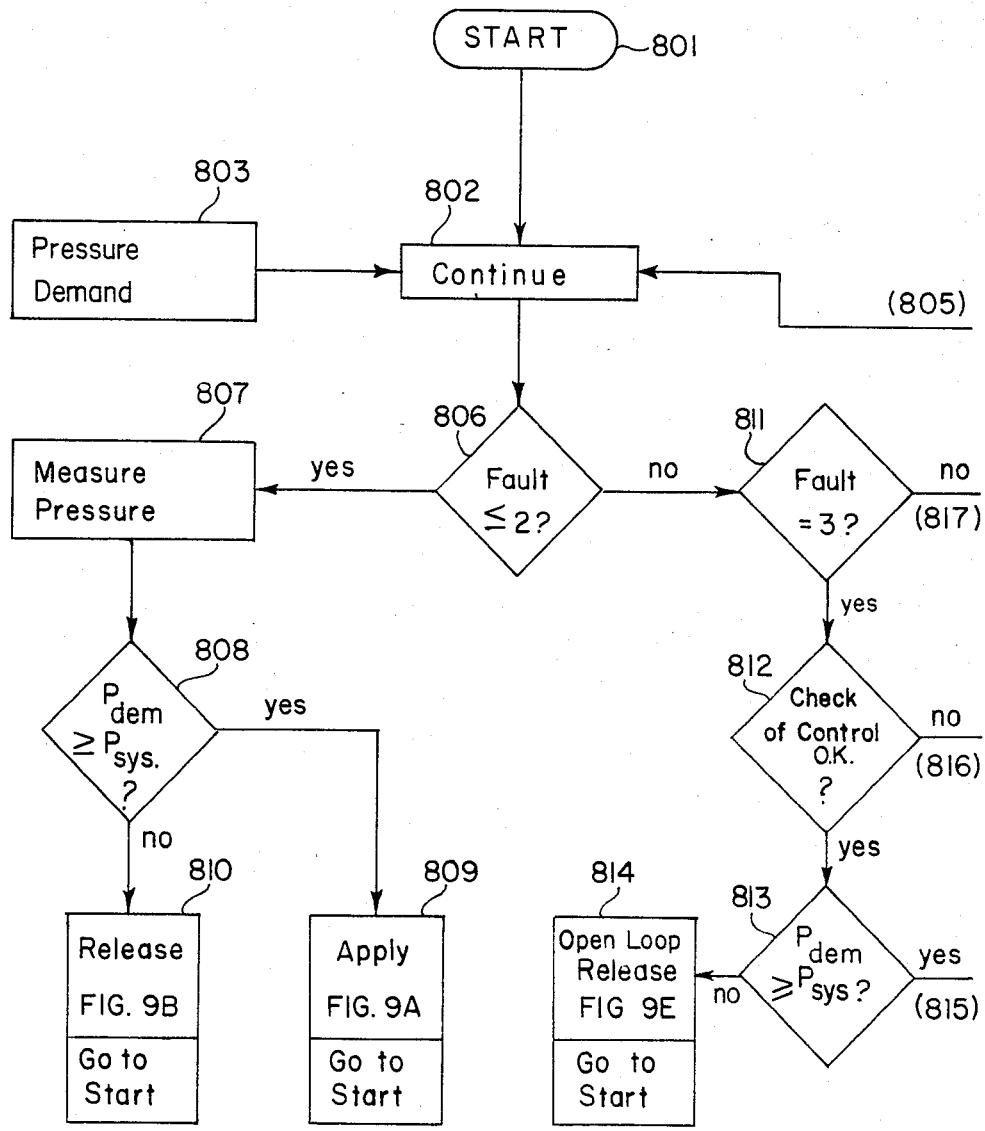
FIG. 8/1

FIG. 8/2
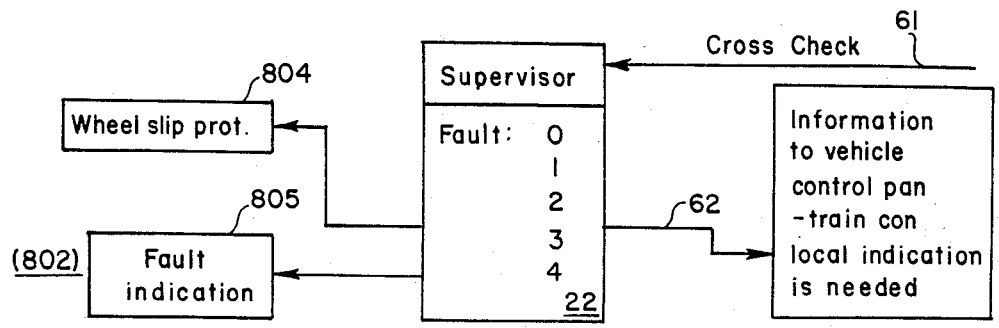
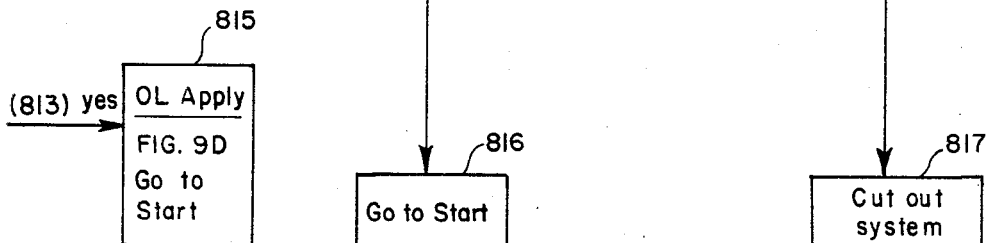
| Fault | Operation | Feedback flt. | contr. fault | local ind. |
|---|---|---|---|---|
| 0 | Normal operation | | X | X |
| 1 | Normal operation WSP fault | | X | X |
| 2 | Normal operation, if other fault develops go to fault 4 | | X | X |
| 3 | Reg. Cutout, o-loop control | X | X | X |
| 4 | System isolated. | | | |

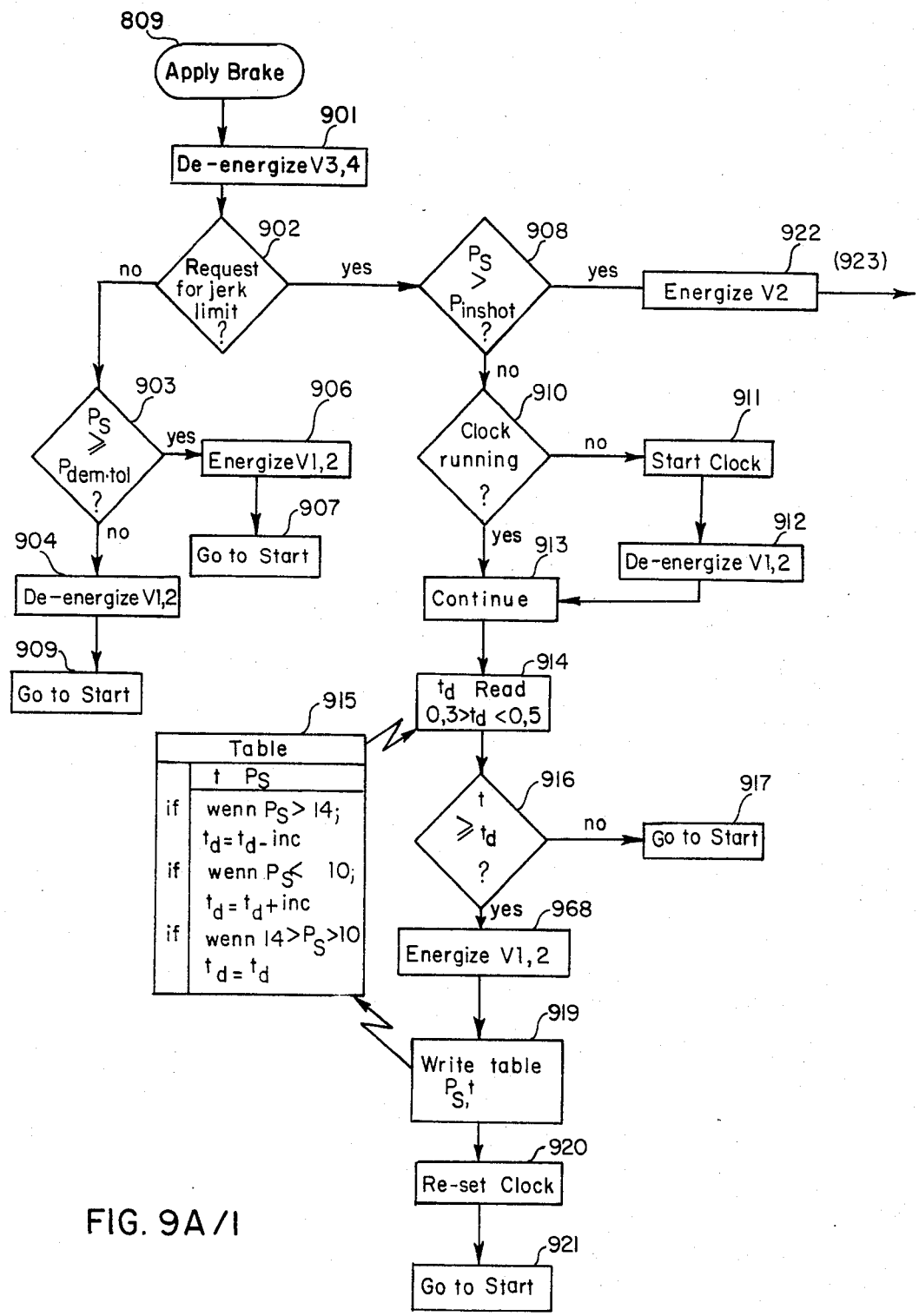
FIG. 9A/1

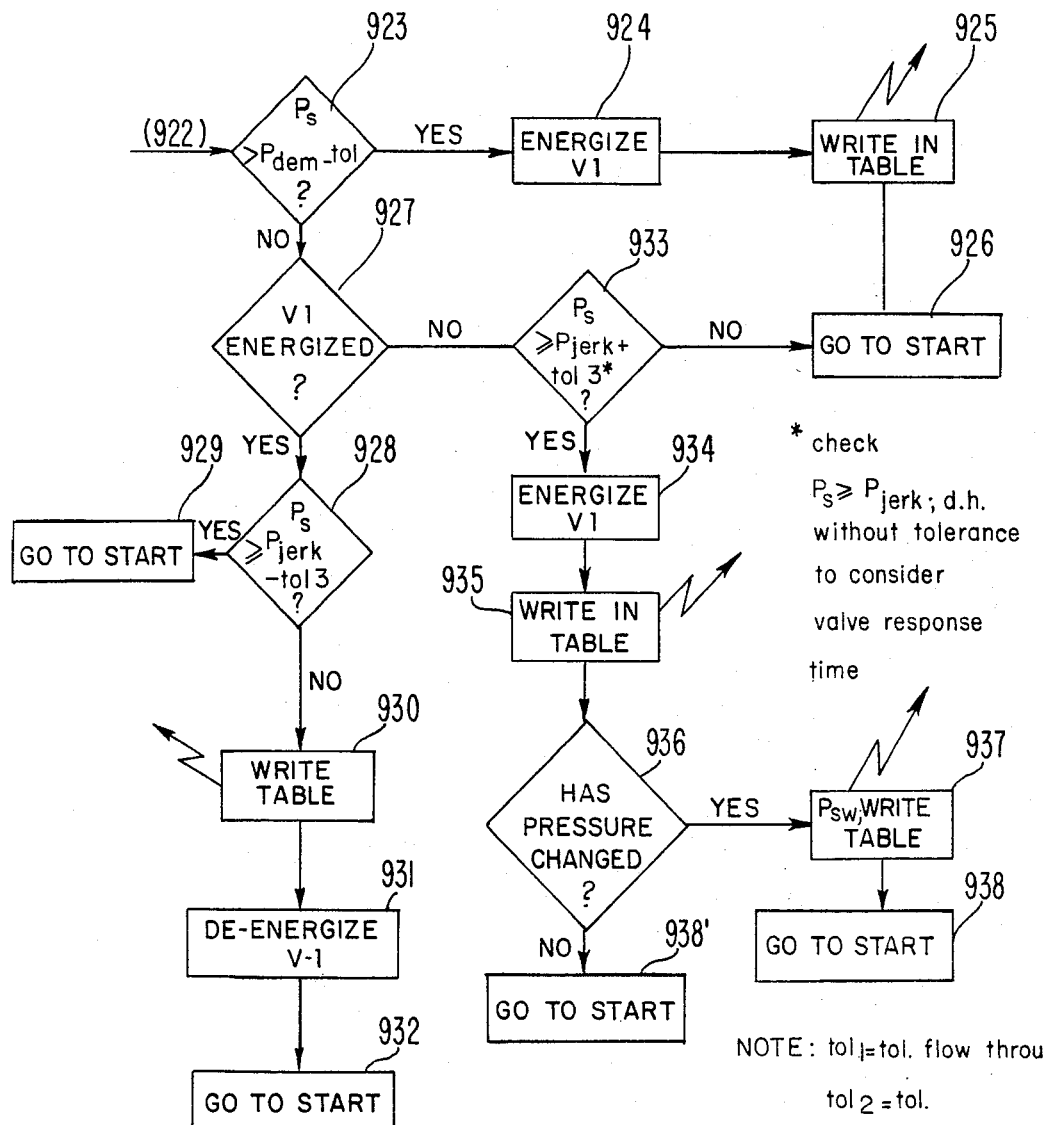
FIG. 9A/2

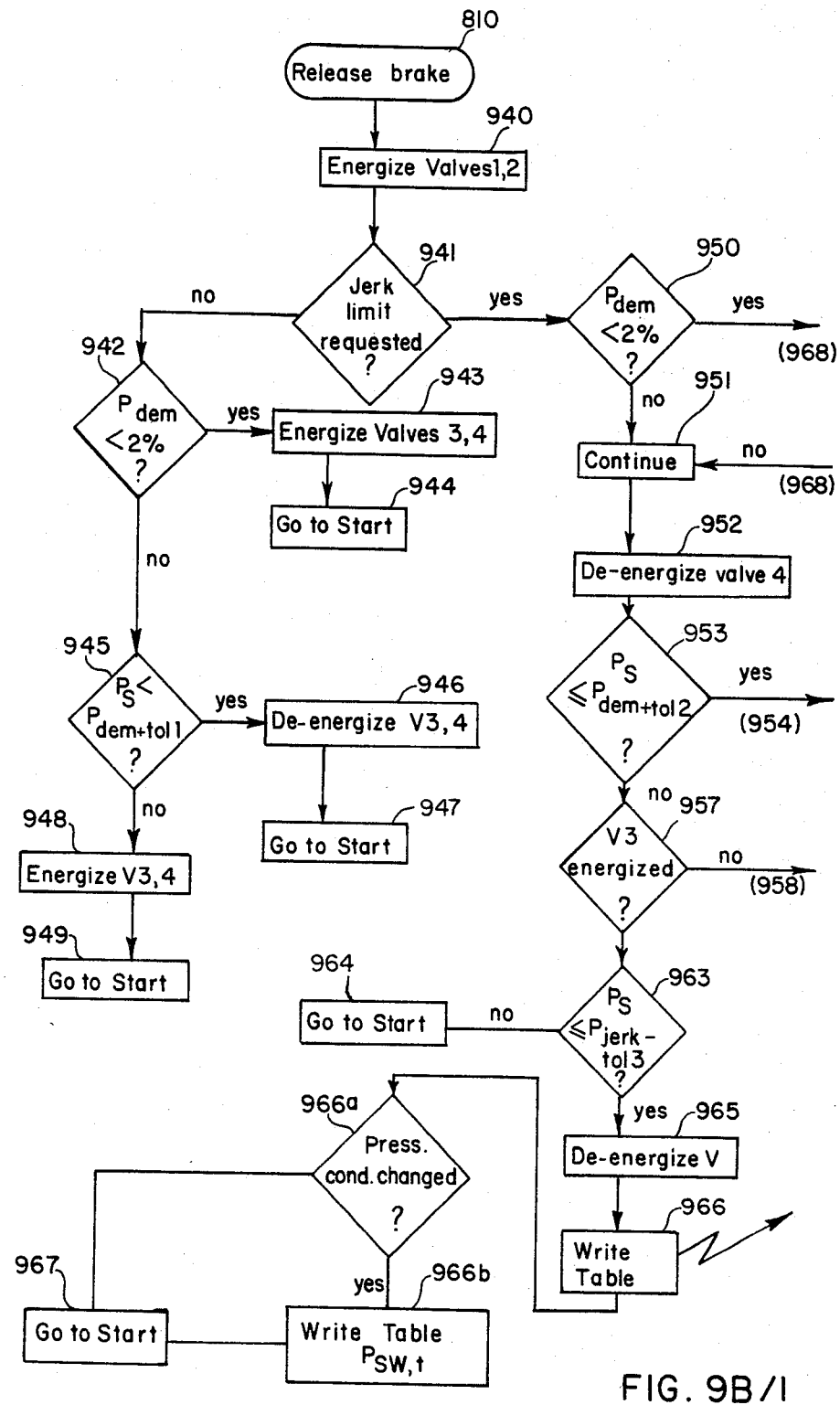
FIG. 9B/1

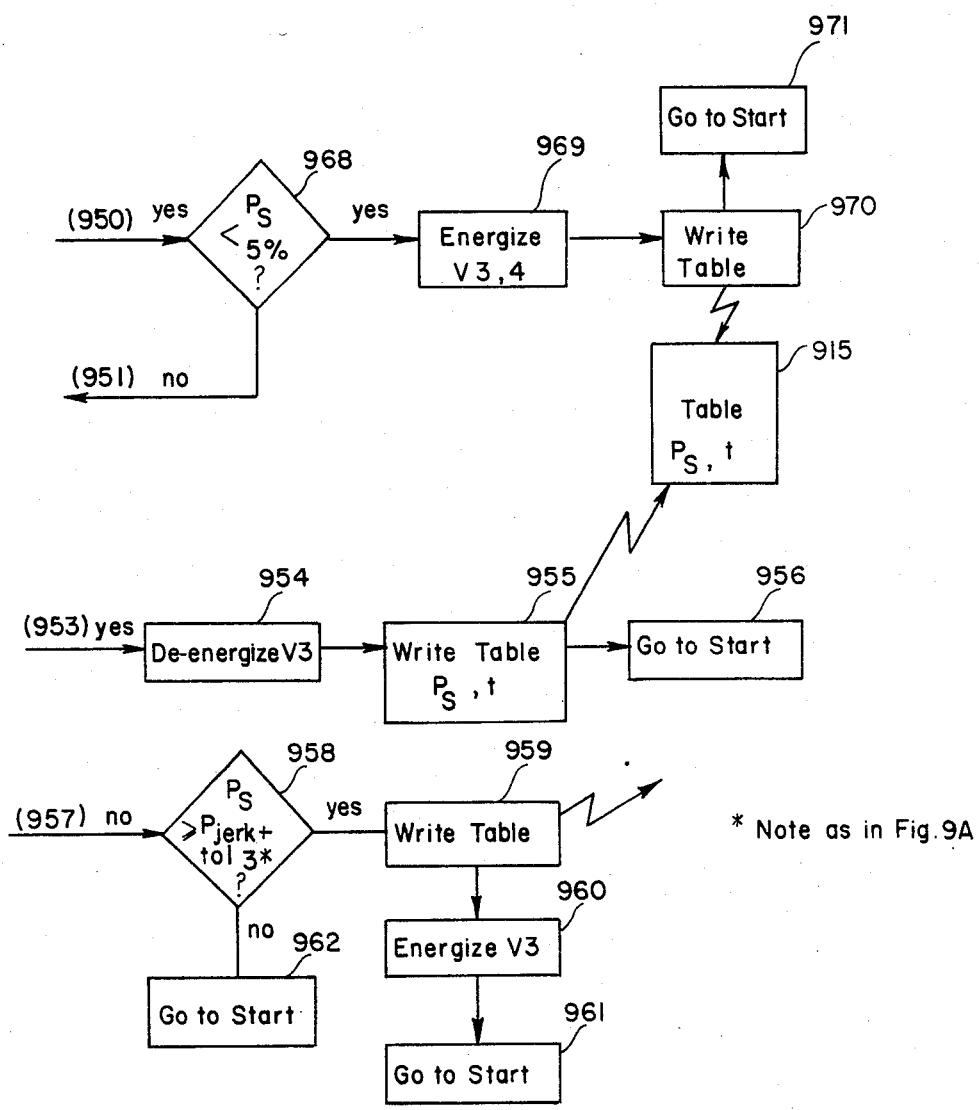
FIG. 9B/2

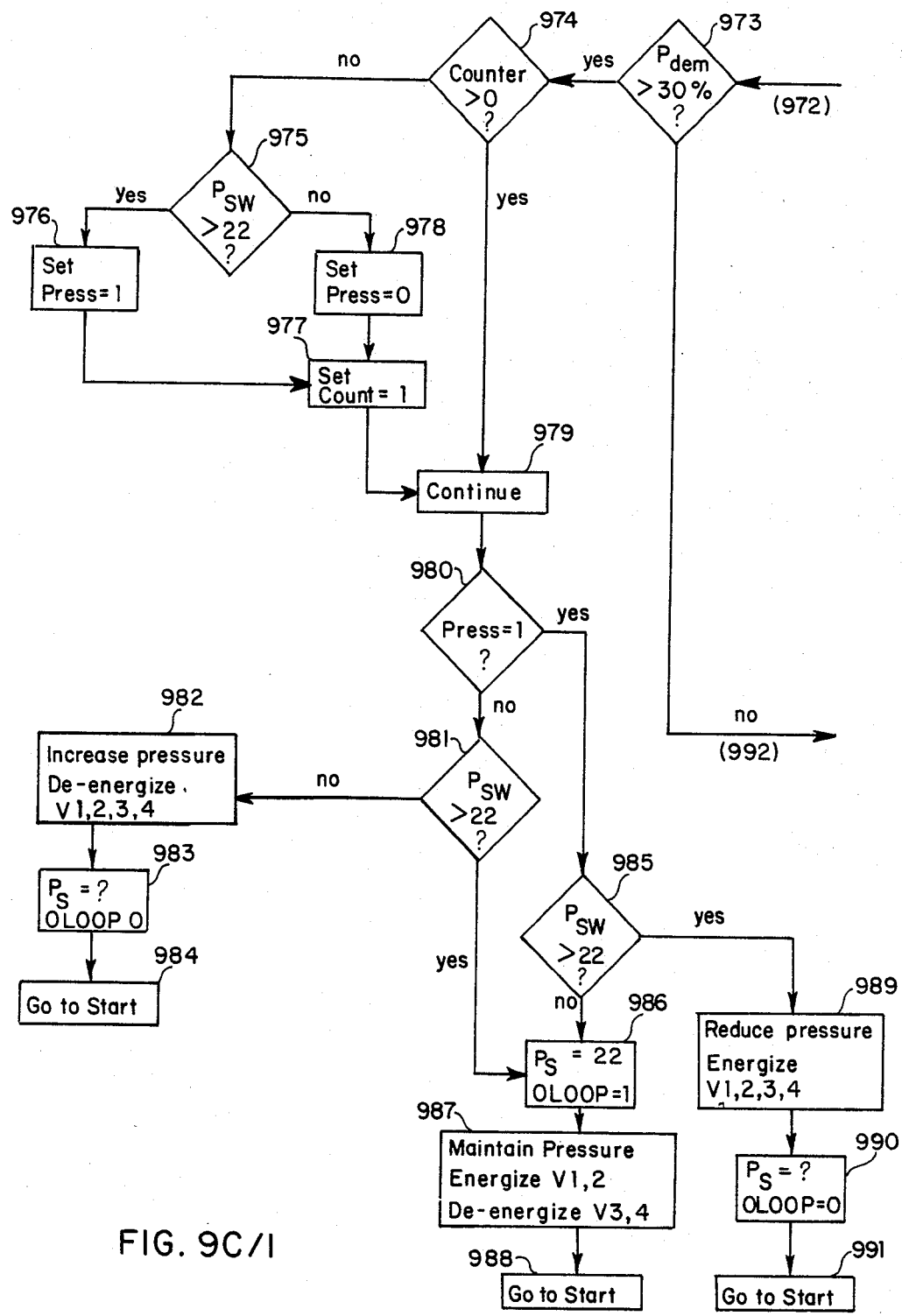
FIG. 9C/1

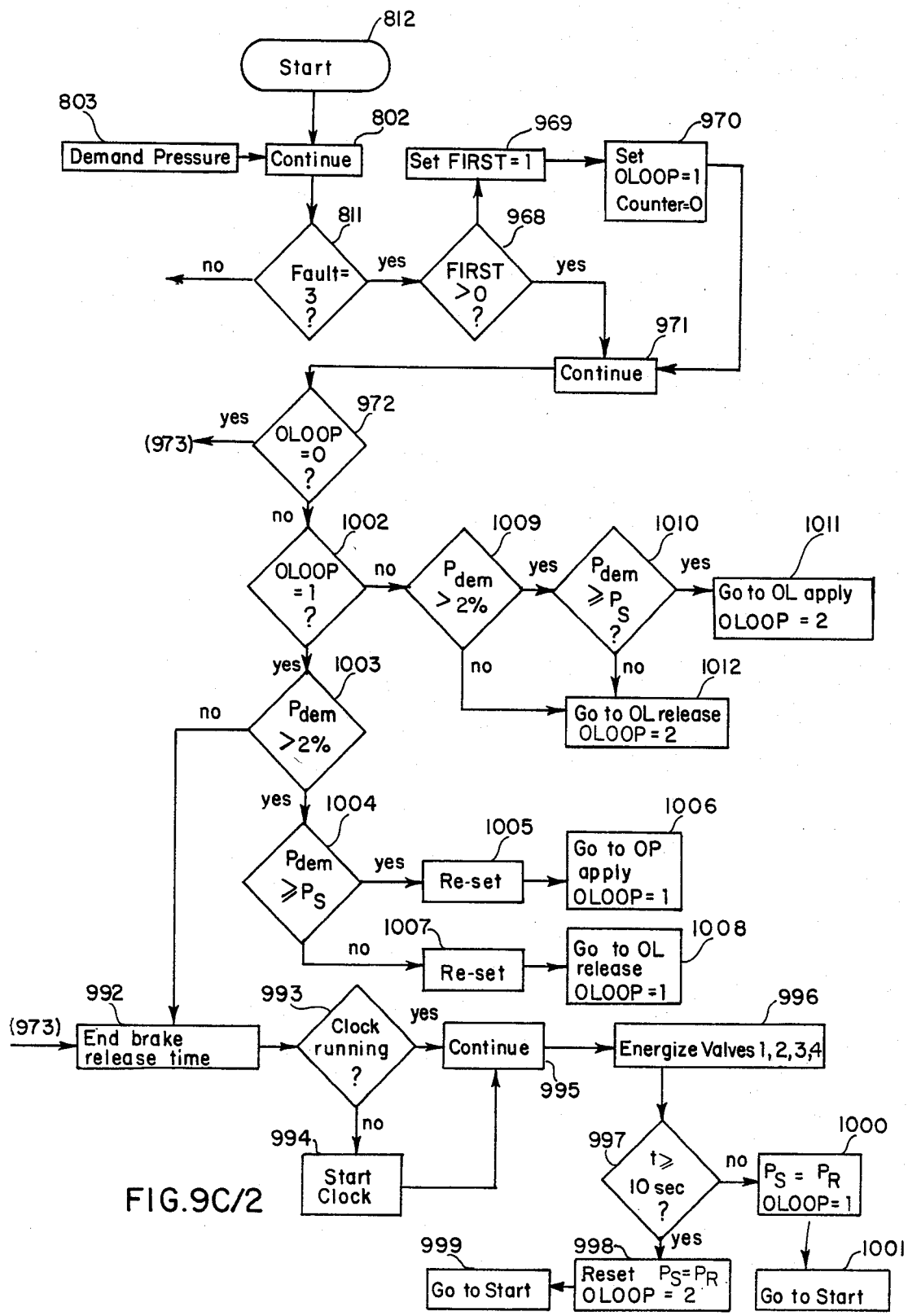
FIG.9C/2

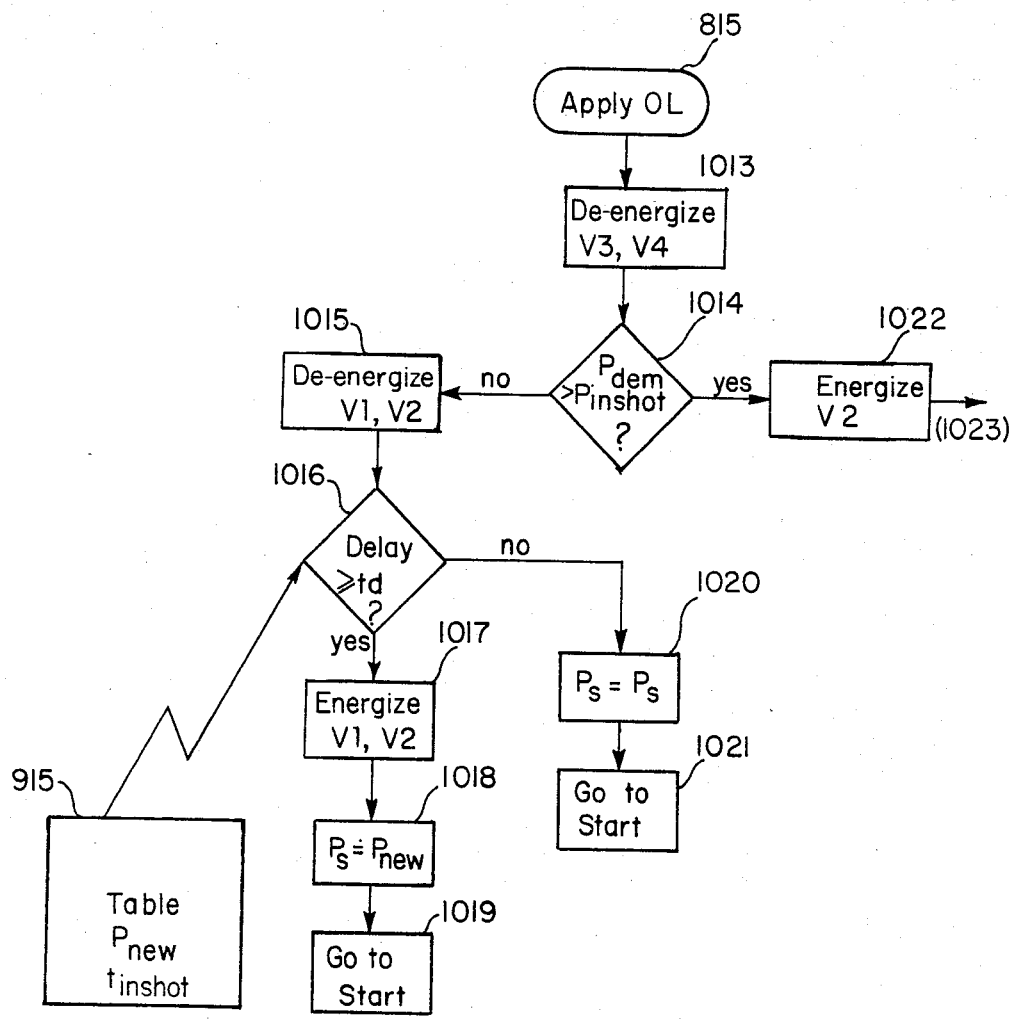
FIG. 9D/1

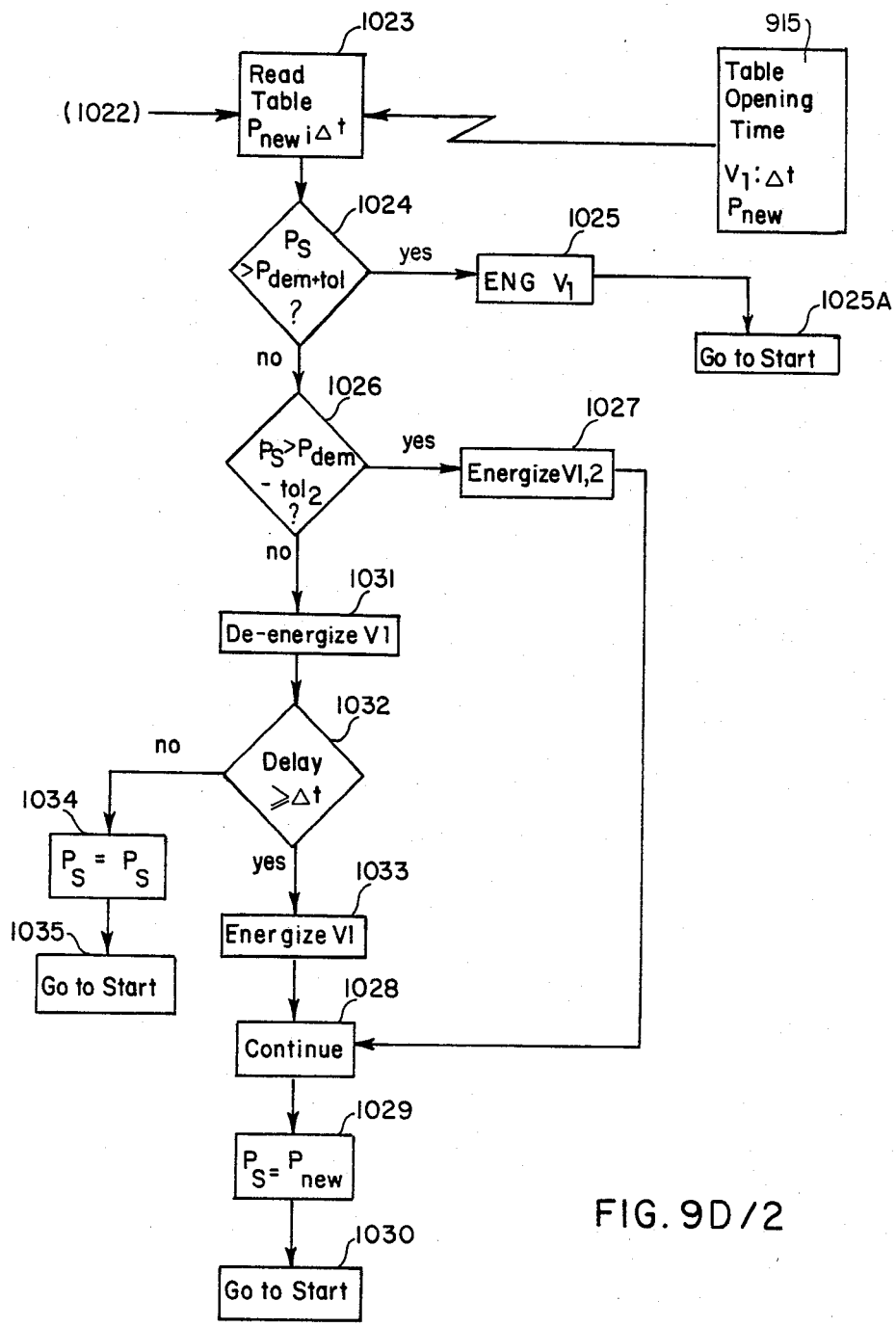
FIG. 9D/2

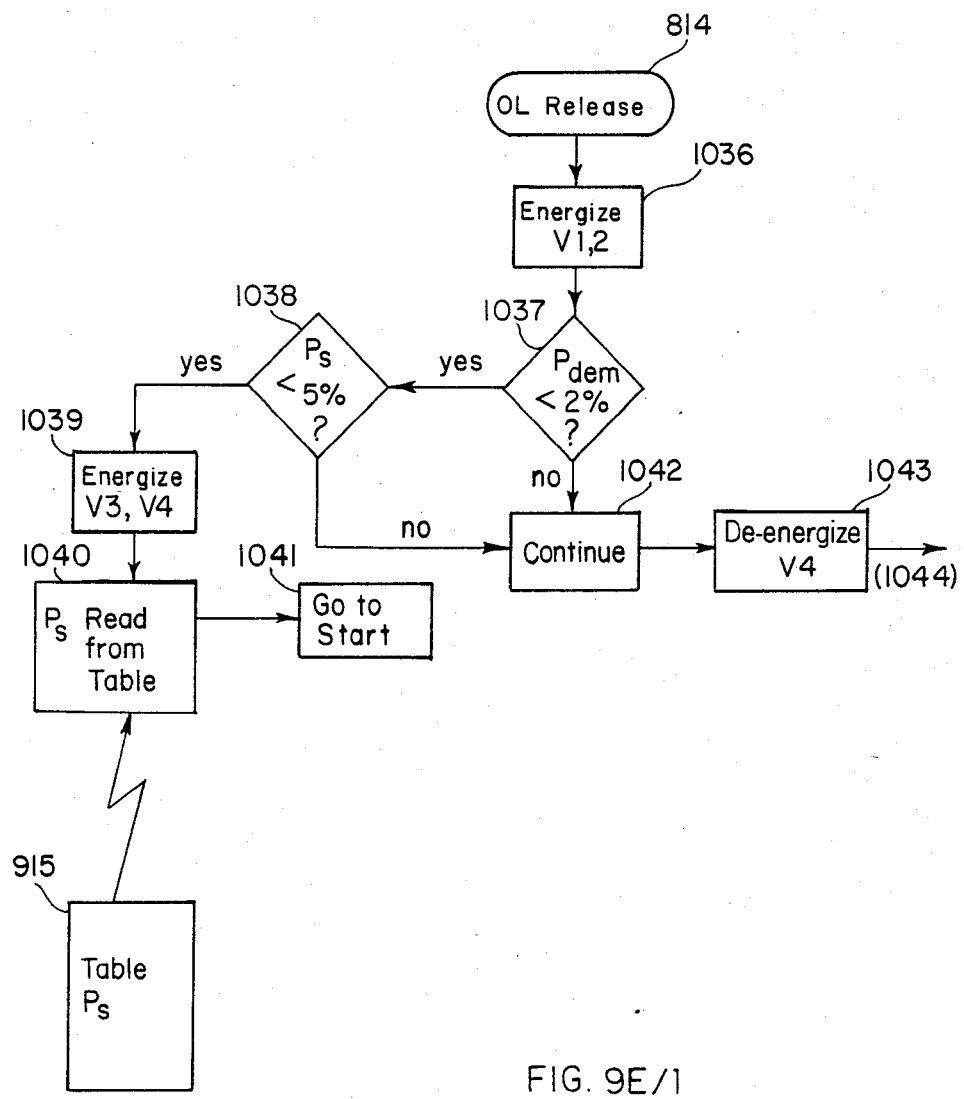
FIG. 9E/1

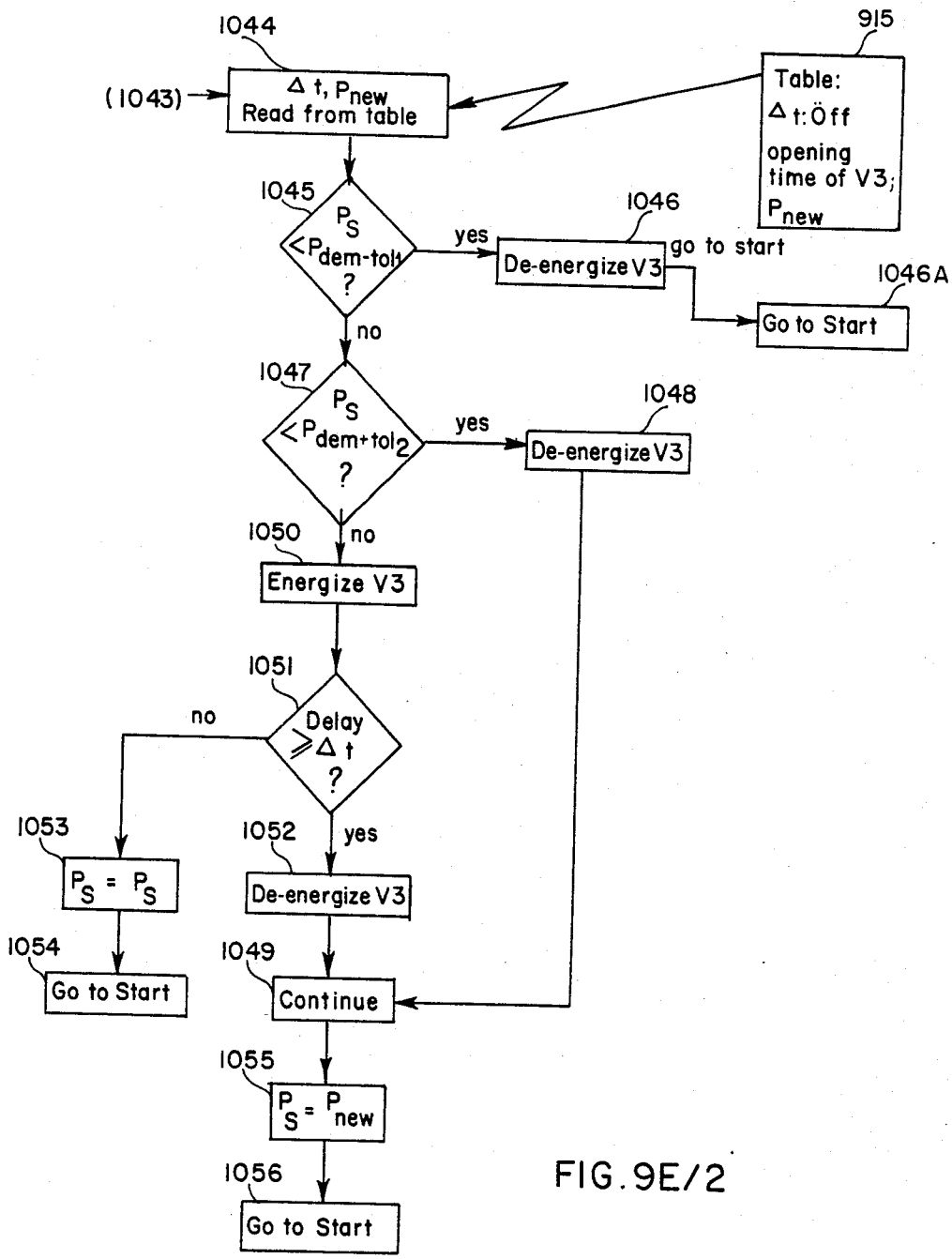
FIG. 9E/2

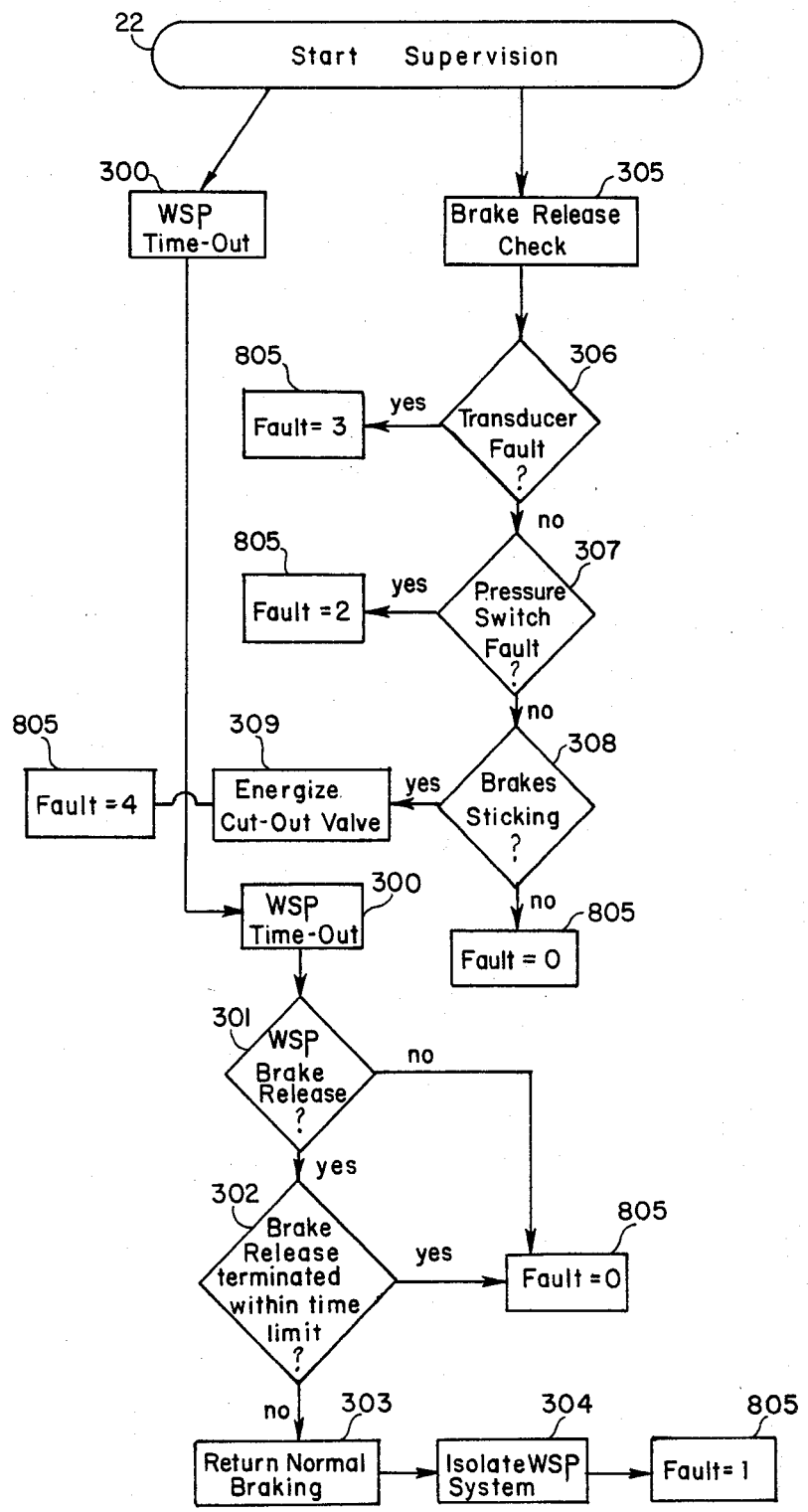
FIG. 10/1

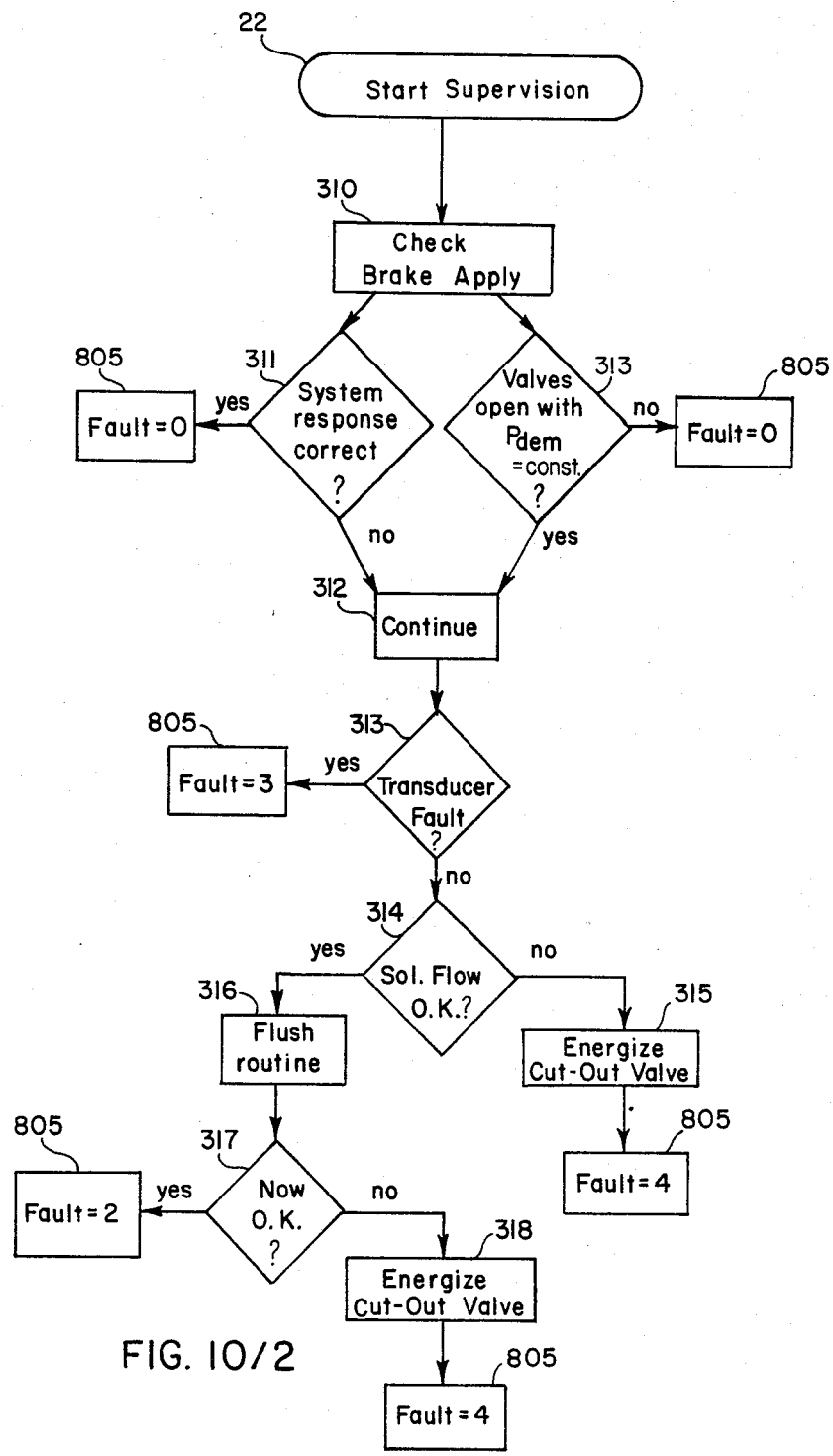
FIG. 10/2

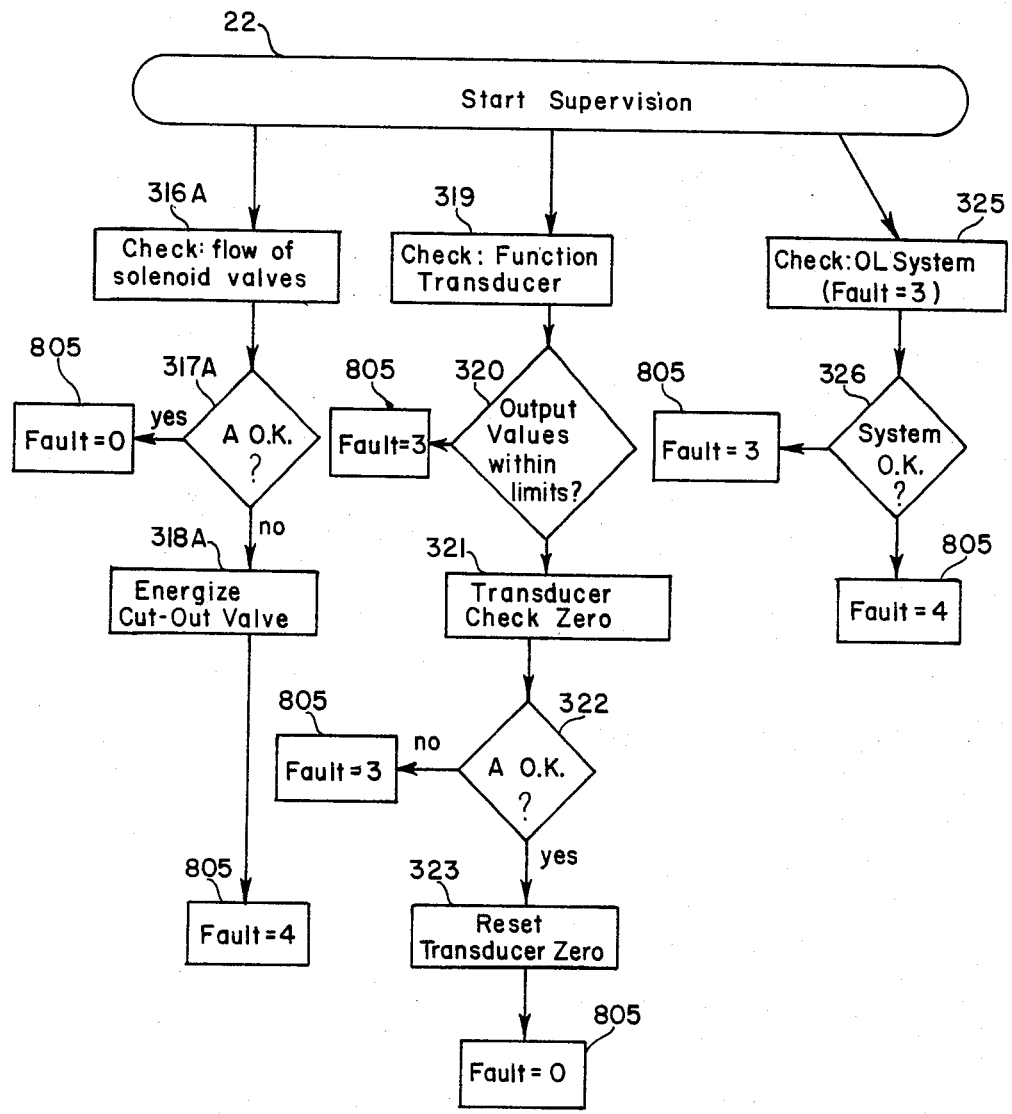
FIG 10/3

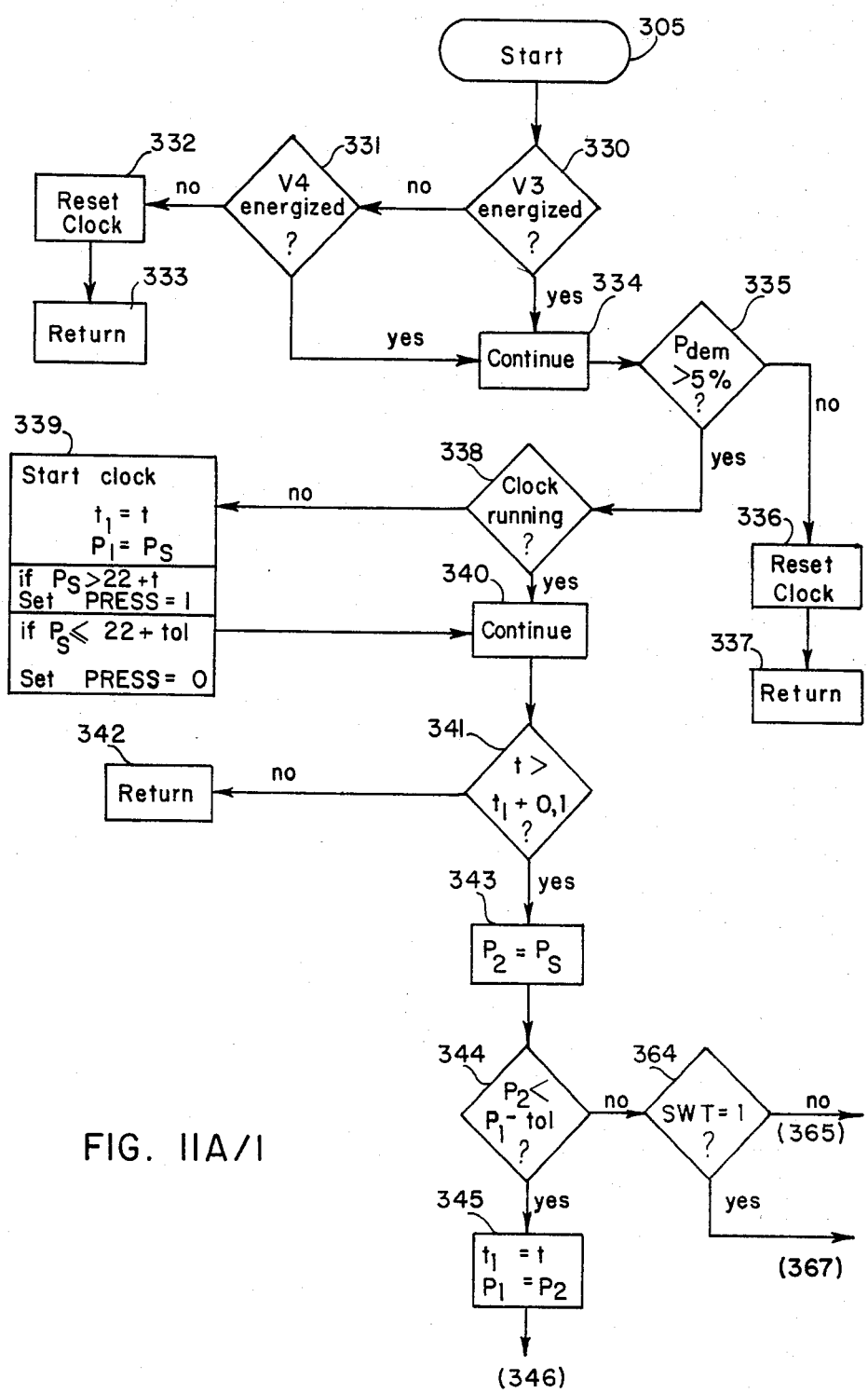
FIG. IIA/I

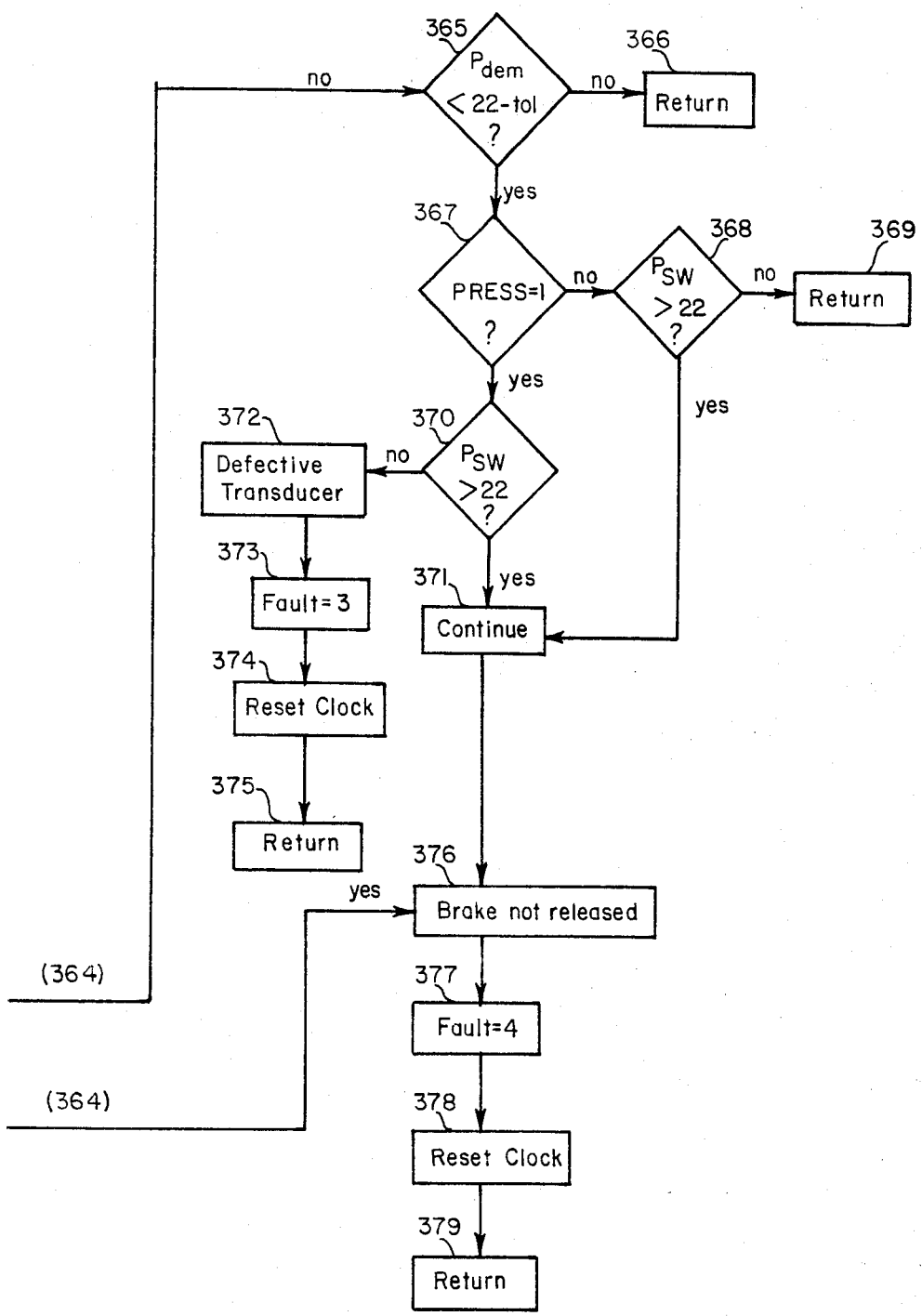
FIG. 11A/2

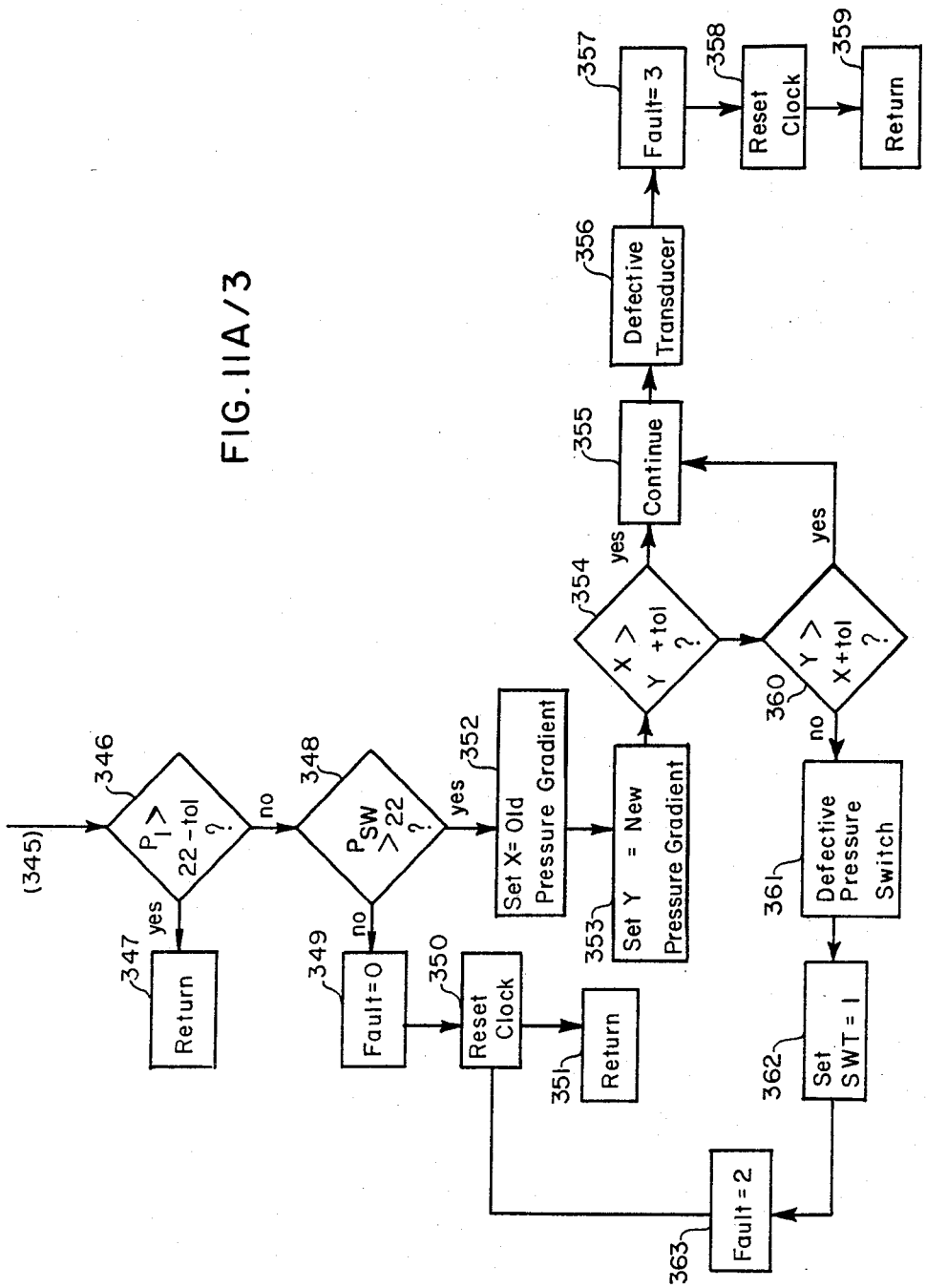
FIG. 11A/3

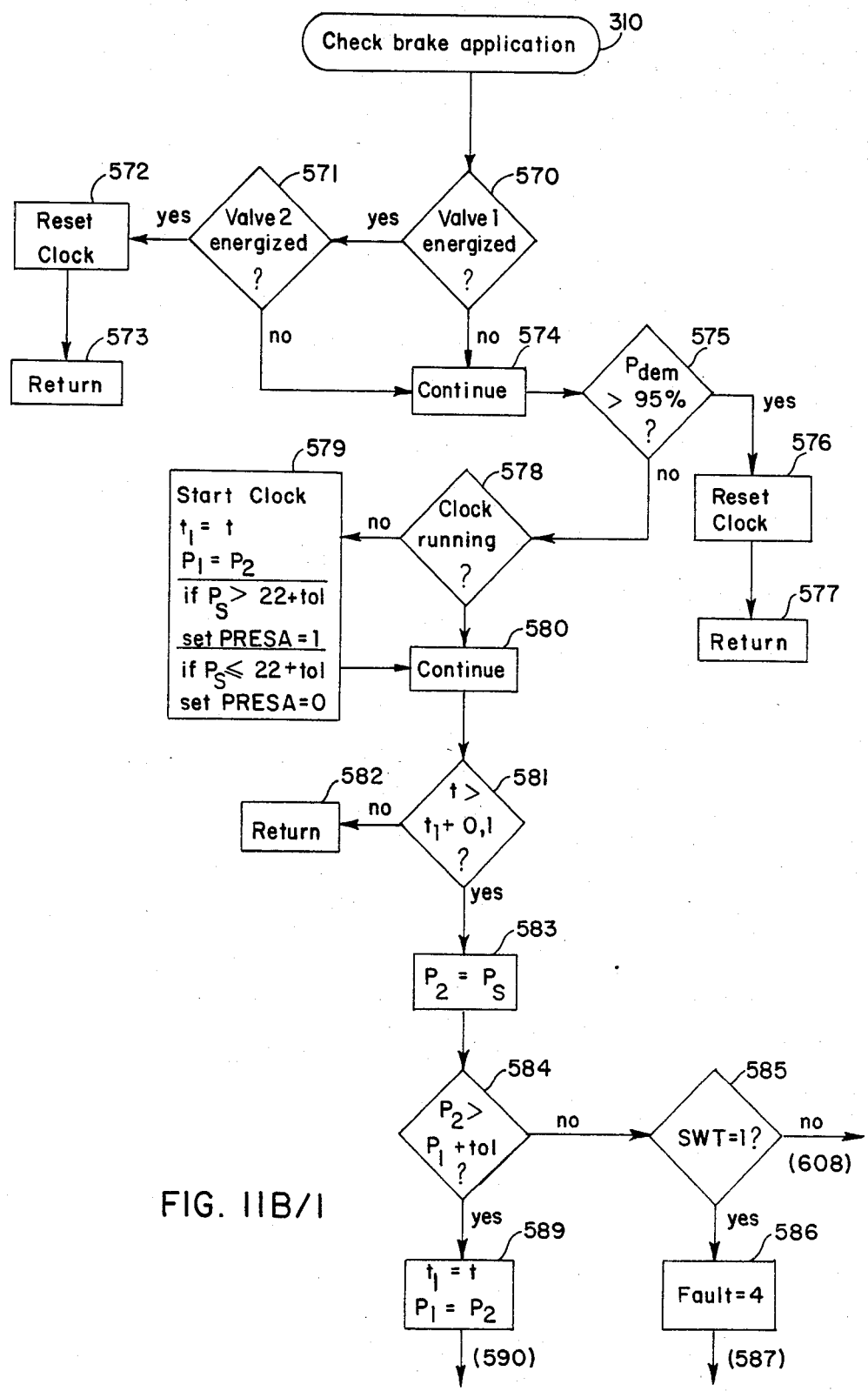
FIG. 11B/1

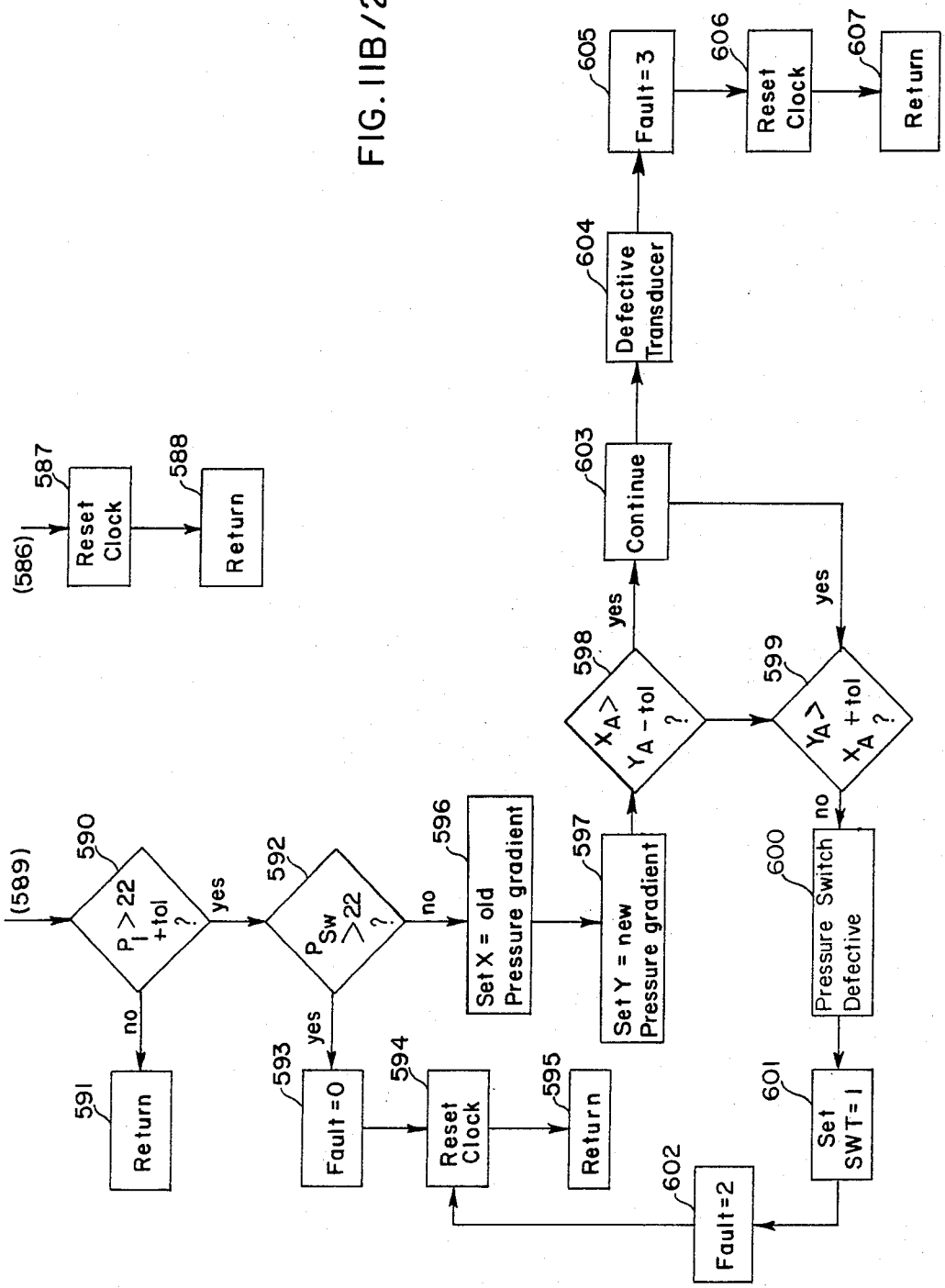
FIG. IIB/2

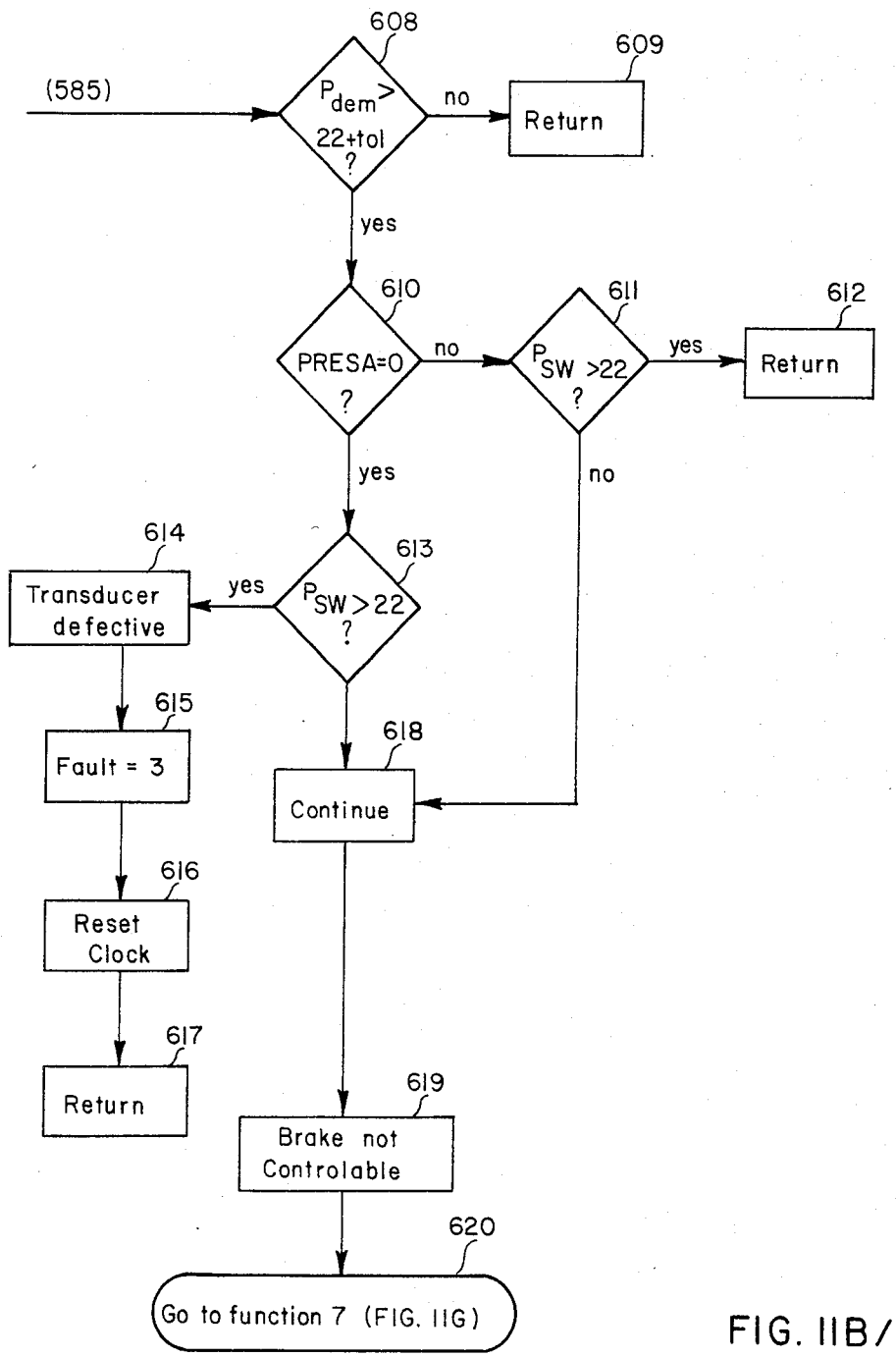
FIG. 11B/3

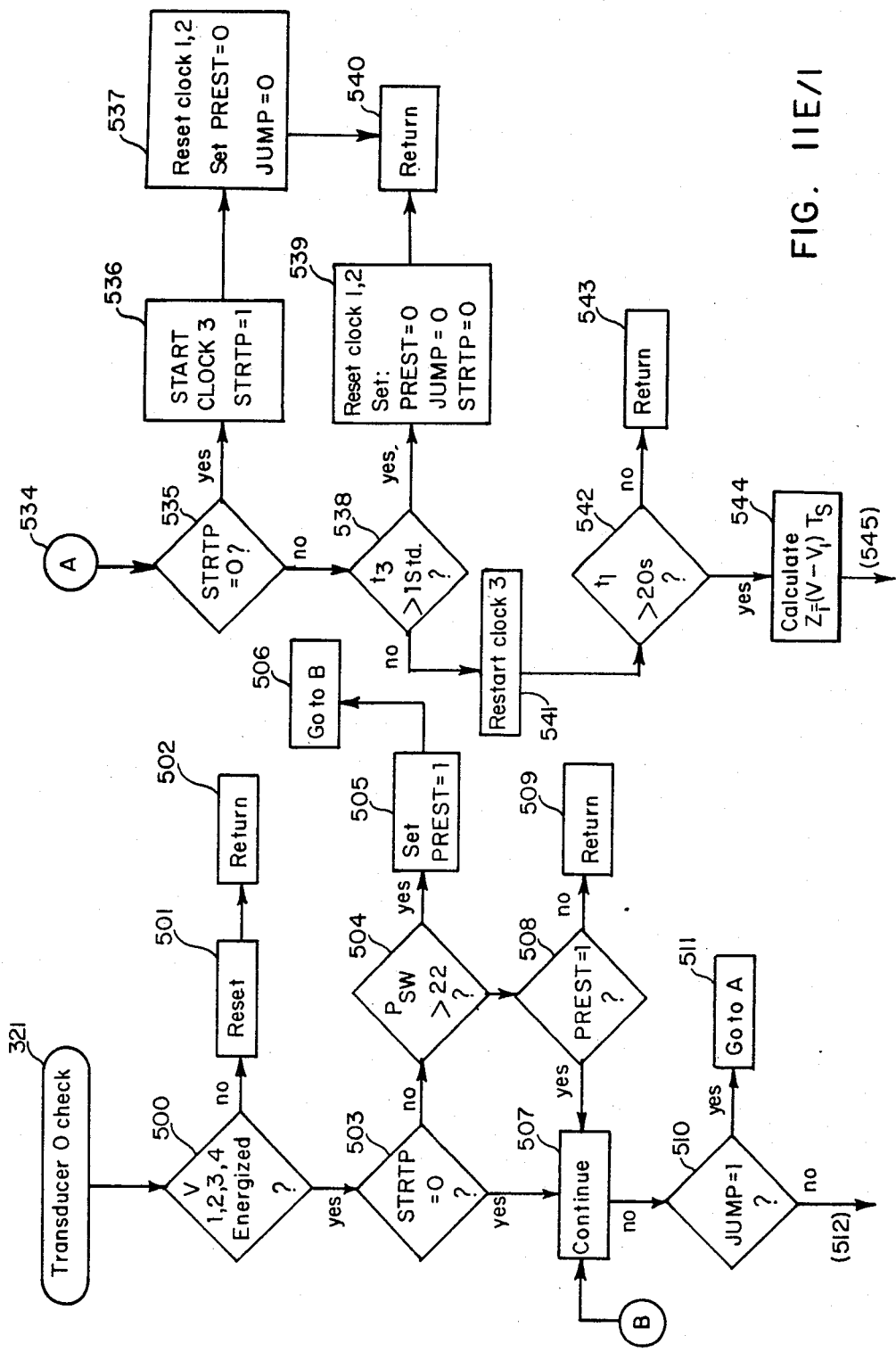
FIG. 11E/1

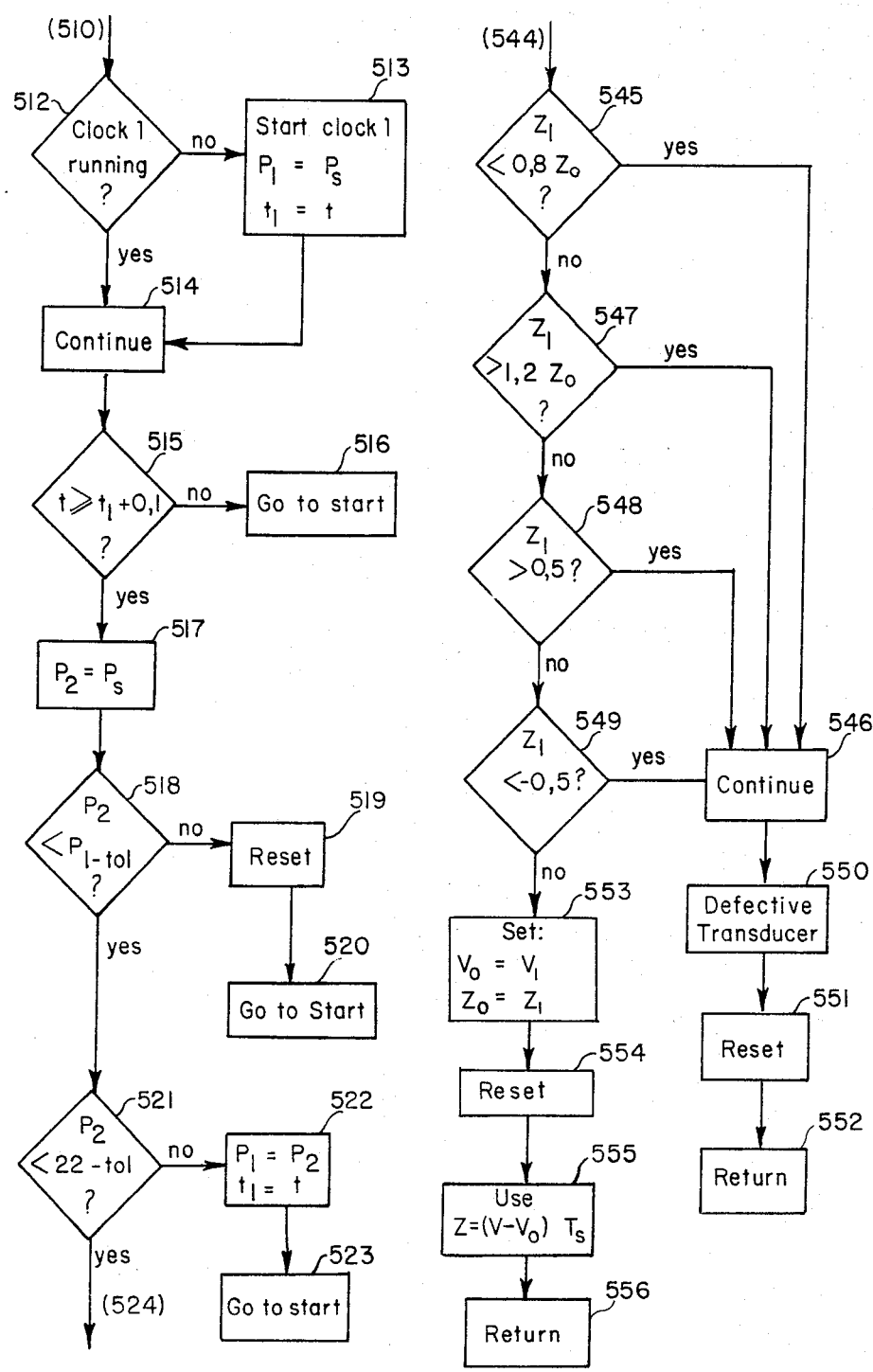
FIG. 11E/2

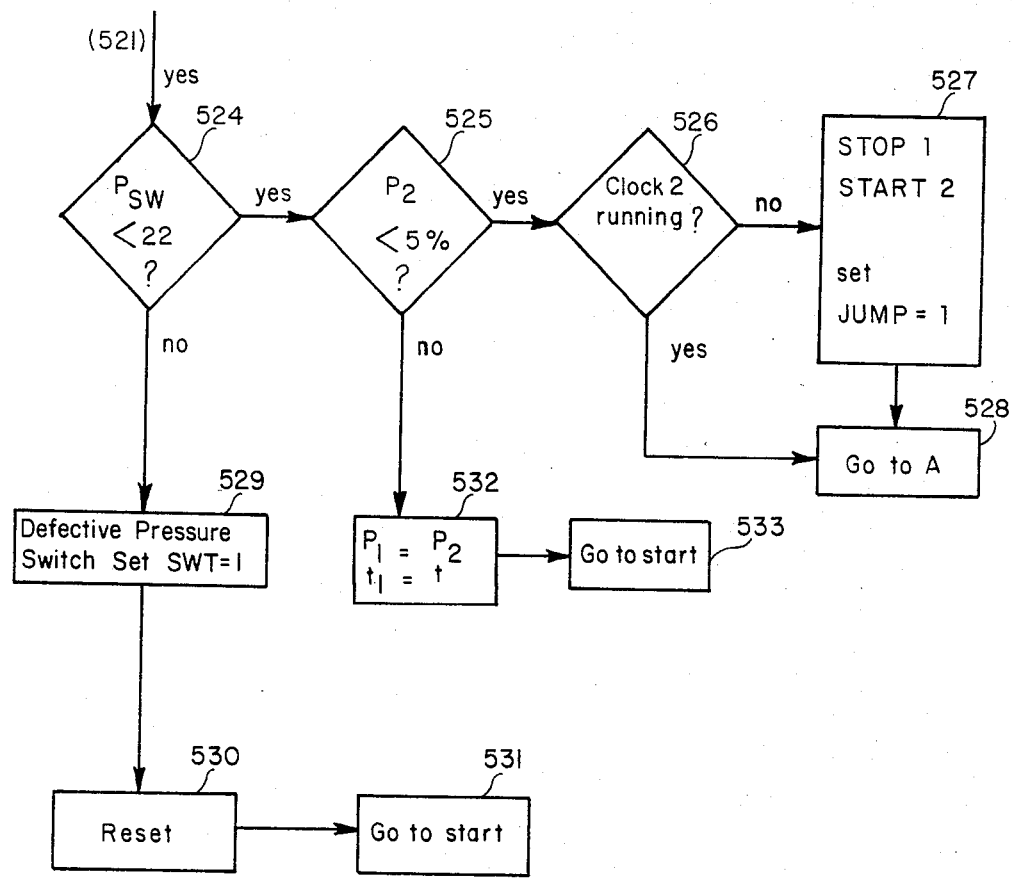
FIG. IIE/3

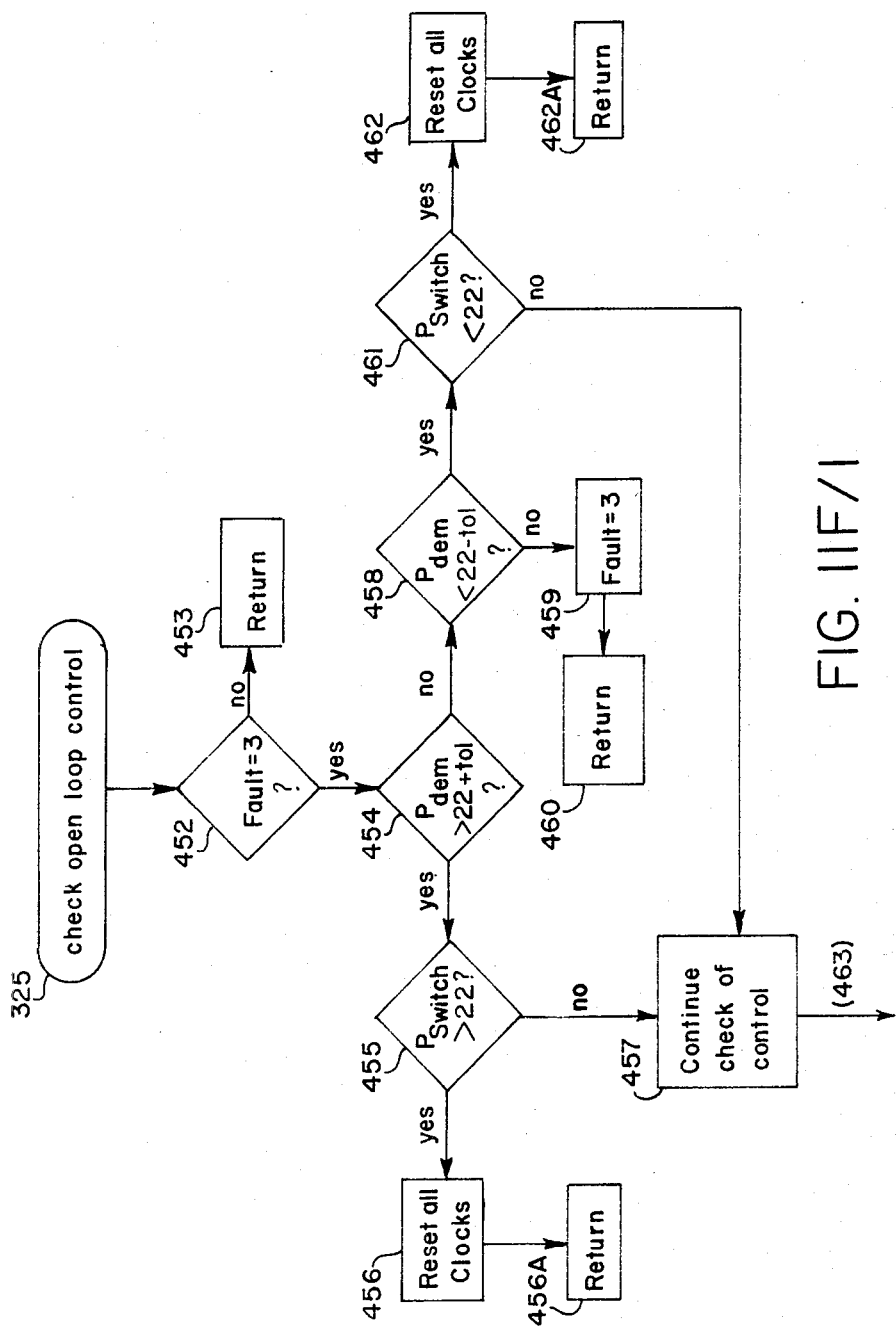
FIG. 11F/1

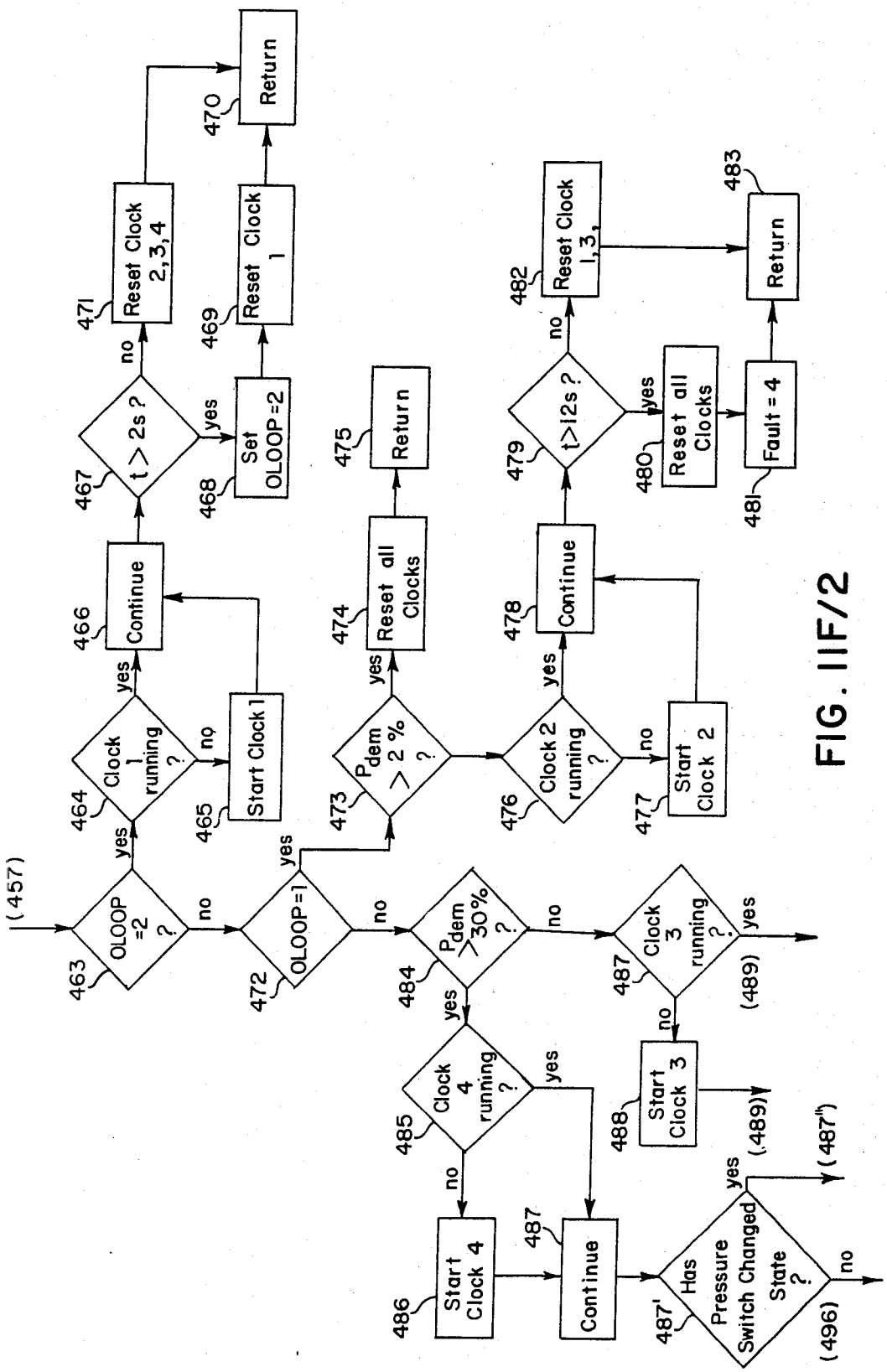
FIG. 11F/2

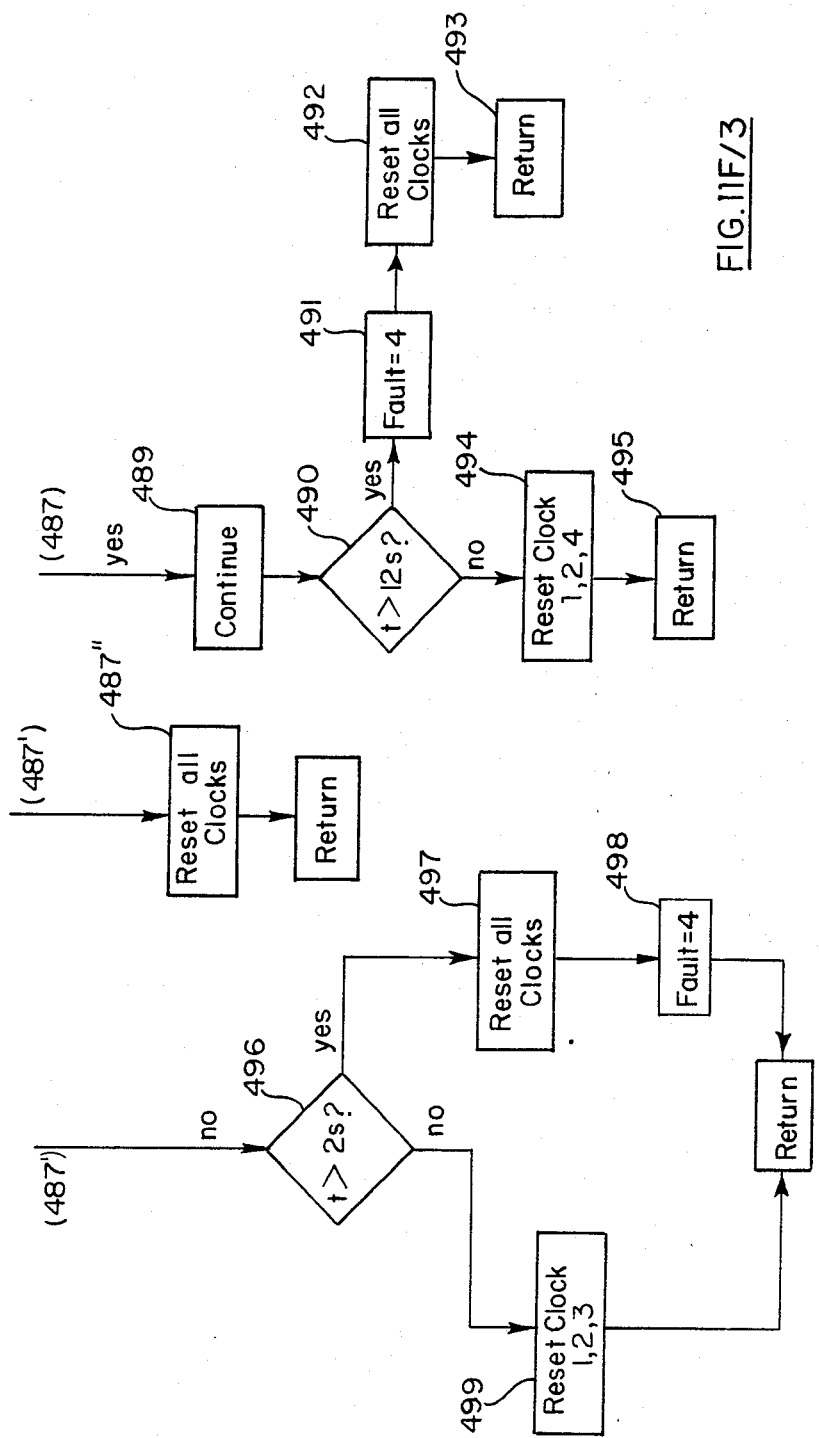
FIG.11F/3

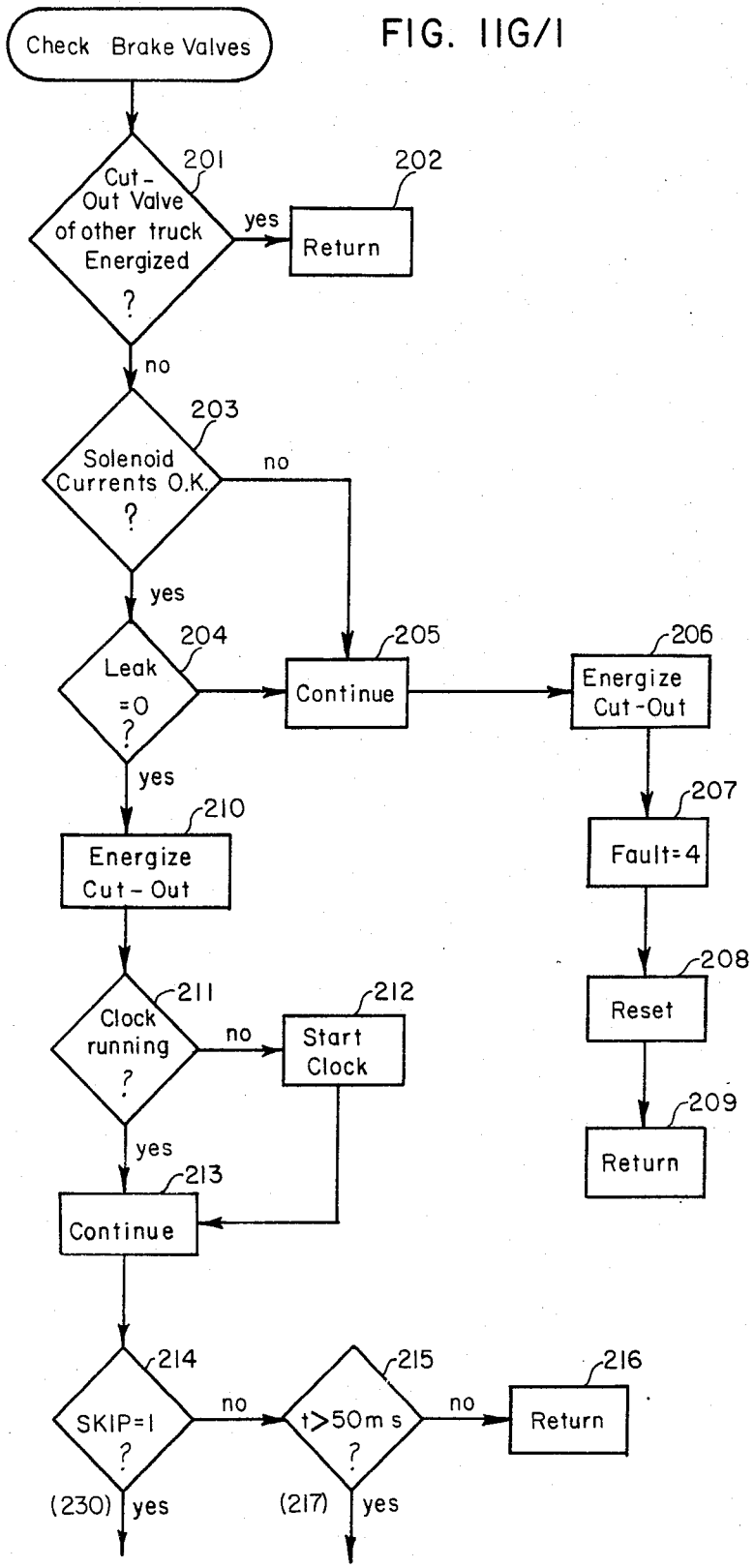
FIG. 11G/1

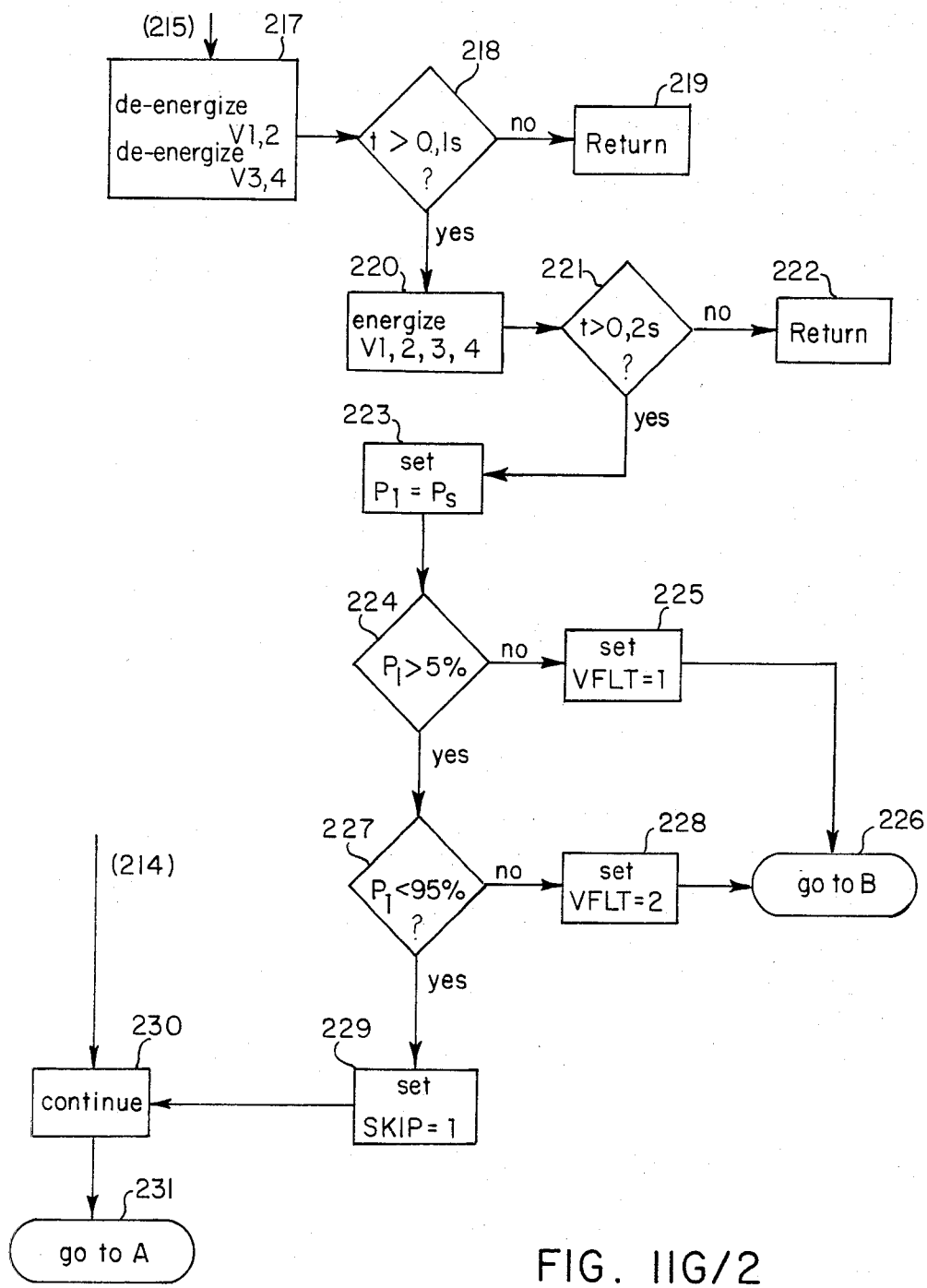
FIG. 11G/2

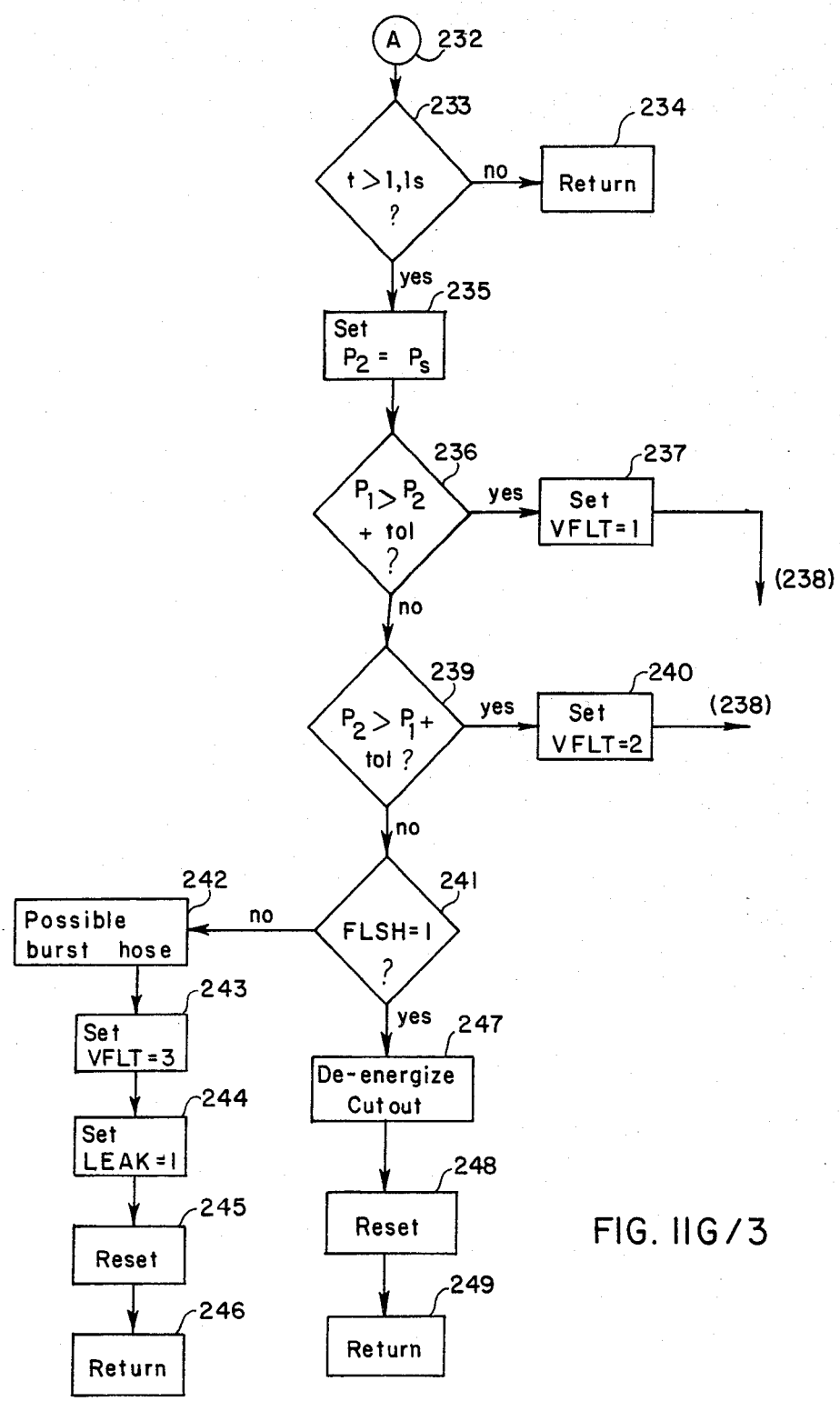
FIG. 11G/3

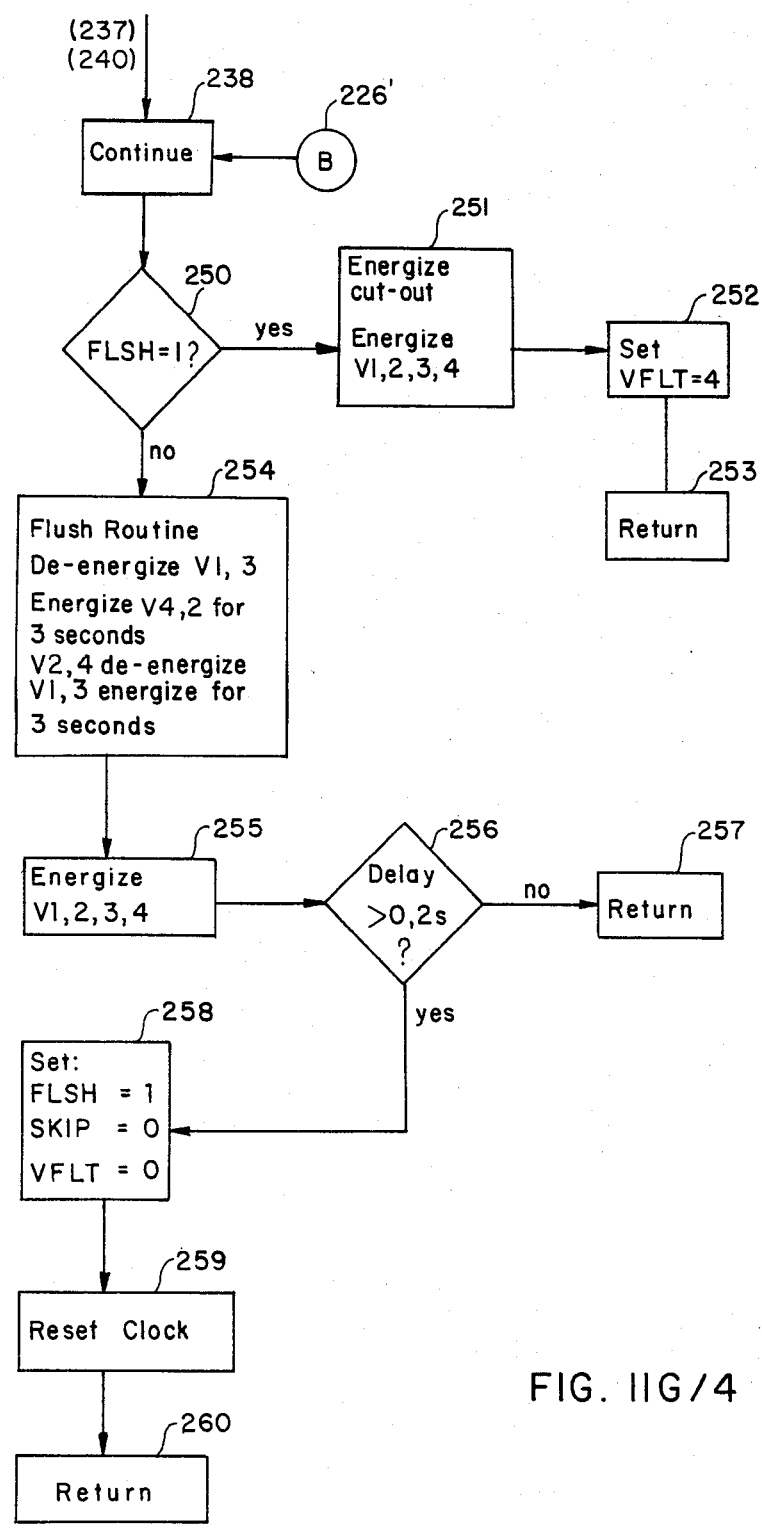
FIG. 11G/4

HYDRAULIC PRESSURE ACTUATED BRAKE SYSTEM FOR RAIL VEHICLES

The invention relates to a brake system for vehicles, and especially to a hydraulic pressure actuated brake system for rail vehicles. In particular, a system having axle-mounted brake discs with brake cylinders pressurized by a controlled pressure, an electrical control unit, control valves operable in response to input signals corresponding to certain brake parameters such that a desired brake cylinder pressure is created, and pressure transducers for monitoring the pressure whereby, electrical signals proportionate to the brake cylinder pressure are generated is described.

A brake system for vehicles of this type is described in DE-AS 2 434 677. In principle, it deals with closed loop control of the brake cylinder pressure, in which the actual brake cylinder pressure is compared with a reference input, which, as a rule, is set by the conductor of the vehicle. The existing system pressure is controlled in response to this comparison, which means, that it is either increased, lowered, or kept constant.

In practical use, however, faults occur in the individual components of the brake system, especially in the pressure transducers.

In this case, closed loop control is no longer able to function. Therefore, it has become usual to provide in systems certain fault detection means for triggering certain counter-measures. In DE-AS 2 434 677, an emergency braking operation is triggered in case of pressure loss. However, for many malfunctions, this counter measure is not necessary.

A similar brake system for vehicles is described in DD-PS 135 601. In the place of a continuous monitor of the brake cylinder pressure it merely provides two pressure-sensitive switches, one of which monitors the minimum and the other the maximum pressure. If the pick-up pressure of these switches is too low or too high, respectively, an electric pump sustaining or creating, respectively, the system pressure is switched on or off, respectively.

For an emergency brake operation in this instance, commonly known spring brake cylinders have been provided, their springs handling a secure braking effect in case of a system failure, these springs being sufficiently powerful to ascertain a parking brake effect. It is equally known from the above mentioned publication that the vehicle load, the possible existence of trailers, a locking of the wheels, and the effect of an electrodynamic brake must be considered when adjusting the brake cylinder pressure.

In addition, it is common knowledge, for example FR-PS 837 618, DE-AS 1 755 615, to provide, for the purpose of sensitive pressure control or pressure adjustment, respectively, several valves switched in parallel, having different aperture diameters, by means of which varying gradients of a pressure rise or pressure drop, respectively, can be maintained.

SUMMARY OF THE INVENTION

It is an object of the invention to improve the above described brake system in such a manner that during a failure of several components of the brake pressure control circuit, a braking operation corresponding as nearly as possible to normal conditions will be possible.

In accordance with the above object the present invention provides:

A microprocessor based control unit including: read only memory (ROM), Random access (read/write) memory (RAM), clock, interface adapters and connecting bus; the whole comprising a microcomputer. The microcomputer control unit further includes power supplies, data multiplexer, A/D (analog/digital) converter and the interface boards necessary to condition the various input/output signals to control the brake system;

The control unit contains a storage memory (table) in which the values of the temporal sequence of the brake cylinder pressure as well as the pertinent position of the control valves are stored during normal braking operations effected by the brake cylinder pressure;

detection devices wherein various faults of the brake system and, in particular, a malfunctioning of the pressure transducers can be monitored; and control devices are provided which respond to predetermined faults and which switch the brake system from the normal closed loop controlled brake operation to a system for controlling braking in an open loop mode.

A brake system according to the invention operates normally as a closed loop control system with feedback of the brake cylinder pressure. In the case of certain faults in which the closed loop feedback is no longer possible, there is a switch-over to open loop control. In this operation, a simulated value instead of the measured instantaneous value of pressure is compared with the externally generated demand pressure, and the brake cylinder pressure is controlled as a result of this comparison. Control is no longer a closed loop, but an open loop. The simulated pressure value is taken from a storage element or memory comprising a table. During the closed loop control, the measured instantaneous pressure values dependent on the operational time of the valves had been stored in this table. During open loop control, these pressure values and the corresponding valve operation times are re called to enable appropriate regulation of the control valve to be made. If, for instance, a demand pressure should indicate that the brake pressure should be raised from 40 bar to 50 bar, the table will yield the information for forming the pertinent actuating signals for the control valves. In the event of use of digitally operated valves, the valves are opened and closed for certain periods of time.

The closed loop operation of the system comprises the normal operating mode. Upon detection of a fault, the system will enter an open loop mode.

Closed loop operation commences upon the initial start up of the brake system. An inshot of fluid to the brake system actuators occurs wherein the system valves are operated in a predetermined sequence of steps to generate a predetermined inshot pressure. The initial valve operating parameters for the valves are contained in a ROM of the microprocessor based control unit as a series of actuating steps to produce a given pressure change. Once the valves are actuated in accordance with this stored data, the pressure transducer signal, relating to the system brake pressure and obtained after each actuation step, is stored and compared to the pressure level stored in memory for the step. Based upon the new pressure reading and target pressure stored in memory, new valve parameters are determined for future inshot operations. The new valve parameters are computed by a program subroutine contained in the control unit based upon the previously RAM stored pressure measured by the transducer and the target inshot pressure for each step.

During subsequent operation of the brakes wherein an externally generated pressure demand is applied to the system, the system pressure is changed along a gradient to limit the jerk induced by the change in brake effort. Jerk limiting is achieved by discrete operation of a digital control valve. Pressure is controlled in a series of incremental changes (increase or decrease) and hold sequences, the mear rate of which corresponds to the desired jerk limit. When the valve has closed a delay is allowed (for stabilization of pressure) before the pressure transducer signal is read. This pressure is compared to the time dependent jerk demand until a predetermined difference between these parameters is reached. At this time the valve is opened, to increase or decrease pressure as necessary, and the changing pressure again compared to the jerk demand. When the acceptable difference between these parameters is reached the valve is closed and pressure is allowed to stabilize before the transducer signal is again read. This series of events is repeated until the demanded system pressure is reached.

To provide information for subsequent use in the event of a pressure transducer malfunction, data relating system pressure to elapsed time of valve operation is written to memory. In order to provide accurate data, the stabilized pressure read with the valve closed is written to memory and is correlated with the previous valve operation time. This data is continuously overwritten with repeated brake operations, such that information describing the characteristics of the system is continuously updated.

In the event of a malfunction, the signal from the pressure transducers cannot be relied upon and, as a result, the prevailing brake cylinder pressure at the time of the malfunction is not known. The system then prepares for open loop operation. As a consequence, and to enable the open loop control to regulate the brake cylinder to a pressure approximate to the jerk limited demanded pressure, the system pressure must be reduced to a defined initial reference pressure prior to the start of open loop control, from which value the recall of data from the table, in memory, may start. For this purpose, the invention proposes the following sequence of operation depending on whether the demand pressure is above or below a reference level, (a) the system pressure is first adjusted to its minimum value (complete release of brakes) or
(b) the system pressure is first adjusted to a reference pressure, with a value located between the maximum and minimum level, the value being determined by the switching threshold of an additional pressure switch whose state is indicative of the system pressure during a fault condition. The pressure value in which the additional pressure switch changes state, including any hystersis exhibited by the switch, is stored in the ROM memory.

The brake system according to the invention can be so designed that, when switching to an open loop form of control it can operate from one of the above reference pressures as a datum. The following possibilities are provided:

If, during the initialization of open loop control, a demand for pronounced increase in brake pressure exists, then the brake pressure will be directed to an intermediate reference level which will be used as a temporary reference pressure for open loop control.

If, as a result of a significant brake demand, initialization of open loop control was made using the intermediate reference level then, at a later time when the brake demand is reduced, the brake pressure is reduced to its minimum level and this value is used as a permanent reference pressure.

If, on the other hand, during initialization of open loop control a demand in the direction of a complete release of the brake pressure exists, for instance, immediately prior to a start from a station, the brake pressure is adjusted to its minimum value and this minimum value is then used as the reference value.

In all cases of a fault detection prior to establishing open loop operation reference pressure level, the position of the pressure switch is checked, to determine if the existing system pressure lies above or below the reference pressure. Depending on the result of this check, the activation of the pertinent control valves either lowers or raises the system pressure until the pressure switch has changed state. At the moment of switching, as the pressure switch changes state, the intermediate reference pressure is present as system pressure. Open loop control may then continue starting from this pressure, the value of which is stored in the ROM memory as the pressure at which the switch changes state, as registered by the pressure transducer, during normal operation. The corresponding control valves are activated in such a manner that the existing intermediate reference pressure will be maintained for a pre-set period of time permitting time for the system to stabilize. This stabilization time may be different for brake release and brake application.

Once the initial reference pressure is established, the subsequent open loop operation of the system may begin in response to a pressure demand. The system pressure will be incremented or decremented by actuating the valves according to the valve parameter data stored in the RAM prior to the fault detection.

According to a preferred embodiment of the invention, each control unit contains one microcomputer for each truck (pair of axles) to be braked. That is two microcomputers for each vehicle. The following three basic functions are provided by each microcomputer:

1. Control or regulating functions, respectively
2. Monitoring functions of its truck system,
3. Monitoring functions for other truck systems for the vehicle.

The monitoring functions include the indication of faults and the initiation of counter measures in response thereto.

The control and regulating functions are as follows:
1. normal controlled brake release
2. normal controlled brake application
3. initiation of open loop control and establishing reference pressure.

The system supervision functions provided by the microcomputers for the system include in detail the following functions:
1. Monitoring brake release
2. Monitoring brake application
3. Monitoring brake hold condition
4. Monitoring of functioning of pressure transducer and pressure switch
5. Checking or adjusting, respectively, of pressure transducer
6. Checking of open loop control
7. Checking of solenoid valves.

In addition, the wheel slip/spin protection control system can be monitored.

The supervisory functions between each truck brake system controlling other axles (cross check) comprises:

(a) monitoring the current of solenoid valve coils which control brake pressure, especially ascertaining that the valves which increase brake pressure, and those which reduce brake pressure are not open at the same time;

(b) monitoring brake pressure demand and the pertinent response of the other systems during brake application and brake release;

(c) monitoring the systems to prevent a cut-out of both systems simultaneously.

When monitoring its own control system, the supervision functions, during brake release are able to detect a defective control valve, a defective pressure transducer, or a defective pressure switch. During periods of brake release demand the pressure is monitored to ensure that the system pressure reduces, and that the pressure switch changes state when the pre-set value has been reached.

During the supervision of a brake application, leaks in the pressure system, a defective pressure transducer or a defective pressure switch can be located. There is a detailed check of the rise in system pressure during the demand for application of the brake and a check that during a request to keep pressure constant no valves open. Following the detection of a possible leak in the system an isolation valve is activated. Checks are then repeated to attempt to establish the location of the leak or establish an alternative fault, for example within the control valve.

A leak can occur within the control valve, i.e. the component valves do not close completely because of the presence of foreign matter at the valve seats. A flushing process is provided, during which brake application and release valves are opened simultaneously to enable fluid to flow through the valve at high velocity and consequently flush dirt away.

The above mentioned check and adjustment of the pressure transducer signal at zero pressure can be used for the correction of time and temperature dependent drift or an offset fault, respectively.

It should be noted that the control and regulation functions of the microcomputer will, in addition, comprise the following conventional functions:
 interpretation of train-lined vehicle control signals;
 blending between electro-dynamic and friction brake;
 considering the influence of vehicle weight;
 jerk limitation and
 wheel slip and/or spin protection.

It should be pointed out that the invention is not limited to use with brakes for vehicles. It can be used wherever fluid pressure (hydraulic or pneumatic) in an actuator must be controlled with great safety and precision, as, for instance, in tooling machinery, etc.

Description of the Figures

In the following, the invention is described with respect to a preferred embodiment using preferred embodiments, and drawings as follows:

FIG. 6 is a schematic drawing of the mechanical structure of the control valves;

FIG. 8 is a general flow-diagram of control or regulation processes in the brake system of the invention;

FIGS. 9A–E are detailed flow diagrams of the individual control operations of FIG. 8; wherein FIG. 9A shows the normal, i.e. feedback controlled brake application;

FIG. 9B shows the normal, i.e. feedback controlled brake release;

FIG. 9C shows the initialization of the open loop control (OL);

FIG. 9D shows the open loop (OL) controlled brake application;

FIG. 9E shows the open loop brake release;

FIG. 10 is a general flow diagram of the supervisor processes;

FIGS. 11 A–G are detailed flow diagrams of the individual supervisor processes of FIG. 10; wherein FIG. 11A shows the check of brake release;

FIG. 11B shows the check of brake application;

FIG. 11E shows checking or adjusting, respectively pressure transducer at zero pressure;

FIG. 11F shows checking of open loop control and

FIG. 11G shows check of faults of control valves.

Prior to describing the figures in detail, a list of the abbreviations used is given in the following:

P = Pressure
BRK = Brake
DBFB = Dynamic Brake Feedback
WSP = Wheel spin/slide protection
PTR = Pressure transducer or its output signal, respectively
Psw = Pressure switch or its condition, respectively
FB = Friction Brake
FBC = Friction brake control
FBFB = Feedback signal of friction brake (e.g. from PTR)
Sol.Valv. = solenoid valve
Man. Cut = Manual cutout
BCU = Brake Control unit
PBU = Parking brake unit
HPU = Hydraulic power unit
OL = Open Loop (control)

Figure 1:
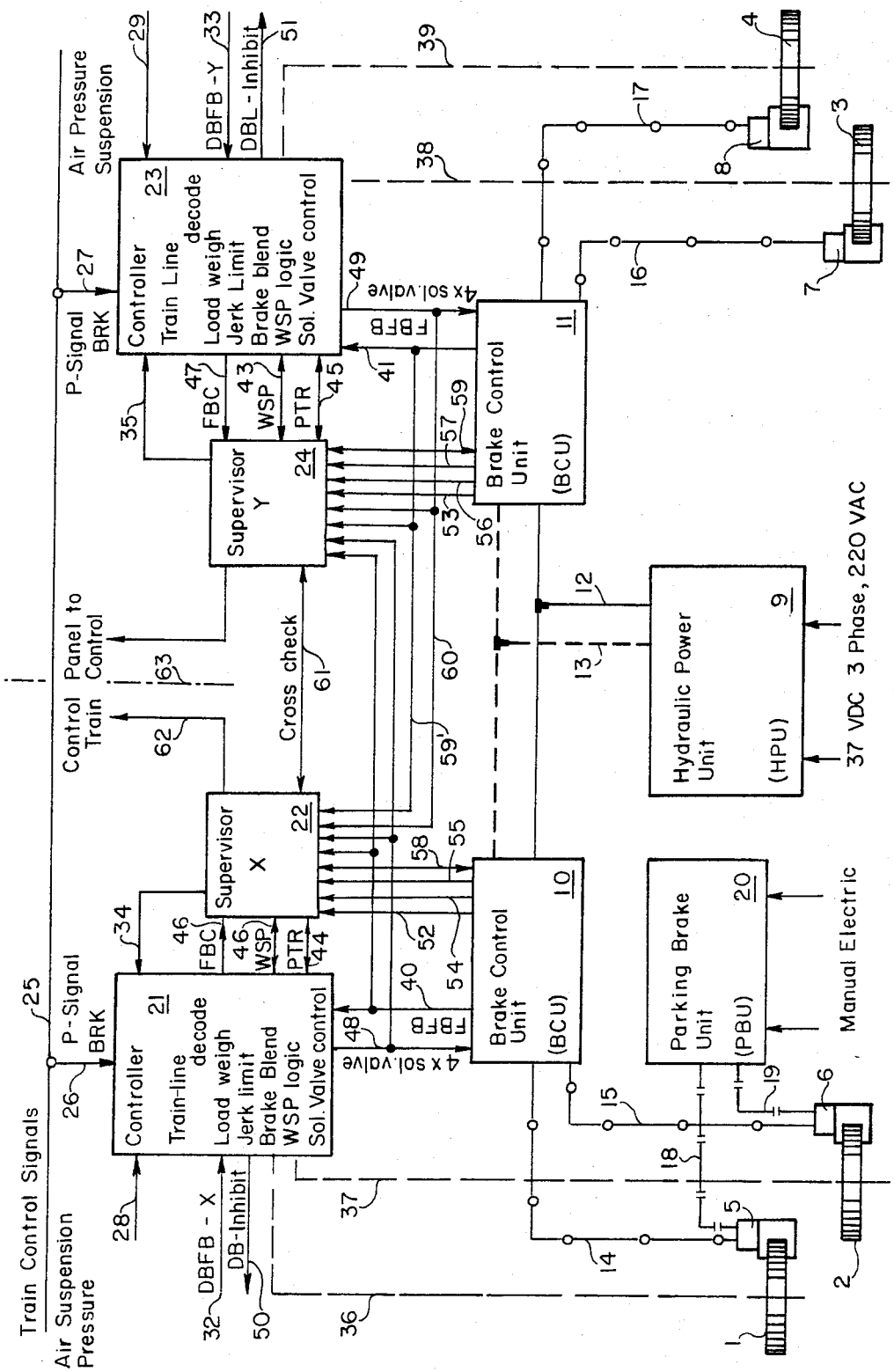
FIG. 1 is a basic circuit diagram of an embodiment of the brake system of the invention.
Figure 2:
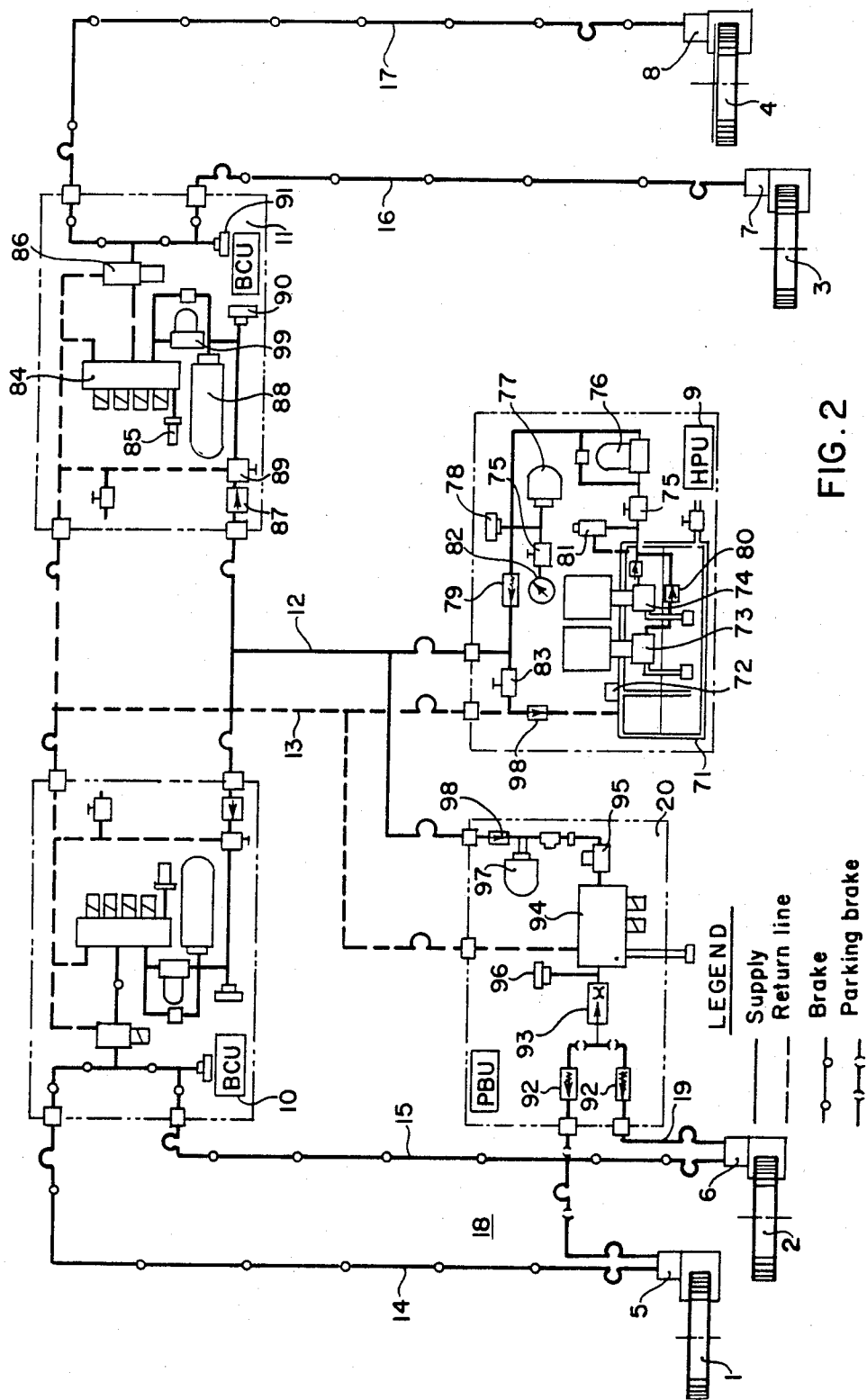
FIG. 2 is a basic drawing of the hydraulic portion of the brake system.
Figure 7:
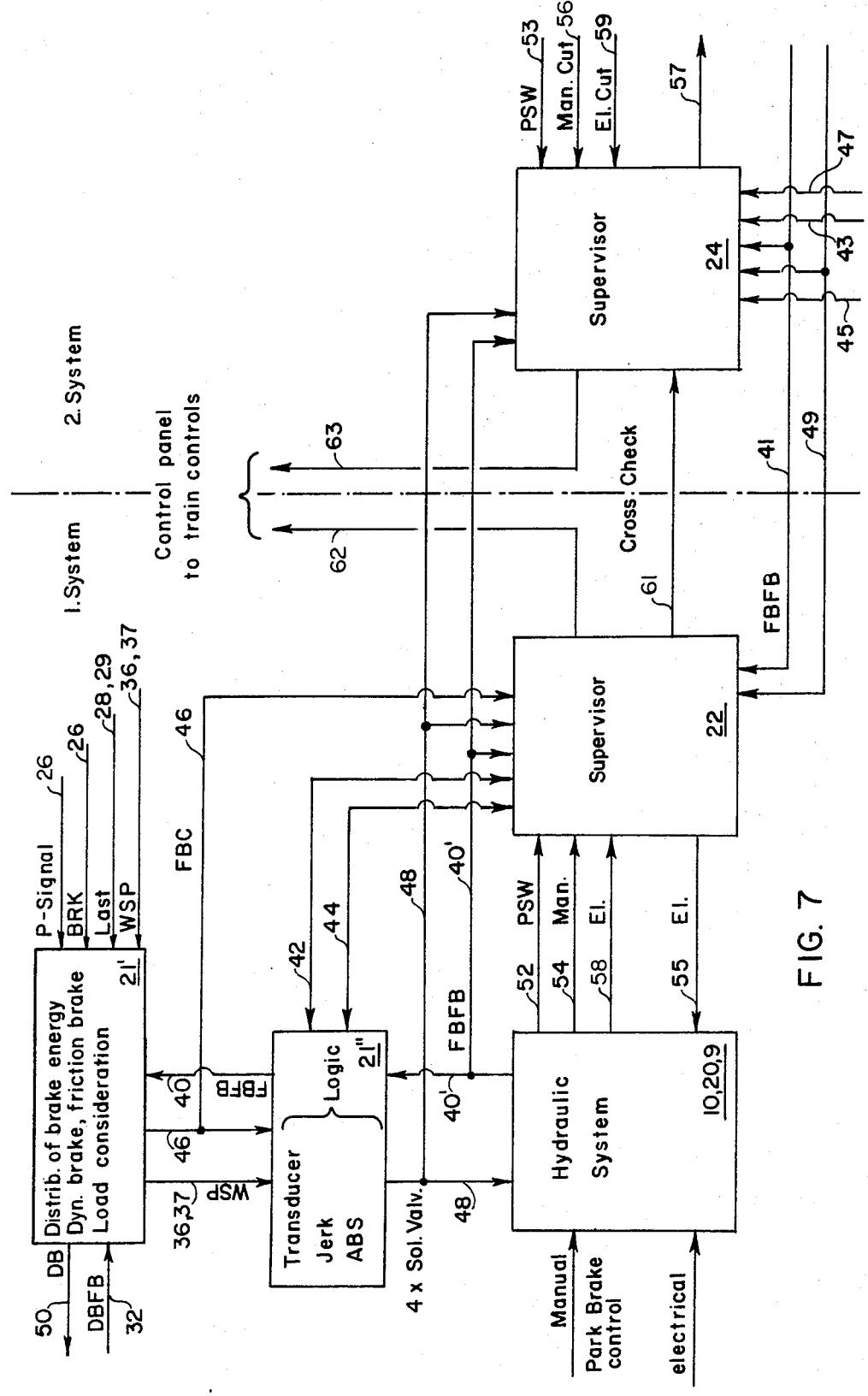
FIG. 7 is a basic circuit diagram, illustrating, conceptually, the communications interfaces between hydraulic system and microprocessors.

The followng abbreviations appear mostly in FIGS. 1, 2 and 7:

$P_{sys}$; $P_s$ = System pressure (measured or from table)
$P_{sw}$ = State of pressure switch
$P_{dem}$ = demanded pressure
$P_{old}$ = old pressure at change in demand
$P_{new}$ = new pressure at next step during control phase
$P_{inshot}$ = Inshot pressure; when $P_s > P_{inshot}$, normal operation is conducted using valve V1 only
$P_{jerk}$ = demanded pressure with jerk limit ($P_{jerk} = R.t + P_{old}$)

R = Jerk-limited application (positive)/release (negative) rate
t = small time increment
$t_d$ = delay time (read from table)
$\Delta t$ = time elapsed
tol = Tolerance
$T_s$ = sensitivity of pressure transducer (bar/volt)
v = Pressure transducer output voltage
z = measured pressure (bar) at pressure transducer
$z_1$ = Residual system pressure (bar)
$v_o$ = Offset voltage of pressure transducer at zero pressure
$X_A$ = old pressure gradient, i.e. $P_{1\ old} - P_{2\ old}$
$Y_A$ = new pressure gradient, i.e. $P_{1\ new} - P_{2\ new}$ These abbreviations are mostly used in FIGS. 8, 9, 10 and 11.

In addition, the following program flags are used:
OLOOP = Check of control (values: 0.1; 2)
PRESA
PRESR
PRESS
PREST = Pressure switch status (values: 0,1)
FAULT = Fault indicator values:
  0 = normal operation
  1 = normal operation, WSP (wheel spin/slide protection), inhibited
  2 = normal operation; if other fault develops go to Fault 4
  3 = Faulty pressure transducer: open loop control
  4 = provided other truck system not isolated; isolate system.
VALV = Valve condition (Values: 0,1)
JUMP = Jump instructions (Values: 0,1)
SKIP
SWT = Pressure Switch fault indicator (Values: 0,1)
COUNT
FIRST
STRTP
FLUSH = Number of times-through when scanning fault indicators (Values: 0,1)
LEAK = System fault indicator (Values: 0,1)
VFLT = Brake valve fault Values:
  0  System clear
  1  Fault: Brake apply valve
  2  Fault: Brake release valve
  3  Potential hose failure
  4  Inability to clear fault Generally, a brake system according to one embodiment of the invention comprises for each truck (pair of axles) of the vehicle two brake calipers and one brake control valve (BCV), receiving their hydraulic energy from one single source. A typical supply pressure is between 113 bar and 134 bar. A suitable fluid is, for instance, the hydraulic oil of the type Brayco 776, of the Bray Oil Company.

Figure 3:
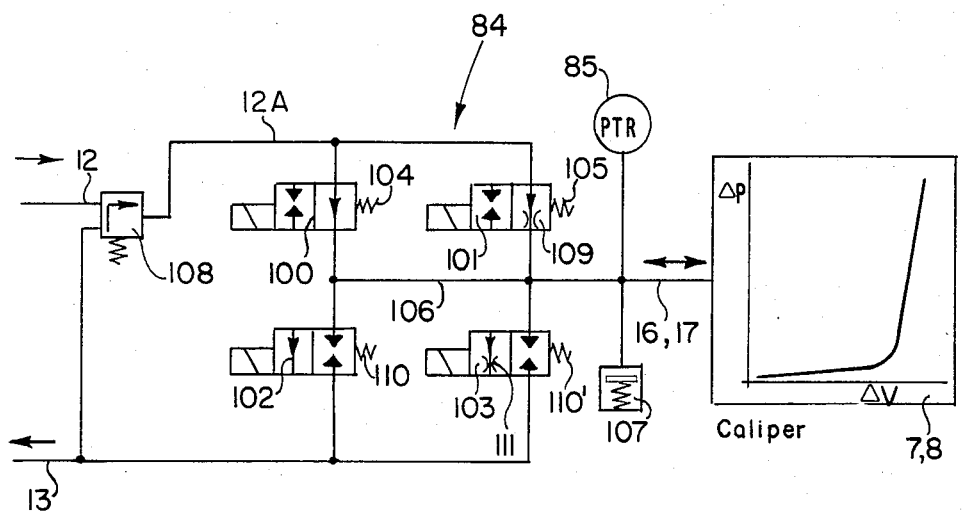
FIG. 3 and FIG. 3A show the layout of the components of the control portion of the brake system.
Figure 3A:
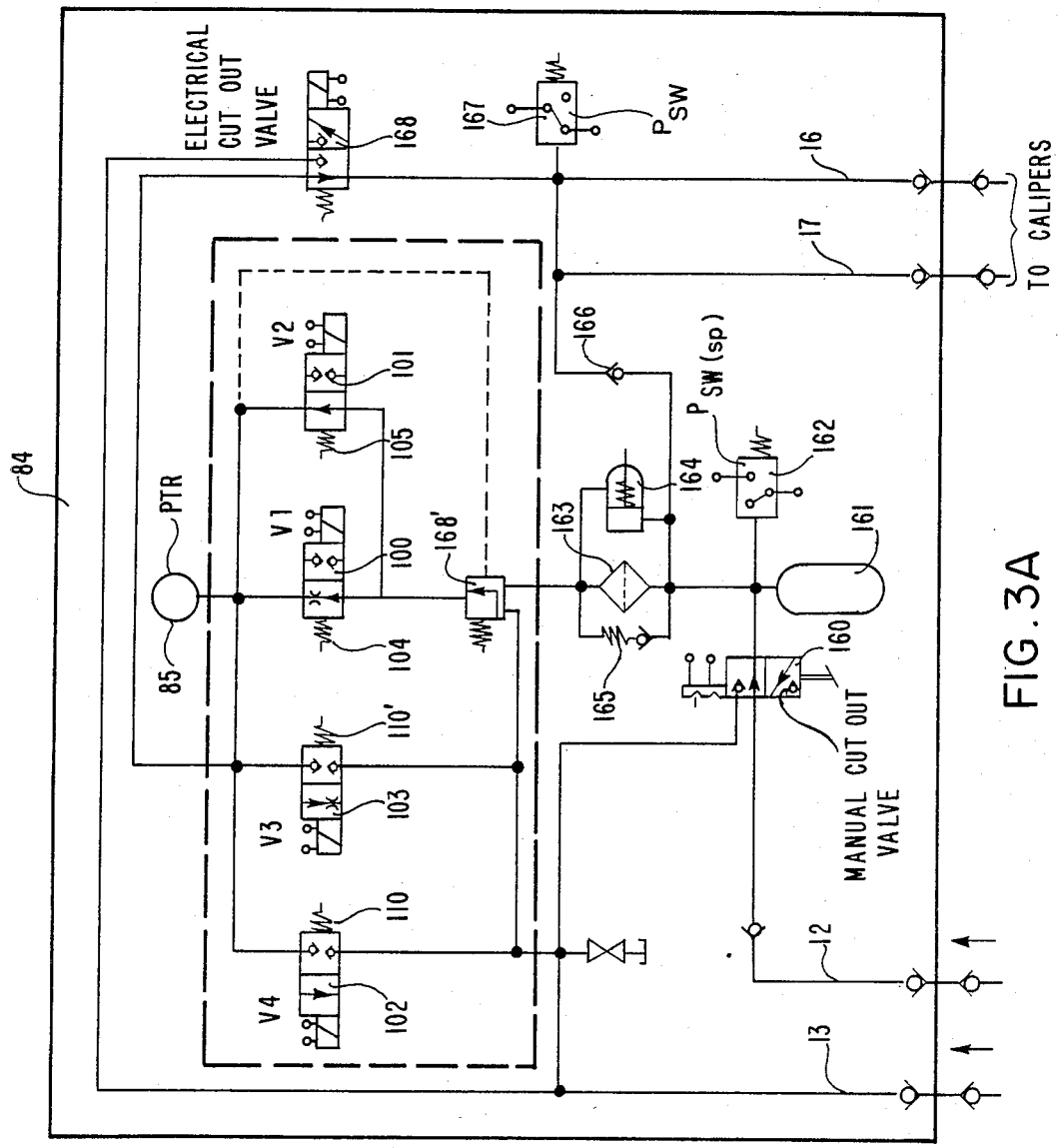

The main components of the hydraulic circuit are shown in FIGS. 2, 3 and 3A. The brake control valve consists of 4 separately engergizable solenoid valves; valves V1 and V2 (FIG. 3A) being apply valves to increase brake pressure and valves V3 and V4 being release valves to enable release of brake pressure. The logic of the solenoid valves follows fail safe principles, i.e. the apply valves are de-energized (disconnected from electrical supply) to open and consequently allow brake application, while they are energized (supplied with electrical energy) to close and maintain pressure. Conversely, the release valves are de-energized to maintain brake pressure, while they are energized to enable brake release. All coils of the solenoid valves operate from a supply voltage of 24–40 v dc and require a current of approximately 1.0 Amp at 37 v dc. The fluid flow rate through the four solenoid valves depends on the respective intended use, for a brake used in a rail vehicle the following valves being possible (at a differential pressure of 120 bar):
  Valve 1 and 3   3.8 l/min.
  Valve 2 and 4   8 /lmin.

The BCV includes a pressure reducing valve which limits the maximum brake caliper pressure to 83 bar.

As can be seen from FIG. 3, the system between the brake control valve and the brake calipers has a non-linear stiffness characteristic. During a brake application valves V3 and V4 remain de-energized and consequently closed. When an application is made from zero pressure valves V1 and V2 are initially simultaneously de-energized to pass relatively high fluid flow rate to the brake cylinder. This operation causes the brake piston to quickly extend, moves the brake pads to contact with the surface of the brake disc and raises the brake caliper (cylinder) pressure to some low level where the system stiffness is more linear. This process is termed "inshot" (see also FIG. 4A) (compare the pressure $P_{inshot}$). Accurate control of the caliper pressure following inshot is achieved by operation of valve V1 only.

In a similar manner, during release of brake pressure, accurate control of the caliper pressure will be achieved by operation of valve V3 only, although at low pressure release is supplemented by operation of valve V4.

Valve 4 serves also for a rapid pressure reduction during operation of the wheelslip protection system. The valve V2 may additionally be used for a rapid recovery of the brake pressure following wheel slip activity.

The hydraulic system is also provided with a brake cut out valve. This is an additional solenoid valve, energization of which results in release of the caliper pressure and isolation of the brake control valve from the calipers. In normal operation, therefore, this valve is de-energized.

A pressure transducer and two pressure switches are provided for each car of the vehicle. The pressure transducer provides an electrical output proportionate to the measured pressure, which, for instance, is 1 v at zero pressure and 11 v at 83 bar.

One of the pressure switches senses supply pressure and opens as soon as the pressure falls below 110 bar, which means, that it is closed during normal operation. The other pressure switch monitors the caliper pressure and opens as soon as that pressure rises above 22 bar; consequently, it is closed during normal operation.

One microcomputer is associated with each truck (pair of axles) of the vehicle, receiving and independently interpreting the following signals:
  Brake and pressure signals;
  feedback signals of the dynamic brake;
  air suspension pressure corresponding to vehicle weight (load weigh)
  axle speed of all four axles; and
  signals of the pressure transducer and the pressure switches of that truck.

Each microcomputer interprets the brake demand signal, modifies it according to load weigh signal and feedback signal of the dynamic brake, to consequently control the friction brake of the associated truck. Each microcomputer contains its own supervisor to check the integrity of its own control system as well as that of related components. In addition, each microcomputer monitors the control and supervisory roles of the other truck microcomputer of the vehicle.

In FIG. 1, four axle brake discs of a vehicle are sketched and given the reference numbers 1, 2, 3 and 4. Each axle has a friction brake of conventional design, said brake being activated by way of disc brake calipers 5, 6, 7, 8. A hydraulic power unit 9 (HPU) of conventional design (i.e. with source of pressure means, reservoir, etc.) supplies brake control units 10 and 11, respectively (BCU) with pressure means such as, for instance, a pressurized hydraulic oil, by way of a pressure line 12. The two brake control units 10 and 11 are connected by a return-line with the hydraulic power unit 9. Brake control unit 10 is connected by way of pressure lines 14, and 15 with brake calipers 5, and 6, respectively, while the brake control unit 11 is connected with the brake calipers 7, and 8 by way of pressure lines 16 and 17 respectively.

In addition, one parking brake unit (PBU) is provided for the two axles of one truck, supplying the calipers 5, and 6, with pressure through pressure lines 18, and 19, respectively. The parking brake unit can be operated manually or electrically.

The two brake control units (10, 11) each have one associated control logic unit respectively, the two control logic units also being connected to each other. In FIG. 1, these control logic units are each subdivided into one control unit 21 and 23, and one supervisor 22 and 24. In practice one control unit and the associated supervisor are combined into one control logic unit formed by a microcomputer. The units 21 and 22 hereby are associated to the brake control unit 10, while units 23 and 24 are associated to brake control unit 11.

The control logic units 21 and 22, 23 and 24 are implemented using a single microcomputer for each combination of units 21 and 22, 23 and 24. The control logic units incorporate microprocessor controllers of a type known to those skilled in the art and included in a single board computer such as the Intel SBC 88/40 suitably programmed to carryout the supervisory and control functions of these units. I/O connection to the computer are shown in the figure. The relevant programming for the computer is described more particularly in the flow charts which follow. Standard programming techniques presently employed in programming this computer may be used to devise the required machine readable instruction from the flow charts. The Intel single board computers, SBC 88/40 includes appropriate analog to digital conversion circuitry to convert the received analog transducer signals and demand signals applied to the units 21, 22, 23 and 24 into the correct numerical format.

The supervisory and control units for a truck are formed with appropriate programming of a microcomputer. The units are shown conceptually as separate individual supervisory and control components. However, the components are realized by suitable programming of a single microcomputer, connections to the microcomputer being made through normal I/O ports. The figure demonstrates cooperation between supervisory and corresponding control units realized by appropriate software to be described.

Control unit 21 has the following inputs: through a line 26, connected to the train-lined vehicle control signal line 25, modulated signals (P-signals) and digital demand signals (BRK) are introduced. Lines 28 and 29 furnish to the vehicle weight or vehicle load, respectively, proportional signals from a suitable transducer, such as, for instance, a diaphragm pressure transducer. By way of lines 32, 33 feedback signals of the dynamic brake (DBFB) are supplied.

Wheel rotation speed for all axles of the vehicle is provided by signals through lines 36, 37, 38 and 39 respectively, said signals corresponding to the prevailing rotational speed of the wheel 1, 2, 3 and 4, respectively.

In addition, a line 40 supplies a feedback signal of the friction brake (FBFB) from the brake control unit 10 which is the output signal of a pressure transducer (not shown).

The outputs of control unit 21 control the following signals:

Lines 48 provide control signals for the individual control valves of the brake control unit 10, which take care of the activation (opening or closing) of the valves. Given certain conditions of the system, a line 50 inhibits the dynamic brake.

A line 46 provides a control signal for the friction brake for the supervisory unit 22. The already mentioned lines 42 and 44 are used for an exchange of signals between control unit 21 and supervisor 22, dealing with wheel rotation and wheel slip protection (WSP), and the signals of the pressure transducer (PTR). The general output signal of supervisor 22, representing the final results of the supervisory function, is transmitted to the control unit 21 by means of line 34.

Supervisor 22 has the following additional inputs:

A line 52 transmits a signal ($P_{sw}$) from the brake control unit 10, defining the position of the pressure switch (not shown). Lines 54 and 55, respectively, inform the supervisor 22 whether the brake was manually or electrically isolated, respectively. In addition, inputs of the supervisor 22 are also connected with the aforementioned lines 40 and 48. Finally, the supervisor 22 receives, by way of lines 59 and 60, respectively, signals of the other brake control unit 23 and the other brake control unit 11, respectively. They are in particular the solenoid value activation signals of the other brake control unit, as well as signals of the pressure transducer (and of the pressure switch) of the other brake control unit 11.

In addition, supervisors 22 and 24 are connected to each other with an additional line 61, transmitting signals for a mutual check. Finally, the supervisor 22, by means of a line 58 furnishes a signal for an electric cut-out of the brake control unit 10, and an information signal, by way of a line 62, to a control panel, or to the train operation, respectively.

As mentioned above, the control units 21 and 23, respectively, and supervisors 22, 24 respectively are of identical design and therefore receive comparable signals from comparable lines. A detailed description of control unit 23 and of supervisor 24, therefore, is unnecessary. In a brief summary, the following pairs of lines correspond to each other: 26-27; 28-29; 32-33; 34-35; 36-38; 37-39; 40-41; 42-43; 44-45; 46-47; 48-49; 50-51; 52-53; 54-56; 55-57; 58-59; 59'-65; 60-64; 62-63.

In a short summary, the control units 21, 23 formed from the microcomputer perform the following functions, or, respectively form the following subroutine from appropriate software:

In a decoder the incoming signals are decoded and given a suitable format. The aforementioned Intel single board computer, includes suitable A/D converter means for making the conversion.

In one first subroutine the vehicle weight is considered, which means that the finally produced brake force is modified in dependence from the vehicle weight or the load, respectively. In a second unit, the brake force is modified so that the jerk, i.e. the temporal modification of the reduction in vehicle speed is limited.

In a third subroutine the acceleration is corrected.

In a fourth subroutine, a check of the integrity of the system is performed and a total system failure is indicated.

A fifth subroutine has a wheel slide/spin protection function which, in a commonly known manner, effects the brake system so that a slippage or a spin of the wheels of the vehicle are prevented.

The following relates to FIG. 2. It is a schematic drawing of the hydraulic unit of the brake system of the invention. The same symbols (1 to 20) as in FIG. 1 relate to the same parts. All electrical lines have been omitted for clarity's sake. The hydraulic power unit 9 contains a reservoir 71 with a sensor 72 measuring the hydraulic level. Two pumps 73, 74 respectively, one of which may be driven, for instance from 37.5 v dc, and the other from a 3 phase, 220 Vac, supply pressurized hydraulic fluid to an accumulator 77 by way of a common pipe into which a shut-off valve 75 and a filter 76 have been inserted. Pressure switch 78, controls the pumps to maintain a stable supply pressure. A pressure gauge 82, is also provided. From there, the fluid goes to pressure line 12, by way of a hydraulic fuse 79. A shut-off valve can be use to connect the pressure line 12 directly with the return line 13, in order to release the supply pressure.

The respective outlets of pumps 73 and 74 are also connected with the aforementioned pressure line, by way of check valves 80. Finally a relief valve 81 is inserted into the pressure line, before the mentioned shut-off valve 75, the outlet of which leads back into the reservoir 71 by way of a short return line.

The pressure line leads to the two identically designed brake control units 10, 11 respectively. At the entrance to the brake control unit 11, a check valve 87 is provided, its outlet leading to a manually operable cut-out valve 89. By means of this valve 89, the pressure line within the brake control unit 11 can be directly connected with the return line 13. The pressure line leads from this valve 89 to an accumulator 88, a pressure switch 90 being provided before, located in a stub line, said pressure switch 90 monitoring the supply pressure. By way of a filter 99 the fluid then reaches the brake control valve 84. This control valve will be described in detail in connection with FIGS. 3, 3A and 6. The pressure transducer 85, previously mentioned in several instances, is attached at this said control valve. Through a cut-out valve 86, the hydraulic fluid is then fed to lines 16, 17 respectively. An additional outlet of the cut-out valve 86, as well as corresponding connections of the control valves 84 are connected with the return line 13.

Finally, a pressure switch 91 is provided in the shared section of the pressure lines 16 and 17 within the brake control unit 11, monitoring the pressure of the brake actuators.

Inasmuch, as mentioned above, the brake control units 11 and 10 are of identical design, detailed description of the latter is superfluous.

Pressure line 12 and the return line 13 are also connected with the parking brake unit 20. In detail, the pressure line 12 is connected with an accumulator 97 by way of a check valve 98, from said accumulator the hydraulic pressure means being introduceable to parking brake valves 94, by way of a pressure limiting valve 95. The parking brake valves 94 are also connected with the return line 13. The parking brake valve outlet is connected to a branch line by way of a flow control valve 93, hydraulic fuse 92 being built into its outlet lines. The outlet of these hydraulic fuses 92 is connected with the parking brake lines 18, 19 respectively. A pressure switch 96 is built in between the parking brake valve 94 and the flow control valve 93.

It is obvious to anyone skilled in the art that all measuring devices, such as, for instance, pressure switches and transducers, respectively, and all electrically operable valves are connected by electrical wires, as they have been described in connection with FIG. 1. For instance, line 41 (FIG. 1) is connected to the pressure transducer 85 (FIG. 2). In a similar manner, the lines 49 (FIG. 1) lead to the brake control valves 84, etc.

FIG. 3 is a schematic circuit diagram of the brake control valve. The symbols relate to the parts shown in FIG. 2. The pressure line leads to inputs of electro-magnetiiclly activated control valves 100 and 101, which function as inlet valves, said pressure line passing through a spring-loaded pressure limiting valve 108 which, in the event that pressure increases above a pre-determined level, closes the pressure line 12 and connects the pressure line 12A with the return line 13. The two aforementioned valves 100 and 101 are two-position valves which, in their quiescent state, i.e. whenever electric energy is cut off, are held in their open position by the power of springs 104, 105, respectively. The passage of these valves have different cross sections, as indicated by an orifice 109 in valve 101.

Whenever valves 100 and 101 are activated electromagnetically, they change into a closed position.

Thus, in the quiescent state of valves 100 and 101, the hydraulic fluid flows through line 12, the pressure relief valve 108, line 12A and valves 100 and 101 to a line 106, connected to both outlets of valves 100 and 101, and being connected with the pressure lines 16 and 17 and the calipers 7, 8 respectively. The pressure transducer 85 is inserted in line 106.

In addition, an "elasticity" 107 is inserted in this line, by way of a stub line, which will be described in detail in connection with FIG. 6. It is the function of this elasticity to reduce the overall stiffness of the hydraulic system between the brake control valve and the brake actuator.

Line 106 is additionally connected with inputs of two additional solenoid control valves 102, 103 which function as outlet valves. These valves are held in their closed position by springs 110 110', respectively. In their open position, these valves also have different sized openings, as indicated by orifice 111 in valve 103.

In the quiescent state of the valves 100-101 as shown in FIG. 3, the hydraulic fluid flows through valves 100-101 directly to the brake calipers 7, 8 respectively. By a parallel switching of the two valves 100 and 101 the pressure thereby can increase relatively quickly, i.e. with a steep gradient. In one of two valves 100 or 101, respectively, are energized, while all other valves remain in their quiescent state, the reduced cross sections of the opening results in a slower pressure increase. By a selective use of valves 100 or 101 the speed of the pressure increase can be changed, inasmuch as the two valves have different opening diameters.

If inlet valves 100 and 101 are energized, while outlet valves 102 and 103 remain in their quiescent condition, the line 106 is blocked entirely from the pressure line 12 and the return line 13, so the the previously existing pressure will remain constant. If, subsequently, both outlet valves 102 and 103, or one of them, respectively, are energized, the corresponding valve will open, so that the fluid can flow from line 106 to return line 13.

Dependent on the available cross section of the opening provided by the energized valves, the pressure will fall quickly or slowly.

FIG. 3A shows a similar circuit for the brake control valves. The same reference symbols as in FIG. 3 indicate the identical parts.

When compared to FIG. 3, this drawing contains an additional manual 160 and one electrical cut-out valve 168, and the pressure switches 162 and 167, as well as various check valves and one filter. In particular, the fluid simultaneously reaches, through a supply line 12, into which a check valve has been inserted, an accumulator 161, a pressure switch 162 and parallel arrangement consisting of a filter 163, a filter indicator 164 and a check valve 165. The pressure switch 162 is identical to the above mentioned pressure switch for the monitoring of supply pressure.

From the filter 163 the fluid reaches the solenoid valves V1 and V2 through a valve 168', which corresponds to valve 108 in FIG. 3. The common outlet line of these valves passes through the electrical cut-out valve 168 to lines 16 and 17, while, with an activated cut-out valve 168, the common line of 16 and 17 is connected with the return line 13. At the outlet of the electrical cut-out valve 168, pressure switch 167 is connected to the line 16, the said pressure switch monitoring the pressure of the calipers. In addition, lines 16 and 17, by way of check valve 166 are connected with the outlet of the manual cut-out valve 160.

The rest of the functions of the brake control valves shown in FIG. 3A correspond to those in FIG. 3, so that a detailed description is not necessary.

Figure 4A:
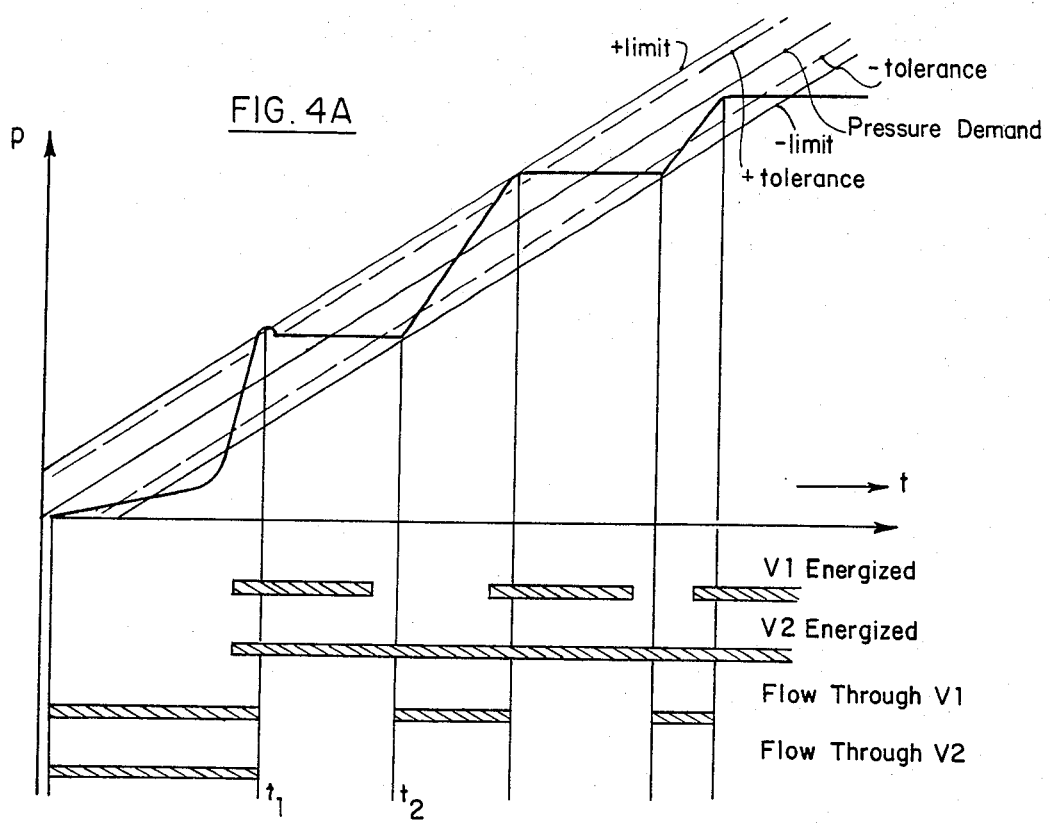
FIGS. 4A and 4B show the temporal change in the hydraulic pressure as a function of the position of the individual valves.
Figure 4B:
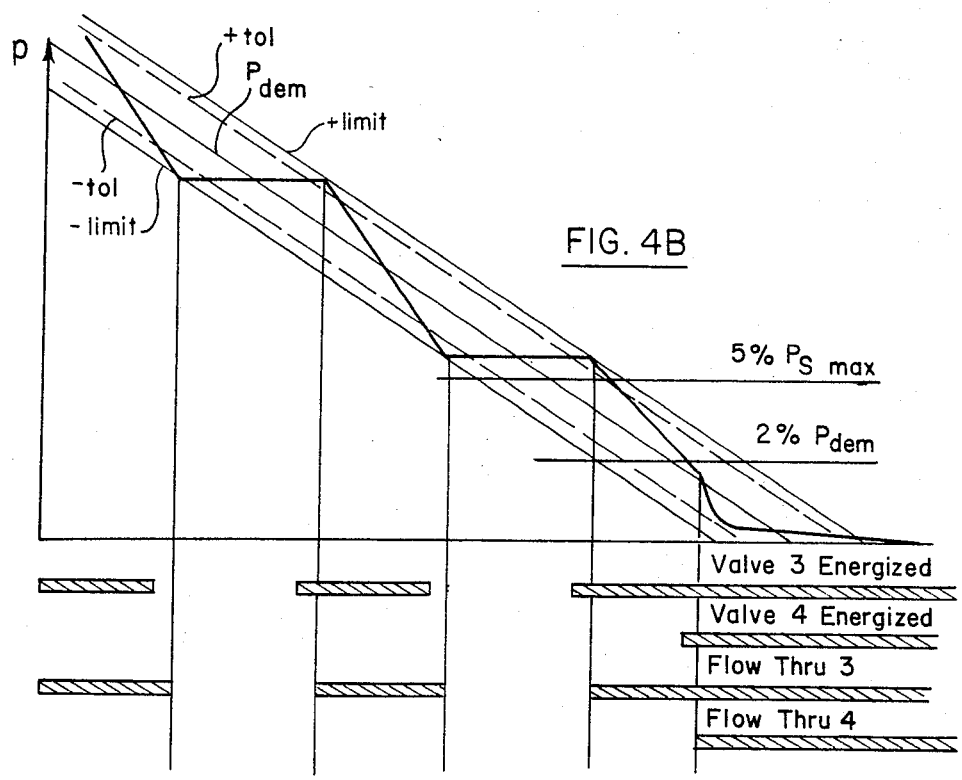

FIG. 4A shows the temporal course of the caliper pressure in dependence from the activation of the individual solenoid valves during a phase of pressure build-up; FIG. 4B shows a corresponding situation for a pressure reduction phase. Line $P_{dem}$ shows the temporal course of the demanded pressure, while lines +limit and −limit refer to acceptable tolerances around the demanded pressure. The course of pressure is to remain within the two "lines of limit". In the presence of a demand for a pressure increase the valves V1 and V2 are de-energized, i.e. they are open, so that fluid passes through them. The pressure increases according to the nonlinear characteristics until it reaches, coming from below, the line +tol. At that moment, the valves V1 and V2 are energized and thereby closed. Because of delays in response and system inertia, the valves remain open for a short period of time after being energized, to point $t_1$, so that the pressure can continue to rise. The pressure rises slightly above the line +tol, as is shown. Then, the pressure will remain constant since all valves will be closed. The +tol, −tol boundaries are selected such that with the response delays described above, the pressure remains within the +limit, −limit boundaries.

As initially mentioned, the two valves V1 and V2 are activated only during the first pressure inshot phase, and subsequently, only valve V1 is activated, while valve V2 remains closed.

As the lower tolerance line −tol intersects with the constantly maintained pressure, V1 is de-energized, whereupon, at the point $t_2$, and after a corresponding response delay, valve V1 opens, permitting a further increase in pressure.

It may be pointed out that at the moment of $t_2$, the pressure transducer measures the pressure since at that moment, it is certain that possible pressure fluctuations have subsided and the pressure has stabilized. The pressure obtained at $t_2$ is then retroactively associated with $t_1$.

The subsequent pressure increase takes place in steps by the intermittent opening and closing of V1, as is shown in FIG. 4A, until the desired pressure has been obtained when the valve V1 remains closed and the pressure remains static.

The pressure reduction takes place in a similar manner, by way of valves V3 and V4, as is shown in detail in FIG. 4B. During a normal pressure reduction, only valve V3 is alternately opened and closed, while valve 4 always remains closed. Only below a present pressure, which, as an example, may be at 2% of maximum, is valve V4 also opened, since, because of the then existing very minor pressure difference, a complete pressure release through one valve only would take too long.

As initially mentioned, the two outlet valves V3 and V4 can be opened at the same time even if the pressure is still within the higher valve ranges, if a very quick reduction of the brake pressure is required whenever the wheels begin to slide.

Figure 5:
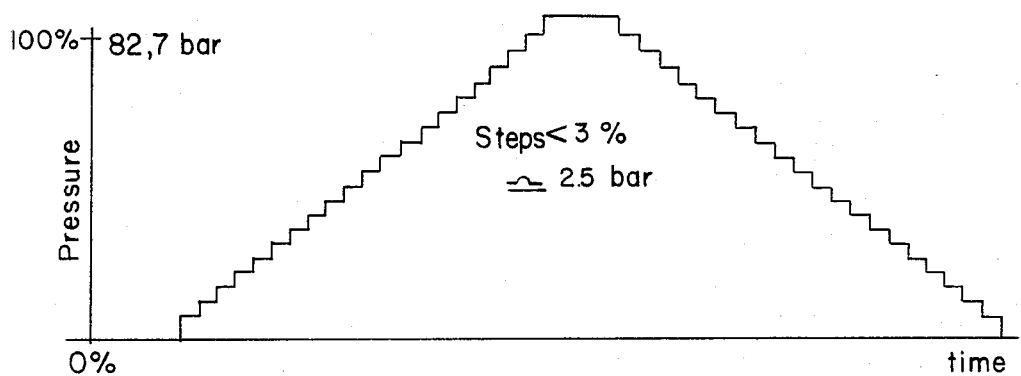
FIG. 5 shows the temporal change in the hydraulic pressure with a linear change of the pressure demand, i.e. resolution property.

FIG. 5 shows the time sequence of a pressure increase or pressure decrease indicating that the pressure is increased or decreased, respectively, in steps of less than 3% of maximum pressure, approximately 2.5 bar.

FIG. 6 shows a schematic section of control valves 84 of FIG. 2, or FIGS. 3 and 3A respectively.

The same reference symbols as in FIGS. 2, 3 and 3A refer to the same parts. The control valve 84 has a housing 115 with built-in inlet valves 100 and 101, and also outlet valves 102 and 103. The housing contains, in addition, the pressure limiting valve 108, the "elasticity" 107, as well as an additional relief valve 113. The fluid flows through line 12 into the normally opened pressure limiting valve 108 and from there through a line 116 to the two inlet valves 100 and 101. The cross sections of the inlet openings of these valves are precisely defined by orifices 109' and 109, respectively. In the embodiment shown, these valves are designed as ball valves 117 and 118, respectively, closing or opening a corresponding valve seat. If the inlet valves 100, 101, respectively, are not activated, i.e. their magnet coils 137, 138, respectively, are not electrically energized, the corresponding armatures 141, 142, respectively, of the valves are in the upper position as shown (by virtue of the hydraulic pressure), and activating rods 145, 146, respectively connected with the armatures 141, 142, respectively, release the ball valves 117, 118, respectively. Thus, the fluid can flow from line 116, through the ball valves to lines 106, 119 and 120, the latter two being connected with each other across and through the inlet valves 100, 101, respectively. From line 106, the fluid reaches lines 16, and 17 and the calipers. The mentioned cross-connection between lines 106, 119 and 120 does not depend on the position of the inlet valves and is guaranteed at all times, so that in these lines there is always the same pressure. Line 120 is by way of a branch line connected with a line 151, to which outlet valves 102 and 103 are connected in turn. In addition, line 151 leads out of the housing 115, and pressure transducer 85 is connected at that point.

Outlet valves 102, 103, respectively, are also designed as ball valves 121, 122, respectively, and during the electrically de-energized phase of the magnet coils 139 and 140, respectively, they are closed. At their inlet (from line 151) the above outlet valves 102, 103, respectively, also have precisely defined cross sections formed by orifices 111', 111 respectively. The armatures 143, 144, respectively of the outlet valves 102, 103 respectively, are in their upper position in the quiescent state as shown so that the activation rods 147, 148, respectively, connected with the armatures 143, 144, respectively, will free the ball valves 121, 122, respectively, so that they may assume the closed positioned as shown, under the action of the springs, 121A and 122A, respectively. The outlet side of the outlet valves 102, 103, respectively, is connected with a common line which is in turn connected with the outlet line 13.

The outlet line 13 also leads to an outlet from the relief valve 113. The inlet to this safety valve 113 is connected with the pressure line 151. The safety valve 113 has a spring-loaded piston which, given the increase of pressure above a preset level, connects the inlet, i.e. the line 151 with the outlet, i.e. line 13, so that the fluid can flow out of line 151 and the connected lines to return line 13.

The so-called "elasticity" 107 is connected to line 120 with its inlet opening. The surface of a piston 126, sealed off by an O-ring 127, receives the pressure in line 120 and displaces the piston which is under spring 128 tension (in FIG. 6 to the right). Variations in system pressure therefore cause displacement of the piston 126 thus reducing the stiffness of the system. In addition, the line 120, by way of a line 129, is also connected with the pressure limiting valve 108. In detail, this pressure limiting valve is designed as follows:

From line 129, fluid acts upon a piston 130. The piston 130 is spring loaded by a spring 131, and has a bore 132 through which the fluid may enter from line 129. From there, the pressure fluid passes through the interior diameter of an O-ring 133 and reaches a valve tappet 134. This tappet 134 is guided and properly sealed and also connected with a valve 135 which is able to separate the pressure line 12 from the pressure line 116. If the pressure in line 129 rises above a pressure which is preset and determined by the spring 131 and the resulting surfaces under spring tension, the valve tappet 134 is displaced towards the left. In this manner, the displacement of the valve tappet 134 closes the valve 135, so that no additional fluid can supplied from pressure line 12.

In the position as shown in FIG. 6, the pressure fluid flows from the pressure line 12 by way of the pressure limiting valve 108 through the opened inlet valves 100, 101, respectively, to line 106 and lines 16 and 17 to the calipers. If a current flows through coils 137 and 138, i.e. if they are energized, the armatures 141 and 142 are pushed downward, causing the activating rods 145, and 146 to close the ball valves 117 and 118, respectively. Since the outlet valves 102 and 103 in this position are still closed, the pressure in the entire system is kept constant. If then, in addition, the outlet valves 102 and 103 are energized, i.e. if the coils 139 and 140 are actuated by an electric current, the armatures 143 and 144 are pushed downward, causing the rods 147 and 148 to open the globe valves 121 and 122, so that the pressure fluid from line 141 may flow towards line 124 and ultimately to the return line 13.

Finally, it may be mentioned that the electrical connections without symbols leading to magnet coils 137, 138, 139 and 140 correspond to lines 48, 49, respectively in FIG. 1.

FIG. 7 is a similar basic diagram of the brake system as that shown in FIG. 1. In contrast to FIG. 1, however, the control unit 21 is shown divided into two conceptually different functional blocks 21' and 21", again with one truck system, as an example, being shown in its entirety. The second truck system is shown abbreviated, but illustrates the cross-connections between truck systems.

Functional block 21' has the task of evaluating the distribution of the braking power between the dynamic brake and the friction brake, and of taking the load or the vehicle weight into account. For this purpose, the unit 21' receives the following external signals, the reference symbols of the lines carrying these signals being the same as in FIG. 1:

Line 26 introduce the P-signal and BRK-signal. By way of lines 28 and 29 a signal proportional to the vehicle weight is added. Lines 36 and 37 supply signals proportional to the rotational speed of all four vehicle axles. Finally, line 32 provides a feed-back signal proportional to the amount of dynamic brake (DBFB-signal). These aforementioned signals are external signals, coming from sensors, external control equipment or similar instruments. In addition, unit 21' receives "internal" signals, coming from the components of the system shown in FIG. 7.

On line 40', feedback signals (FBFB) of the friction brake are introduced. These signals provide information regarding the application of the friction brake and may, as an example, come from the pressure transducer. It is understood that other possibilities could exist by means of which the extent of the braking power of the friction brake could be determined.

Unit 21' processes the above mentioned input signal to output signals as follows:

On line 50 there will be a control signal (DB) given for the dynamic brake. Line 46 will carry a control signal (FBC) for the friction brake to unit 21" as well as to the supervisor 22. Finally, by way of lines 36 and 37, signals proportional to the rotational speed of the wheels are given to unit 21'.

In addition, an exchange of signals between the unit 21 and the supervisor 22 takes place via lines 42 and 44. The unit 21" receives the above mentioned signal (FBFB) by way of line 40', said signal simultaneously being given to the supervisors 22 and 24.

The control signals for the solenoid operated control valves are output from unit 21" as lines 48, which then lead to the hydraulic system 20, 9 and, more particularly, the brake control unit 10 (FIG. 1). The remaining lines and signals are shown in FIG. 1, so that a more detailed discussion is no longer necessary.

It must be emphasized that the units 21' and 21" and supervisor 22 are formed and controlled by a single microprocessor based unit. The interconnecting lines shown in FIG. 7 do not exist in hardware, but are included to show conceptual interfaces and transmission of data.

The following flow diagrams, shown in FIGS. 8 to 11, indicate the functional operation and software logic implementated by units 21 and 22, and 23 and 24 respectively, of FIG. 1 and of the corresponding units of FIG.

7. Using these flow diagrams, the realization of control by these components is easily possible. Microprocessors may be programmed using routine programming techniques for this purpose.

In the following flow charts (system logic diagrams) and related description, it is assumed that the brake and pressure signals have already been interpreted and modified by the microprocessor to include the feedback signal relating to the dynamic brake effort and the signal representing the vehicle weight, to give a friction brake demand signal $P_{dem}$.

In general, the following functions are provided:

I. Control Functions
1. Normal (feedback controlled) brake application (FIG. 9A)
2. Nomal (feedback controlled) brake release (FIG. 9B)
3. Check for initiation of open loop control (FIG. 9C)
4. Open loop brake application (FIG. 9D)
5. Open loop brake release (FIG. 9E).

II. Supervisory Functions
1. Supervision of brake release (FIG. 11A)
2. Supervision of brake application (FIG. 11B)
3. Check of brake hold phase (FIG. 11C)
4. Check of pressure transducer (FIG. 11D)
5. Check and adjust of transducer at "zero" pressure (FIG. 11E)
6. Check of open loop system (FIG. 11F)
7. Fault check of brake control valve (FIG. 11G)
8. Check of brake control valve solenoid current
9. Check of wheel spin/slide protection system.

III. Cross-Checking Functions
1. Check of solenoid valve currents (control commands for a simultaneous application and release of brakes must not occur, with exception of the "flushing routine".)
2. Check of correlation between pressure demand and response during brake application and release.
3. Check that the brakes of both trucks of the vehicle are not isolated simultaneously.

The individual logic diagrams are drawn on several sheets in some instances, to make them more easily readable. The drawings are numbered in consecutive arabic numerals appearing after the number of the figure. In order to complete the figure the individual sheets must be continued along the corresponding points of connection.

FIG. 8 (FIGS. 8/1 and 8/2) is a general logic diagram of the normal control and open loop control processes of the brake system of the invention. Generally, five different normal control and open loop control functions are performed namely the nomal, i.e. feedback controlled brake release (Block 810), the normal, i.e. feedback controlled brake application (Block 809), the initiation of open loop control (Block 812), including especially the establishment of a defined reference pressure, as well as the open loop brake release (Block 814) and the open loop controlled brake application (815). Finally, the cutout operation of the brake system (Block 817) may be considered as being an additional function. The individual functions are selected in dependence of various faults. Five levels of faults have been determined, a "supervisory system" selecting the values from 0 to 4.

The open loop control or normal control process, respectively, begins at block 801. In block 802 it is determined whether a pressure demand from block 803 (compare signals of line 26 in FIG. 1) is present, and whether the supervisor 22 has determined a fault. In doing so, the supervisor unit 22 distinguishes five different conditions:

Condition "0" indicates, that the operation is normal and undisturbed.

Fault "1" means that the wheel spin/slide protection system is defective, but that no other fault is present, adversely influencing the brake system. This fault is transmitted to Block 804 (wheel slip protection WSP; compare unit 21" in FIG. 7).

Fault 2, which will be discussed in greater detail below, indicates that a normal operation of the brake system is still possible; but that should an additional fault occur, the system is to go to Fault 4.

Fault 3 indicates that the system is defective to such an extent that a normal braking operation with a closed loop is no longer possible. The system goes to open loop control.

Fault 4 indicates that open loop controlled braking is no longer possible and that the system must be isolated. In Block 805 these faults are reported to the train operator or another remote control unit. From Blocks 803 and 805 the system goes by way of Block 802 to a check Block 806, which determines whether the aforementioned fault status is less than or equal to 2. If this is the case, the system pressure is measured in Block 807 (compare pressure transducer 85). In an additional check, Block 808, it is determined whether the pressure demand $P_{dem}$ is greater than or equal to the brake caliper pressure $P_{sys}$. If the demanded pressure is greater than the system pressure, the brake pressure is increased by Block 809, which means that the brakes are applied. Additional details will be discussed in connection with FIG. 9A. If, however, the demanded pressure is less than the system pressure, the system pressure is reduced in Block 810, which means that the brakes are released. Details will be discussed in connection with FIG. 9B.

If the check in Block 806 reveals, however, that the system status is greater than fault 2, Block 811 checks whether fault 3 applies. If this is the case it is necessary to switch to open loop control, as has been mentioned before. Should this situation prevail, Block 812 will initiate open loop control and the reference pressure mentioned will be established. When this initiation check is positive, Block 813 checks again whether the demanded pressure is greater than or equal to the actuator pressure, or not. Dependent upon the result of this check, the system goes to Block 814 or 815 where the brakes are released or applied by means of open loop control. The individual routines are described in connection with FIGS. 9E, and 9D, respectively.

If, however, the integrity check of Block 812 should reveal that the open loop control datum has not yet been established control returns to the start position by way of Block 816.

If the check of the fault in Block 811 should find that the fault 3 does not exist, it means that fault 4 prevails and therefore, that the system no longer is operative. In this case, brakes are cut out by Block 817 and the system isolated, by the operation of the electrical cutout valve 168 of FIG. 3A. This operation does not affect the other truck brake system of the vehicle (rather it is protected since a hydraulic leak in one system would ultimately degrade the other truck system performance). Further, the other vehicles of the train are not affected by this brake isolation.

It may be mentioned here, that the prevailing fault is annunciated from the supervisory unit 22, through line 61, to other supervisory unit, and, through line 62, dependent upon the system used, respectively, to a vehicle control panel, to the train operator or a local indicator.

FIG. 9A (FIGS. 9A/1 and 9A/2) shows the functions of Block 809 in FIG. 8, i.e. the steps during a normal operation of applying the brakes, or, respectively increasing the brake pressure.

In the following figures, valve 1 and valve 2 indicate the inlet valves 100 and 101 (FIGS. 3 and 6), while valve 3 and valve 4 refer to the outlet valves 102, 103, respectively.

In order to improve passenger comfort, vehicle deceleration is controlled in a jerk limited manner. This is implemented in the control system by limiting the rate at which brake effort (pressure) is able to change.

During an emergency, or during potential wheel slide conditions the jerk limit function can be inhibited.

During an nonjerk-limited brake application, both inlet valves V1 and V2 remain open, as described in connection with the initial pressure inshot of FIG. 4A. Brake pressure is controlled by a feedback signal of the measured pressure value. The pressure transducer signal is continuously checked against the demanded pressure $P_{dem}$, and its corresponding tolerances, in a similar way to that shown in FIG. 4.

During jerk-limited operation, however, as described in connection with FIG. 4A, inlet valves V1 and V2 are used simultaneously only during the first inshot operation. Control during this operation is on a pressure updated time basis and is not directly dependent on the pressure feedback signal.

As a result of the physical remoteness between the pressure transducers and the brake actuators, during periods of fluid flow there exists a discrepency between the pressure measured by the transducer and the actuator pressure. This discrepency is due to the loss in pressure resulting from pipe friction during fluid flow and under high velocities can be significant.

In order to maintain accurate control, the invention incorporates an adaptive feature to enable pressure control under these circumstances. The target inshot pressure value and an initial inshot time are included in the microprocessor read only memory (ROM). Following a brake application demand valves V1 and V2 are opened for the initial inshot time and then closed. The pressure and the valve operation time are then written to random access memory (RAM) indicated by table 915. Following the next demand for brake application from zero pressure the result of the previous inshot operation is read from RAM and compared with the target value. The time for the next inshot operation is increased, decreased or exactly repeated depending upon the result of this comparison. If for example, the previous inshot pressure was too high then the next inshot time is reduced. Upper and lower boundaries are provided to limit the inshot time. This sequence of events is repeated, the established actuator pressure being continuously updated together with the corresponding valve operation times. Thus the system is able to adapt to the changing physical characteristics of the hydraulic system which occur, for example, as the fluid temperature varies. In order to smooth this adaptive process, the use of three previous consecutive inshot operations is used as a basis for updating valve inshot operations. This technique can additionally be applied to control throughout the whole operating pressure range of the hydraulic system.

One particularly important function of the invention is further realized by the provision of the look-up table 915 into which during normal operation, i.e. application and release using closed loop control, various values are entered. This look-up table has space for three sets of data for all pressure ranges with about 30 pressure levels. Pressure is measured after the system has stabilized. The measured value is then related to the time of the change of state of valve condition, values of pressure and time are written into the table and are continually updated so that they can be referred to for use under open loop control if this is necessary. This table corresponds to the RAM storage in microprocessor 30. The look-up table also records when the pressure switch 91 changes state.

During a jerk limited brake application, the pressure is compared against $P_{jerk}$ plus tolerance when the inlet valves are open, i.e. when the pressure is rising. Correspondingly, the measured pressure is compared against $P_{jerk}$ minus tolerance when the valves are closed, i.e. when the pressure is stable. Values for the tolerances are preset, to allow for the valve response times, and therefore to control to acceptable pressures.

The instantaneous jerk-limited pressure demand (Pressure: $P_{jerk}$) is calculated as follows:

$$P_{jerk} = R \cdot t + P_{old}$$

where
  R is jerk rate, indicating the permissible change in pressure in bar/sec (for instance, 56 bar/s).
  t is time elapsed since change in pressure demand $P_{dem}$,
  $P_{old}$ is system pressure at the time of change of $P_{dem}$.

It must be pointed out that the jerk limited pressure demand $P_{jerk}$ is not computed in the following flow diagrams. This calculation takes place in a subordinate routine in the microprocessor.

Jerk limiting is provided for brake release as well as for brake application. Normally, jerk limiting is cut out only during activation of wheel slip protection. Whenever the jerk limiting is inhibited, both outlet valves V3 and V4 operate simultaneously. Pressure regulation again is performed via a feedback through the pressure transducer, the signal at which is checked against the demanded pressure $P_{dem}$ and its tolerances.

For a jerk limited bake release only outlet valve V3 operates. The jerk limited pressure demand is again computed in accordance with the above equation. With the outlet valves open, the measured pressure is checked against $P_{jerk}$ minus tolerance, while with closed outlet valves, the check is made against $P_{jerk}$ plus tolerance.

Because of the tolerances of the actuator pressure which will be described further on, a test must be made of $P_{dem}$ against the value zero, to prevent the actuator pressure being held at $P_{dem}$ plus its tolerance. The check tests in detail whether $P_{dem}$ is less than 2% of maximum and whether the system pressure is also less than 5%. Under this situation outlet valves V3 and V4 are both opened, so that the pressure may fall quickly to its minimum.

In the same manner as for the pressure increase, the look up table is used to store pressure and valve operation times. Accordingly, spaces for three sets of separate data are provided through pressure ranges for approximately 30 levels of pressure. Pressure is measured at the moment when the outlet valves change their state, and is written to the table, as described above.

The following is a more detailed description of FIG. 9 which described a normal brake application.

In Block 901, valves V3 and 4 are de-energized, to ensure that the outlet valves are closed. Block 902 checks whether a demand for jerk limiting exists. If this is not the case, Block 903 checks whether the system pressure is greater or equal to the demanded pressure minus a tolerance (tol.). If this is not the case, the pressure must be increased, Block 904 de-energizes valves 1 and 2, until the conditions of Block 903 are met. Control then returns through Block 905 to the start position (possibly Block 809). If the check of Block 903 determines that the system pressure is greater than the demanded pressure, minus a tolerance, valves 1 and 2 are energized in Block 906, preventing further pressure rise, and maintaining stable pressure. Control returns through Block 907 to the start position.

If a check of Block 902 reveals, that a demand for jerk limitation is present Block 908 checks whether the system pressure is greater than the inshot-pressure ($P_{inshot}$). If this not the case, Block 910 checks whether a clock, giving time-synchronous impulses, is running. If this clock is not running, it is started in Block 911. This clock is accomplished by software programming to provide pulses at a predetermined interval based upon the interval clock. Valves 1 and 2 are de-energized in Block 912 and the system goes to Block 913. If, however, it is determined in Block 910 that the clock is already running, control goes directly to Block 913. Control continues to a Block 914 in which a delay time for inshot operation $t_d$ is read from the memory, table 915. Block 916 checks whether the time elapsed (since starting the clock) is longer than the delay time $t_d$ read from table 915. If this is not the case, the control returns to the start position by way of Block 917. If the time criteria have been met, however, Block 918 energises valves V1 and V2 and Block 919 writes, and stores in the table, the inlet valve closing time and the stabilized system pressure $P_s$. Then, Block 920 resets the clock, i.e. it puts it into its zero position, and control returns to the starting position through Block 921.

Although not shown by the diagram it is necessary to inhibit pressure measurement during operation of the inshot routine. Pressure is measured subsequently, following closing of the valves and pressure stabilization.

If a check of Block 908 should indicate that the pressure $P_s$ is greater than the pressure $P_{inshot}$, Block 922 ensures that valve 2 is continuously energized, to allow a reduced rate of pressure increase. The value of $P_{inshot}$ is selected to ensure normal control with valve V1 following sequencing of the inshot routine described above. Then, Block 923 checks whether the system pressure is greater than the demanded pressure minus a tolerance. If this is the case, Block 924 additionally energizes valve 1, so that both inlet valves are closed. In Block 925 the corresponding values are again written in the table 915 and control returns to the starting position via Block 926.

If the check of Block 923 is negative, Block 927 checks whether valve 1 is energized. If this is the case, Block 928 checks whether the system pressure is greater than or equal to the jerk limited demanded pressure minus a tolerance, $tol_3$. If this is the case, control returns to the starting position via block 929 leaving V1 energized. Should this not be the case, Block 930 again writes corresponding values in table 915. Subsequently, valve 1 is de-energized in Block 931 and control returns to the starting position via Block 932.

If it is determined in Block 927 that valve 1 is de-energized, Block 933 checks whether the system pressure is greater than or equal to the jerk-limited pressure demand, plus the jerk tolerance $tol_3$. The tolerances are selected to allow for the response times of the valve. If the check of Block 933 is negative, control returns through Block 926 to the starting position. If the check of Block 933 is positive, Block 934 will energize valve 1 and in Block 935 the corresponding values are again written to the table 915. Additionally, in this instance, Block 936 checks whether the pressure switch (91 in FIG. 2, respectively 167 in FIG. 3A) has changed state. If this is the case, the pressure $P_{sw}$ at which the pressure switch has changed state, will again be written in the table 915 at Block 937. From there, control returns to the starting position via Block 938. If the pressure switch has not changed state, control directly returns from Block 936, via Block 938', to its starting position.

It may be noted here, that various tolerances may be used, tolerance $tol_1$ relating to a fluid flow through two valves, while tolerance $tol_2$ relates to a flow through only one control valve. Finally, the above mentioned tolerance $tol_3$ applies to the jerk demand.

In connection with table 915, it should be mentioned that it may contain, say, three pressure values at for instance, 30 levels of pressure. Valve operation times and corresponding system pressures are written to the table. The corresponding values of pressure and time are updated in the individual table blocks, and are called from there, as discussed in connection with inshot and open loop control.

FIG. 9B (FIGS. 9B1 and 9B2) shows the routine for the normal operation of a brake release (compare Block 810 of FIG. 8).

In Block 940 valves 1 and 2 are energized, isolating the pressure supply and preventing further pressure increase. In Block 941 a check is made to detect if jerk limiting is requested. If this is not the case, Block 942 checks whether the demanded pressure is lower than 2%. If this is the case, valves 3 and 4 are energized by Block 943, opening the release valves. From there, control returns to the start position via Block 944.

If, however, check of block 942 reveals that the demanded pressure is greater than 2%, block 945 checks whether the system pressure is less than or equal to the demanded pressure plus a tolerance. If this is the case, valves 3 and 4 are de-energized by Block 946, causing the release valves to close. Subsequently, control returns to its starting position via Block 947.

If, however, check of Block 945 indicates that the system pressure is higher than the demanded pressure plus tolerance, valves 3 and 4 are energized by Block 948, causing the release valves to open. Control returns to its starting position through Block 949.

If the check of Block 941 indicates that the demand is for a jerk limited brake release, Block 950 checks whether the demanded pressure is less than 2% of maximum. If this is not the case, the system goes through Block 951 to Block 952, where valve 4 is de-energized and therefore closed. Then, Block 953 checks whether the system pressure is less than or equal to the demanded pressure plus its tolerance. If this is the case, valve 3 is de-energized by Block 954, and, by way of Block 955 the values of the pressure and corresponding time elapsed are again written in table 915. Then, control returns through Block 956 to the starting position. If a check of Block 953 reveals that the system pressure is greater than the demanded pressure plus tolerance, Block 957 checks whether valve 3 is energized. If this is not the case, Block 958 checks whether the system pressure is greater or equal to the jerk limited pressure demand $P_{jerk}$ plus tolerance, $tol_3$. Regarding the tolerance, a similar comment applies as was made in connection with Block 933 of FIG. 9A.

If the check of Block 958 is positive, through Block 959 the corresponding values are written in the table 915, and subsequently in Block 960 valve 3 is energized and control returns through Block 961 to the starting position.

If the check of Block 957 determines that valve 3 is already energized, Block 963 checks whether the system pressure is less than the jerk limited pressure minus the tolerance. If this check is negative, control returns through Block 964 to the starting position. If this check is positive, however, valve 3 is de-energized in Block 965, and through Block 966 the corresponding values are written to table 915. Then, a check is made in Block 966a, whether the pressure switch has changed state. If this is the case, Block 966b writes the pressure $P_{sw}$ at which the pressure switch has changed state, in the table. The elapsed time of the change in pressure switch condition is also entered. Then, control returns to the starting position through Block 967. If the pressure switch has not changed state, control returns directly through Block 967 to the starting position.

If the check of Block 950 is positive, i.e. the demanded pressure is less than 2% of maximum, Block 968 checks whether the system pressure is less than 5% of maximum. If this check is negative, control proceeds to Block 951 and continues to the above described steps. If the check of Block 968, however, is positive, valves 3 and 4 are both energized by Block 969, the corresponding pressures again being written to the table 915 by way of the step 970, control subsequently returning through Block 971 to the starting position; the actuator pressure is therefore allowed to fully release through the two open outlet valves V3 and V4, as shown in FIG. 4B. If the additional checks of $P_{dem}<2\%$ and $P_s<5\%$ were not included $P_s$ would be held at $P_{dem}$ plus a tolerance, according to blocks 953 and 954.

The above described routines shown in FIG. 9A and 9B, indicate normal control of brake application and brake release. Following such a cycle, table 915 contains a memory of pairs of values relating system pressure to the corresponding valve operation time. The table can subsequently be read to determine periods of time for which the valves must be energized of de-energized, respectively, in order to change from one actuator pressure to an alternative actuator pressure. Also written in the table is the pressure at which the pressure switch changes state. These stored values can be used subsequently for open loop control.

In order to provide data for open loop control, should this be required before a full brake application and release has been achieved and data thereby written to the memory, a typical pressure/time profile of the system is additionally included in ROM which can be referred to under these circumstances.

One of the components of the system which is most susceptible to breakdown is the pressure transducer, which gives an electrical signal proportional to the actuator pressure. The invention enables the system to continue operation when the transducer is defective.

The pressure transducer is checked by the supervisor using the routine described below, in connection with FIG. 11D.

If the pressure transducer is found to be defective, the system pressure must be established, since the pressure transducer signal can no longer be used. Using the routine described for the initiation of open loop control, as follows, the existing system pressure can be established such that the open loop control may proceed from this known pressure.

To summarize, a check is made whether the demanded pressure is greater or less than 30% of maximum. Dependent upon the result of this check, the actuator pressure is reduced or increased until the pressure switch changes state. In the preferred embodiment of the invention, the pressure switch is so adjusted that it changes state at a pressure of 22 bar. This is then used as an initial reference pressure and starting from this known pressure, the system pressure mauy be increased or decreased as required using open loop control, depending on the demand brake pressure. Inasmuch as the pressure at which the pressure switch changes states is only a temporary reference point, when the demand is less than 30%, all valves may be energized, to allow the pressure to fall to "zero". This value can then be used as a subsequent reference for future open loop control.

FIG. 9C shows in greater detail the described process of establishing the system pressure. When fault 3 has occurred control, according to FIG. 8, goes to Block 812. This Block is the starting point for the final diagram of FIG. 9C.

Starting at the beginning (Block 812, FIG. 9C/2) the demand pressure at Block 803 is evaluated with the fault status and control in the event of fault 3, continues to Block 968, in which, by means of the program flag "FIRST" it is determined whether this is the first or a subsequent cycle at this fault status. If it is the first event a counter in Block 969 sets the program flag "FIRST" to "1". In the following Block 970, the above defined program flag "OLOOP" is set to 1 and a counter is set to 0. From there, control continues through Block 971 to Block 972 which includes a check for the program flag "OLOOP" to 0.

If the check of Block 968 reveals that program flag "FIRST" is greater than 0, control also continues through Block 971 to Block 972.

If the check of Block 972 reveals that the program flag "OLOOP" is at 0, Block 973 checks whether the pressure demand is greater than 30%.

If this is the case, Block 974 checks whether a program flag "COUNT", zeroed by Block 970, is greater than 0. If this is not the case, Block 975 checks the system pressure through the position of the pressure switch. If this check indicates that the pressure is greater than a predetermined value, for instance 22 bar, a program flag "PRESS" is set at 1 (Block 976) and, subsequently, the program flag "COUNT" in Block 977 is set at 1. If a check of Block 975, on the other hand, reveals that the pressure is below the preset value, the program flag "PRESS" in Block 978 is set at 0, and control continues to Block 977 to again set "COUNT" to 1. From there, control proceeds through Block 979, to the decision point at Block 980.

If the check of Block 974 reveals that the program-flag "COUNT" is greater than 0, control goes directly through Block 979 to Block 980. In Block 980, a check is made whether the program-flag "PRESS" is 1. If this is not the case, Block 981 again checks the state of the pressure switch. If this check indicates that the pressure is lower than the switch threshold, control goes to block 982, which initiates a pressure increase, by de-energizing all four valves 1, 2, 3 and 4. By this step, the system pressure is changed through Block 983, the Program-flag "OLOOP" remains at 0. Control then returns through Block 984 to the starting position (or Block 812, if needed). Control continues through Block 982 until a change of pressure switch state is detected by Block 981. The change in pressure switch condition allows control to Block 986 by which the system pressure is equated to the change point of the pressure switch (for instance 22 bar), while, simultaneously the program-flag "OLOOP" is set at 1. From there, control continues to Block 987, which prevent further pressure change by energizing valves 1 and 2 and de-energizing valves 3 and 4. Control returns through Block 988 to the starting position. If the check at Block 980 determines that the program-flag "PRESS" is already at 1, Block 985 also checks the state of the pressure switch. If this check indicates that the actuator pressure is greater than the pressure switch change point, control continues to Block 989, where a pressure reduction is initiated by the energization of valves 1, 2, 3 and 4. The program-flag "OLOOP" remains set at "0" through Block 990. The actuator pressure is still unknown, and control returns to its starting position through Block 991.

Pressure continues to fall until the pressure switch changes state and control is allowed to Block 986 by the decision at Block 985, as described above.

If the check at Block 973 shows that the demanded pressure is less than 30%, Block 992 initiates a brake release. Block 993 checks whether a clock is running, and if not, this is started through Block 994. With the clock running, control then goes through Block 995 to Block 996, by which valves 1, 2, 3 and 4 are energized, so that the system pressure is reduced. Subsequently, a check is made by Block 997 whether, since the start of the clock a time of, as an example, 10 seconds has elapsed. If this is the case, then, in Block 998 the clock is reset, the system pressure is set equal to a reference pressure PR (a value of say, 0,5 bar) and the program-flag "OLOOP" is set at value 2. Subsequently, control returns to the starting position through Block 999.

If, however, it is determined in Block 997 that the time of 10 seconds has not yet elapsed, by Block 1000 the system pressure is also set equal to the reference value, the program-flag "OLOOP" is set at value 1. Through Block 1001 control returns to the starting position.

If the check of Block 972 indicates that the program-flag "OLOOP" does not have value 0, i.e. it has value 1 or 2, "OLOOP" is compared to the value 1 by Block 1002. If "OLOOP" is 1, a check is made in Block 1003 whether the demand pressure is less than 2% of maximum. If the demand is less than this small nominal value and "OLOOP" is at 1, control continues to the above described brake release at Block 992. If demand is greater than 2% of maximum, the demand is compared with the approximate system pressure, derived by Block 986 or Block 1000, and control passed to Blocks 1005 or 1007 and on to Blocks 1006 and 1008, respectively. Open loop brake application or release is able to continue through Blocks 1006 or 1008 respectively depending upon the result of the decision at Block 1004. The flag "OLOOP" remains set at 1 indicating that the process of resetting the pressure to the accurate reference value has not been completed. This procedure is automatically initiated when the demanded pressure falls below the 2% level, detected by Block 1003.

If the check of Block 1002 shows that the program-flag "OLOOP" does not have value 1, it must have the value 2. Block 1009 compares the demanded pressure with the value 2% of maximum and if the demand is greater than this value a check is made by Block 1010 whether the pressure demand is greater or equal to the system pressure. If this is the case, control goes through Block 1011 to open loop brake application and the program-flag "OLOOP" is retained at value 2.

If the checks of Blocks 1009 or 1010 have a negative result, a brake release is commanded through Block 1012, using open loop release and the program-flag "OLOOP" is again retained at value 2.

To summarize, the control function of FIG. 9C prepares the system for open loop control by establishing a defined system pressure from which the pressure can be controlled by means of the data stored in the look-up table. The outputs of FIG. 9C are Blocks 1006, 1008, 1011 and 1012, representing commands for open loop brake control which are described in more detail in the following.

During open loop control a routine is performed, in which the system pressure is not a measured value but a value read from a table of data stored in RAM (or under certain circumstances ROM) providing information on the required operation time for the valves. In order to achieve the best possible approximation of the above described control operations, open loop control is used only under jerk limited pressure changes.

During open loop control, a brake release to provide wheel slip protection is also possible, in which the outlet valves V3 and V4 are energized and thus opened. In this instance it must be taken into consideration that the reference pressure may be lost since the table, which is updated during normal operation, does not contain data for operations of this type. Following a wheel slip protection release, therefore a new reference must be established. This is carried out by repeating the appropriate sections of the routine shown by FIG. 9c. Using this reference pressure, operation can continue using open loop control.

The following is a description of the individual processes of open loop control, in connection with FIGS. 9D and 9E.

FIG. 9D (FIG. 9D/1 and 9D/2) shows the routine for brake application using open loop control, see Block 815 of FIG. 8, and Blocks 1006 and 1011 of FIG. 9C. Upon instruction by Block 815, control goes to Block 1013, by which valves 3 and 4 are de-energized. This closes the return line 13, ensuring that the pressure can be increased. Subsequently, Block 1014 checks whether the pressure demand is greater than the pressure $P_{inshot}$. If this is not the case, Block 1015 causes the valves 1 and 2 to be de-energized, to quickly increase the pressure. Then, a check is made in Block 1016 whether the time delay is greater or equal to $t_d$, which is read from table 915. When this condition is fulfilled, valves 1 and 2 are re-energized by Block 1017, closing the inlet valves and allowing the pressure to stabilize. In Block 1018 pressure $P_{new}$ read from the table is considered to be the system pressure, and control returns to the starting position through Block 1019.

If the check at Block 1016, however, has a negative result, Block 1020 retains the old value as the system pressure, and control returns to the starting position through Block 1021.

If the check at Block 1014 reveals that the pressure demand is greater than the pressure $P_{inshot}$, valve 2 is energized by Block 1022 and, through Block 1023 the new pressure $P_{new}$ is read from the table 915, resulting from the time increment $\Delta t$. In Block 1024 a check is made whether system pressure, read from table 915, is greater than the pressure demand $P_{dem}$, plus a tolerance. If this is the case, control returns to the starting position, energizing valve 1 in Block 1025. If this is not the case, a check is made in Block 1026 whether the system pressure is greater than the demanded pressure $P_{dem}$, minus the tolerance. If this is the case, valve 1 is energized by Block 1027, i.e. the inlet valves are closed, control goes through Block 1028 to Block 1029 in which the pressure, established in the meantime, is set as the new pressure $P_{new}$: control then returns through Block 1030 to the starting position.

If the check of Block 1026 has a negative result, valve 1 is de-energized and therefore opened by Block 1031. Subsequently, a check is made in Block 1032, whether the valve open time is greater than the time increment $\Delta t$. If this is the case, valve 1 is energized in Block 1033 and control goes to Block 1028. If the check at Block 1032 is negative, Block 1034 retains the existing pressure as the system pressure and control goes to the starting position through Block 1035.

FIG. 9E shows the brake release under open loop control; see Block 814 of FIG. 8. After receipt of the corresponding command, valves 1 and 2 are energized in Block 1036, which closes the inlet valves. Any further pressure increase is therefore stopped. A check is then made in Block 1037, whether pressure demanded is lower than 2% of maximum. If this is the case, a check is made in Block 1038, whether the system pressure is less than 5%. If this is also the case, valves 3 and 4 are energized in Block 1039, which opens the outlet valves. In this step, the pressure/time characteristic of the decaying pressure is read from table 915 through Block 1040, whereupon control returns to the starting position through Block 1041. If checks of Blocks 1037 and 1038 are negative, control goes through Block 1042 to Block 1043, where valve 4 is de-energized. When valve 4 is de-energized, Block 1044 reads from the table 915 the new system pressure $P_{new}$ corresponding to the incremental a time elapsed, $\Delta t$. In block 1045 a check is made whether the system pressure Ps which has established itself is lower than the demanded pressure $P_{dem}$, minus a tolerance. If this is the case, control returns to the starting position through Block 1046A, after de-energizing valve 3 in Block 1046. If, however, this is not the case, Block 1047 checks whether the system pressure Ps is less than the demanded pressure $P_{dem}$ plus a tolerance. If this is the case, valve 3 is de-energized through Block 1048, and control goes to Block 1049.

If the check of Block 1047, however, has a negative result, valve 3 is energized through Block 1050, and a check is made in Block 1051, whether the delay is greater or equal to the time increment, $\Delta t$. When the valve open delay equals or exceeds the incremental time $\Delta t$, valve 3 is de-energized once again through Block 1052, whereupon control goes to Block 1049. If the valve open delay is less than the time increment $\Delta t$, control goes from Block 1051 to block 1053, where the old pressure, read from the table 915, is retained as the system pressure. Then, control returns to the starting position, through Block 1054.

From Block 1049, control goes to Block 1055 where the pressure most recently read from the table, $P_{new}$, is set as the system pressure, and control returns to the starting position through Block 1056.

The microprocessor program cycle time is considerably faster than the response time of the mechanical system it is controlling. In order to ensure that the microprocessor does not become locked in a waiting mode following a change in demand and pending the response of the mechanical system, it is important to ensure that the logic and program software is properly structured. In the logic diagrams described, shown by FIGS. 9A-9E, each branch of the logic terminates with a "GO TO START" instruction to allow control to return to Block 801 of FIG. 8 pending the response of the system. Depending upon the demand imposed on the mechanical system the logic may cycle several times through the same logic route whilst the mechanical system is responding. Further, the difference between the program cycle time and the mechanical response time will allow addition functions to be performed such as internal computational checks, servicing annunciation at output ports and the supervisory functions described below.

FIG. 10 (FIG. 10/1, 10/2 and 10/3) shows a general flow diagram of the supervisory functions necessary to determine the above described control system status and prevailing faults. The supervisory functions are executed consecutively depending upon the program cycle time available (as described above) and the status of the control functions (i.e. application/release/hold/- wheel slip release etc.).

Referring to FIG. 10/1, Block 300 indicates the start of the wheel slip protection time-out routine. The wheel slip protection system subroutine is not described in detail here. In general, this sytem uses information relating to vehicle wheel speed to detect potential wheel slip and, in order to prevent this situation, has the capability to release the brakes on one or two axles of the vehicle. In order to prevent faults in this subsystem causing persistent brake release, a monitoring routine headed by Block 300, is included in the brake control logic. In general this routine checks that wheelslip protection is demanding a brake release in Block 301 and, if that is the case, allows a short period of time (approximately 5 seconds) for the slip to be controlled and the brakes to be reapplied. If a wheelslip brake release is demanded for longer than this interval, the wheelslip protection system is isolated and the flag FAULT set to 1, by Block 805.

A second supervisory function occurs during brake release (Block 305; FIG. 10/1 see also FIG. 11A). This routine checks for a faulty pressure transducer at Block 306 and if so sets fault 3 at Block 805. The routine further checks on the integrity of the pressure switch, at Block 307. If this is defective fault 2 is indicated at Block 805. Finally, if there is no alternative fault, the routine is able to identify faulty brake pressure and therefore erroneous braking, at Block 308. If none of these potential fault conditions prevail, fault 0 is indicated at Block 805. If the brakes are found to be erroneously applied, the cut out valve is energized by Block 309 and fault 4 is indicated by Block 805.

A similar supervisory function is carried out during the brake application, indicated by Block 310 (see also FIG. 11B and C). This routine checks at Block 311 whether the system responds correctly during brake application. Provided this is the case fault 0 is registered by Block 805. If not, control proceeds to Block 312. An alternative check occurs in Block 313, whether, during a stable pressure demand, any of the control valves are required to open. If this is not the case, Block 805 will again give fault 0. If, however, in spite of demand for stable pressure, one or several control valves are required to open to maintain this pressure, control again proceeds to Block 312. Block 313 checks the pressure transducer integrity and indicates the appropriate fault status, fault 3, at Block 805. If the pressure transducer is operating correctly, a check on the current to the brake control valve solenoids is made by block 314. If a fault is identified here control goes to Block 315 where the cutout valve is energized and to Block 805 where fault 4 is reported. If the current to the solenoid valves has the correct value, a faulty control valve is assumed and a flush routine invoked by Block 316. Subsequently, a check is made by Block 317 whether the system is now operating correctly, i.e. after the flush routine. If this is the case, fault 2 is indicated in Block 805. If the system should still be faulty after the flush routine, the cutout valve will again be energized by Block 318 and fault 4 be indicated in Block 805, thus isolating the brake system.

An additional supervisory function which can be performed independently of brake demand, is the monitoring of the brake control valve solenoid current by Block 316A (in a similar way to that in Block 314). To summarize, Block 317A evaluates the current flowing to the four solenoids of the Brake Control Valve to ensure that application and release valves are not open simultaneously and that continuity is still maintained through the solenoid coil. Provided the system is in order, fault 0 is indicated by Block 805. If, however, a fault occurs, the cutout valve can be energized by Block 318A and fault 4 indicated.

Figure 11C:
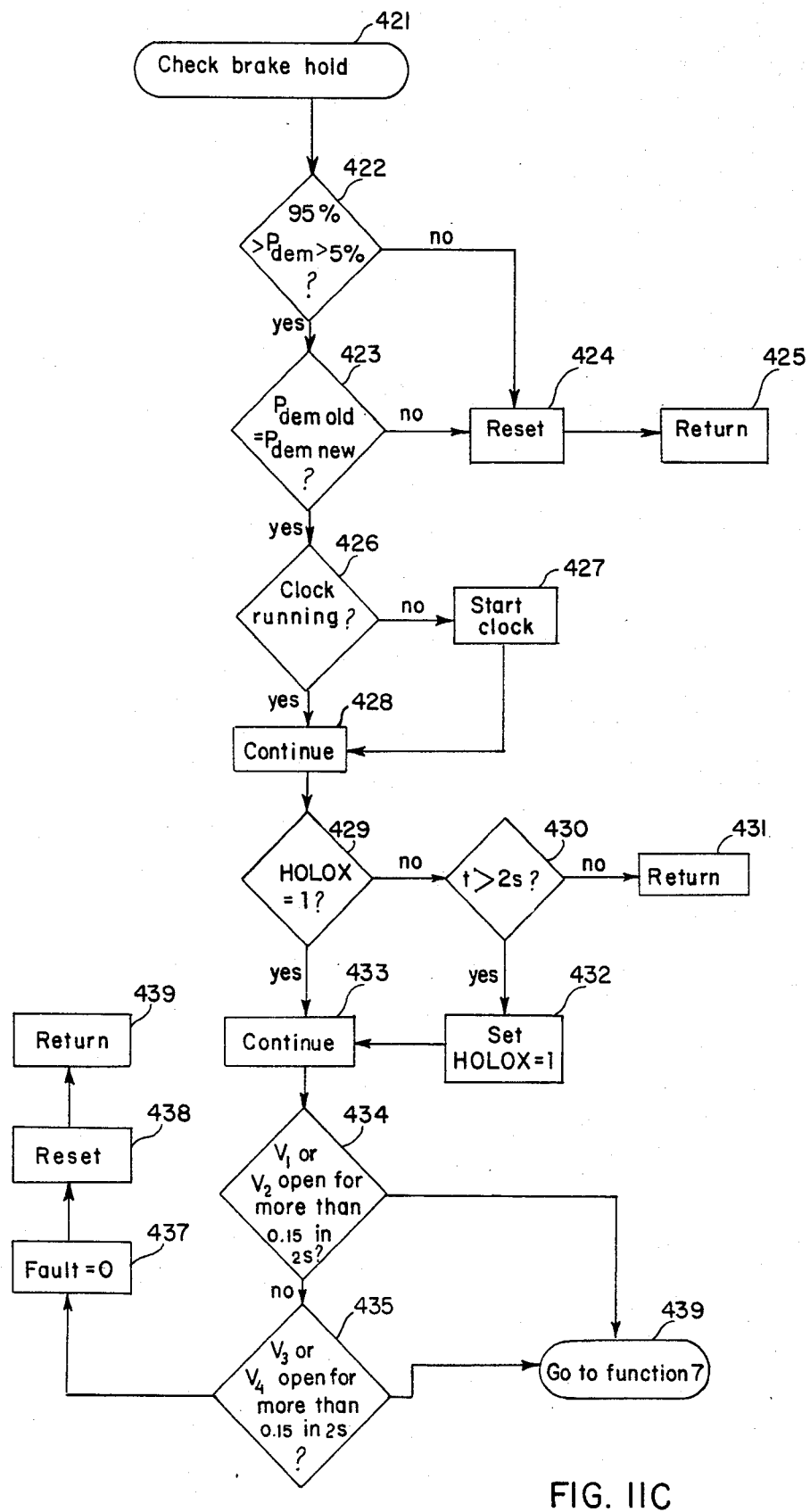
FIG. 11C shows checking in the presence of constant pressure demand.
Figure 11D:
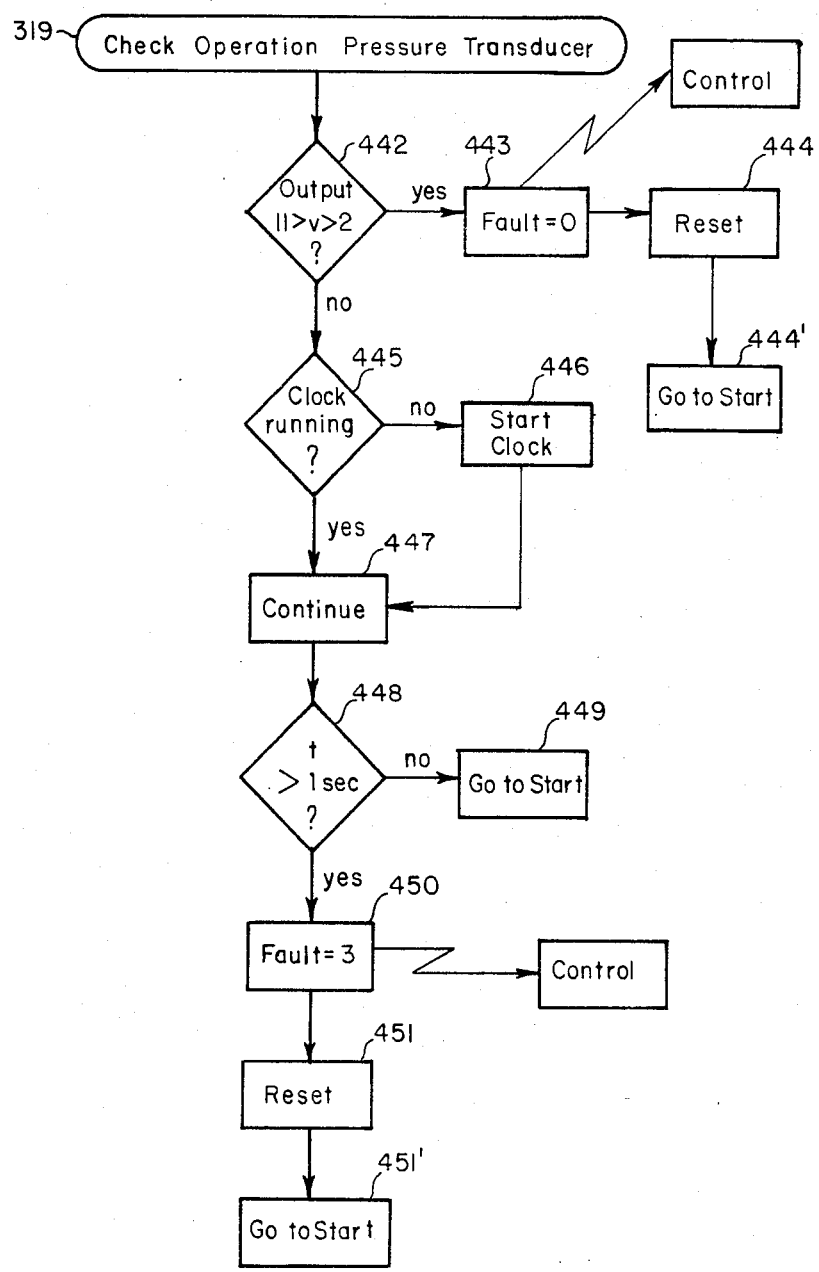
FIG. 11D shows checking of pressure transducer.

An additional supervisory function which can be performed independently of brake demand, is a check on the integrity of the pressure transducer, headed by Block 319 (see also FIG. 11D). Block 320 checks that the output of the pressure transducer is within defined limits. If this is not the case, the pressure transducer can be assumed to be defective and fault 3 is indicated. If, however, the output of transducer is within the defined limits, Block 321 allows a check on the transducer output at zero pressure (see FIG. 11E). Block 322 summarizes several evaluations and decisions to establish that the transducer is operating correctly and that the system pressure is at the minimum value. If a transducer fault is detected, fault 3 is indicated. If the system is operating correctly, the output of the transducer at zero pressure is evaluated and, in Block 323, reset if necessary. Block 805 indicates a fault 0.

An additional routine is that of Block 325, where, should fault 3 have occurred, a check on the integrity of open loop control is performed (see FIG. 11F).

To summarize, Block 326 checks that demand and system response correlate and if so, fault 3 remains reported. If the demand and response do not agree, fault 4 is indicated.

In FIG. 11, the individual supervisory routines indicated in FIG. 10 are shown in greater detail. These supervisory routines are carried out during specific system conditions, thus the supervisory function shown by FIG. 11A is performed during brake release. Brake release is identified by one or both of valves V3 or V4 being energized. The basic philosophy of this routine is as follows: during periods in which either valve V3 or V4 is energized, the system pressure should fall. This routine is inhibited during the conditions when demand pressure is less than 5% of maximum, to prevent faulty annunciation when system pressure has stabilized at its minimum value. During the first part of this routine, therefore, the decrease in pressure in monitored, and the system pressure at the pressure switch change-point is compared to the pressure switch threshold value. By comparing the current pressure gradient with a previous pressure gradient at, or near, the pressure switch change-point it is possible to determine a defective pressure transducer, a defective pressure switch or a defective brake control valve. If a faulty brake control valve is detected and the other truck system of the vehicle is not isolated, the cutout valve of the respective checked system can be energized, in order to isolate the system. Depending upon the type of vehicle operation, it will be necessary to ensure that at no time can the cutout valves of both systems be energized simultaneously, since, under these circumstances no brake function would be possible.

FIG. 11A (FIGS. 11A/1, 11A/2 and 11A/3) show the monitoring of a brake release indicated by Block 305 in FIG. 10. First, in Block 330 a check is made whether valve 3 is energized. If this is not the case, a check is made in Block 331 whether valve 4 is energized. If either of these conditions do not apply the clock is reset by Block 332 and control returns to its starting position through Block 333. If, however, one of the valves 3 or 4 is energized, control continues through Block 334 to Block 335, where there is a check to ensure that the pressure demand ($P_{dem}$) is greater than 5% of maximum. If this is not the case, the clock is reset again through Block 336, and control returns to the starting position through Block 337. If, however, the pressure demand is greater than 5%, a check is made in Block 338, whether the brake release clock is running. If this is not the case, the clock is started through Block 339, a value $t_1$ being set as the initial time and $P_1$ as the corresponding system pressure. In addition, the program-flag "PRESS" is set at 1 if the system pressure is greater than the switching point of the pressure switch, plus a tolerance. In other words, the status of the pressure switch is checked. If, however, the system pressure is below the pressure switch threshold, i.e. if the pressure switch is "low" the program-flag "PRESS" is set to "0". Control continues to Block 340, which also can be reached from Block 338, if the clock has already been started. From Block 340 control moves to Block 341 where a check is made on the elapsed time of this valve condition. The current time t is compared to $t_1$ plus a preset time increment, of, for example, 0.1 seconds. If this time has not elapsed, control returns through Block 342 to the starting position. If, however, this delay has occurred, the variable $P_2$ is given the value of the system pressure $P_s$ in Block 343, for this new point in time. Then, in Block 344, a check is made whether pressure $P_2$ is less than pressure $P_1$, minus a tolerance. If this is the case, the pressure has dropped during the past time interval, and in Block 345 the individual parameters are reset as shown in the figure. Subsequently, in Block 346, a check is made whether the newly established pressure $P_1$ is greater than the pressure switch change-point, e.g. 22 bar, minus a tolerance. Therefore, a check is made whether the new pressure $P_1$ is greater than the pressure at which the pressure switch changes state. If this is the case, control returns through Block 347 to the starting position. If, however, the pressure $P_1$ is less than the predefined value, a check is made by Block 348 on the state of the pressure switch. If the pressure switch has changed state to a low pressure condition, fault 0 is indicated by Block 349, the clock is reset by Block 350 and control returns to the starting position through Block 351. If the check of the pressure switch in Block 348 indicates however, that pressure is higher than the change-point, a previously defined value X is referred to as the old pressure gradient. Correspondingly, in Block 353, the initially defined value Y is set as the new pressure gradient. A check is then made in Block 354 whether value X is greater than value Y plus a tolerance. If this is the case, the gain of the pressure transducer has changed, as indicated by the excessive difference between the values X and Y, and control continues through Block 355, to identify a defective pressure transducer and, in Block 357, raise fault 3. By way of Block 358, the clock is reset and control returns, through Block 359, to the starting position. If, however, it is determined in Block 354, that the value X is less than value Y plus tolerance, an alternative check is made in Block 360 whether value Y is greater than value X, plus a tolerance. If this is the case, control continues to Block 355 as before. If the conditions of Blocks 354 and 360 are not fulfilled, a defective pressure switch is implied at Block 361, whereupon in Block 362, the program-flag "SWT" is set at "1". By way of Block 363, fault "2" is indicated, and control continues to Block 350.

If the check of the pressure in Block 344 reveals that the pressure $P_2$ is not lower than pressure $P_1$, minus a tolerance, i.e. the pressure has not fallen when the valves V3 or V4 were energized a check on the status of flag SWT is made in Block 364. If this flag is not 1 (i.e. is zero, the pressure switch can be assumed to be operational) Block 365 checks whether the demanded pressure $P_{dem}$ is less than the change-point of the pressure switch, minus a tolerance. Until this condition is met, control returns to the starting position through Block 366.

If the pressure is less than the switch change-point, a check is made by Block 367, whether the program-flag "PRESS" is at value 1. If this is not the case, a check is made through Block 368 whether the pressure switch is in its high pressure position. If this is not the case, control returns to its starting position through Block 369. If the pressure switch indicates pressure in excess of it change-point however, control continues to Block 370.

If a check by Block 367 reveals that the program-flag "PRESS" is at 1, a check is again made at Block 370, to determine the state of the pressure switch. If this check shows that the pressure switch in in its low pressure condition, the pressure transducer can be assumed to be defective, since the transducer output has remained fixed whilst the release valves were open and the pressure switch output has changed from high to low. Fault condition 3 is indicated by Block 373, the clock is reset by Block 374 and control returns through Block 375 to its starting position.

Returning to Block 370, it can be determined at Block 376 that the brake pressure has not been released. Control can also reach Block 376 from Block 364, if a check there reveals that the program-flat SWT is at 1 and the pressure transducer signal remains fixed. Following Block 376, system fault 4 is indicated through Block 377, the clock is reset by Block 378 and control returns to the starting position through Block 379.

In a similar manner to that described for brake release, a supervisory function is carried out during brake application. The philosophy assumes that the system pressure should increase during periods in which one, or both, of the inlet valves V1, V2, are de-energized. In a similar way to that described for the brake release supervisor routine, that logic is inhibited when the demand is within 5% of maximum, when pressure is limited by the action of a mechanical valve. The pressure rise is therefore monitored by the brake application supervisor routine and the system pressure at the pressure switch change-point is checked against the pressure switch setting. If necessary, the pressure gradients are again compared in the same manner as that described for the brake release. If a supervisory check of this kind reveals a faulty brake control valve, the control continues to function 7 (FIG. 11G).

FIG. 11B shows in greater detail, the logic associated with monitoring brake applications as outlined by Blocks 310/311, of FIG. 10. Block 570 checks whether valve V1 is energized. If it is, a check is made in Block 571 whether valve V2 is also energized. If both valves are energized (i.e. closed) the clock is reset by Block 572 and control returns through Block 573 to the starting position. If either or both valves V1 and V2 are de-energized, control continues through Block 547 to Block 575, where the pressure demand is compared with 95% of maximum. If demand pressure exceeds 95% of maximum it can be assumed that pressure may be limited by the pressure limiting valve, integral in the brake control valve. The clock is therefore reset through Block 576 and control returns to the starting position through Block 577.

If a check by Block 575 reveals that the demanded pressure is less than 95%, the monitoring routine continues. A first check is made by Block 578 to determine whether the brake apply clock is running. If it is not, it is started by Block 579, the initial time t being set to $t_1$ and the corresponding system pressure $P_s$ being set up to $P_1$. If the system pressure $P_s$ is greater than the pressure switch change-point (e.g. 22 bar) plus a tolerance ("tol"), the program-flag "PRESA" is set to value 1. If the system pressure $P_s$ is less than the pressure switch change-point value plus a tolerance, the program-flag "PRESA" is set to value 0. control continues through Block 580 to decision Block 581, which can also be reached directly from Block 578, when the clock is running. A check is made in Block 581 whether the time elapsed is greater than the value $t_1$ plus a predetermined time increment of, say, 0.1 seconds. Until this is the case, control returns through Block 582 to the starting position. When this delay has been attained, the system pressure is set to the value $P_2$. In Block 584, the pressure $P_2$ is compared with the above mentioned pressure $P_1$, plus a tolerance. If $P_2$ is greater than $P_1$ plus tolerance, the pressure $P_1$ is set to the value $P_2$ in Block 589, and the existing time is set to the value $t_1$. Subsequently, a check is made by Block 590 whether the pressure $P_1$ is greater than the pressure switch change-point, plus tolerance. Until this is the case, control returns to the starting position through Block 591.

If the check at Block 590 shows that pressure $P_1$ is greater than the pressure switch change-point, a check is made in Block 592, whether the pressure has the corresponding state. If this is the case, fault 0 is indicated by Block 593, the clock is reset by Block 594 and control returns to the starting position through Block 595.

If the check of Block 592 shows that the system pressure does not agree with the pressure switch state, Block 596 computes the old pressure gradient value $X_A$, and Block 597, computes the new pressure gradient value $Y_A$. Checks are then made by Block 598 and 599 whether value $X_A$ is greater than value $Y_A$ plus a tolernace, or $Y_A$ is greater than $X_A$, plus a tolerance. If either of these two conditions are met, the gain of the transducer has changed since the last test and control continues through Block 603 to indicate a faulty transducer at Blocks 604/605. The clock is reset and control returns through Block 607. If neither of the conditions at Blocks 598, 599 are achieved it can be assumed that the pressure switch is defective, Block 600. Subsequently, in Block 601 the program-flag SWT is set to the value 1; Block 602, indicates fault 2 and control returns to the starting position through Blocks 594 and 595.

If the check by Block 584, however, shows that the pressure $P_2$ is not greater than $P_1$ plus tolerance i.e. system pressure has not increased when valve V1 and V2 are de-energized, Block 585 checks whether the program-flag SWT is set to value 1. If this is the case, fault 4 is generated by Block 586 indicating that the control valve or the transducer, in addition to the pressure switch are defective. Then, through Block 587, the clock is reset and control returns to the starting position through Block 588.

If the check of Block 585 reveals that the program-flag SWT is not at value 1, i.e. the pressure switch is operating normally, control continues to Block 608, where a check is made whether the pressure demand $P_{dem}$ is greater than the pressure switch change-point, plus tolerance. If this is not the case, control returns through Block 609 to the starting position; if, however, the pressure is greater than the pressure switch change-point a check is made by Block 610 whether the program-flag PRESA (see Block 579) is at value 0. If this is not the case, Block 611 checks whether the pressure switch is in the position corresponding to an indication of a pressure above its change-point. If these conditions are met, control returns to the starting position through Block 612. If this is not the case, the system pressure has reduced and control continues to Block 618.

If it is determined by Block 610 that the program-flag PRESA is at value 0, Block 613 checks the position of the pressure switch in the same manner as in Block 611. If this check reveals that the pressure switch is in a position indicating a pressure which is above its change-point, the system pressure has changed whilst the pressure transducer output remained fixed. The transducer can therefore be assumed to be defective, and as a result, fault 3 is indicated by Block 615 and control, through Block 616, resets the clock and returns to the starting position through Block 617. If the checks by Blocks 611 and 613 however, both show a negative result, system pressure is not varying in response to change in demand and control goes through Block 618 to Block 619 where it is determined that the brakes are not controllable. Control continues through Block 620 to invoke function No. 7 (FIG. 11G).

FIG. 11C shows supervisory function No. 3, performed during a brake holding phase.

Here a check is made in Block 422, whether the demanded pressure $P_{dem}$ is between 95% and 5% of maximum pressure. If this is not the case, i.e. if the demanded pressure is very low or very high, the check routine is discontinued and the system is reset through Block 424, and, through Block 425, control returns to the startng position.

If, however, the demanded pressure is between these limits a check is made in Block 423, whether the demanded pressure remains constant. If this is not the case, i.e. the new demanded pressure is not equal to the old demanded pressure, control returns through Blocks 424 and 425 to starting position. If there is no change in the pressure demand, a check is made through Block 426, whether the brake hold clock is running, and if necessary this is started in Block 427. Block 429 checks the status of the program-flag "HOLDX". If this is zero Block 430 checks whether, since the start of the clock, preset time of, for example 2 seconds, has elapsed. Until this is the case control returns through Block 431 to the starting position. If this delay time is achieved the program-flag "HOLDX" is set to the value 1 and control continues through Block 433 to the decision block 434. Here a check is made, whether the inlet valves V1 or V2 had been open for a total time of 0.1 seconds within a time interval of 2 seconds. If this is the case the system has a pressure reducing "leak" and control goes through Block 436 to check function No. 7 (FIG. 11G). If the check of Block 434 is negative, a similar check is made for the outlet valves V3 or V4, to determine whether they had been open for a total time of 0.1 seconds, within a time interval of 2 seconds. If this is the case, the system has a pressure increasing "leak" and control continues through Block 436 to the supervisory functions. If neither of these conditions are met, fault "0" is established and control is reset through Block 438 and, through Block 439, control returns to the starting position.

To summarize, supervisory function No. 3 provides a check of the hydraulic system, to establish that its leakage is within acceptable limits. The system is able to leak, pressure reducing or increasing. Leakage across the V3, V4 valve seats will cause pressure to fall and similarly, leakage across the V1, V2 valve seats will cause pressure to increase. The check is achieved by monitoring the valve solenoid currents to ensure that during periods of stable pressure demand, the valves should not be opened for excessive periods of time. With this function, the opening periods of the valves are measured following an initial stabilization period, and if these opening periods are greater than present values, it can be determined that the system is leaking.

A more precise location of this leak will be performed with supervisory check function No. 7.

Supervisory function No. 4 is discussed in connection with FIG. 11D, where a functional check of the pressure transducer is made. To summarize, the output voltage of the pressure transducer is monitored, which, in a functional pressure transducer should always be between two limits, for example, between 2 and 11 volts. If this is not the case, it can be assumed that the transducer is defective, the fault indicator is set to 3 and open loop control is initiated.

FIG. 11D, thus, shows this functional check of the transducer in greater detail (see block 319 in FIG. 10). Beginning with Block 319, a check is made in Block 442, whether the output voltage of the pressure transducer is between the preset limits, e.g. between 11 and 2 volts. If this is the case, fault "0" is determined by Block 443, and control returns to the start position through reset Block 444 and return Block 444'. If a check by Block 442 shows that the output voltage of the transducer is outside of the preset limits Block 445 checks whether the software clock is running. If not, it is started through Block 446. If the clock is running, or if it has been started by Block 446, control goes through Block 447 to Block 448, in which a check is made whether more than 1 second has elapsed in this condition. If not, control returns through Block 449 to the starting position. If this delay time is exceeded however, Block 450 establishes fault 3, and the system goes to open loop control resetting the corresponding variables through Block 451.

As a result of the use of the delay-timer, Block 448, it is possible for the transducer output to exceed the predefined limits under transient, but normal, conditions but also to enable a fault to be quickly detected should one occur.

FIG. 11E shows supervisory function No. 5, the transducer zero check and adjust. With this supervisory routine the output signal of the transducer is corrected, in order to compensate for pressure independent errors such as temperature and time dependent drift. This routine is utilized only during non-jerk-limited brake release, for example immediately following a station stop. During this supervisory function the reduction in caliper pressure with time is monitored, together with the changing state of the caliper pressure switch. The routine includes inhibit logic to prevent faulty resetting which could occur following long periods of inoperation.

FIG. 11E shows the logic involved in the transducers zero check and adjust (see Block 321 of FIG. 10).

Block 500 checks whether valves 1, 2, 3 and 4 are energized, i.e. the brakes are being released in a non-jerk-limited mode. If not, control is reset through Blocks 501 and 502 and returned to the starting condition. If the above valves are energized Block 503 checks whether the program-flag STRTP has the value 0. If this is not the case, Block 504 checks the position of the pressure switch. If it is in a position indicating a pressure greater than its change-state pressure, the program-flag "PREST" is set at "1" (Block 505) and control reaches Point B (Block 507) through Block 506.

If the check by Block 504 reveals that the pressure switch indicates a pressure less than its change-point pressure, Block 508 checks whether the program-flag "PREST" is set to the value 1. If not, control returns through Block 509 to the starting position. If, however, flag "PREST" has the value 1, control goes through Block 507 to the decision Block 510. The aforementioned Point B of Block 506 also leads to Block 507, together with the positive result of the decision at Block 503. This series of decisions combined with those detailed subsequently associated with Blocks 535, 536, 537, 538 and 539 allows for a complete non-jerk-limited brake release by the system before attempting to reset the zero level of the pressure transducer.

From Block 507 control continues to Block 510 where a check is made, whether program-flag "JUMP" is at value 1. If so, control goes through Block 511 to Point A (Block 534). Until so set by the control system, flag Jump will not be at value 1 and Block 512 checks whether the first software clock is running. If not, this clock is started by Block 513 and a pressure value $P_1$ is assigned to the system pressure $P_s$, and the initial time is set to the value $t_1$. With the clock running, control goes through Block 514 and continues to decision Block 515, where the elapsed time since starting the clock had reached a preset period of time of, for example, 0.1 seconds. Until this is the case, control returns to the starting position through Block 516. When the delay had reached the preset period of time, control goes from Block 515 to Block 517, where the value $P_2$ is assigned to the system pressure $P_s$. A comparison is then made by Block 518 between pressure $P_2$ and $P_1$, minus a tolerance. If $P_2$ is not less than $P_1$ (minus tolerance) control is reset by Block 519, and through Block 520, returns to the starting position. If the check of Block 518 is positive i.e. the system pressure has reduced, Block 512 checks whether pressure $P_2$ is less than the change-point of the pressure switch minus a tolerance. If this is not the case, Block 522 sets $P_1$ equal to $P_2$ and $t_1$ equal to the new clock 1 time. Then, control returns through Block 523 to the starting position.

If the check by of Block 521, however, has a positive result, Block 524 checks the state of the pressure switch. If this check reveals that the pressure switch indicates a pressure less than its change-point pressure, Block 525 checks whether the pressure $P_2$ is less than 5% of maximum. When the pressure is less than 5% of maximum, Block 526 checks whether the second software clock is running, and if necessary, this is started at Block 527. Simultaneously, the first clock is stopped by Block 527 and the program-flag "JUMP" is set to the value 1. With clock No. 2 running, control then goes through Block 528 to Point A (Block 534).

If, however, block 525 finds that the pressure $P_2$ is not less than 5% of maximum, Block 532 again sets $P_1$ equal to $P_2$ and $t_1$ equal to the new clock 1 time. Then, control returns to the starting position through Block 533. This continues until the decision by Block 525 has a positive result.

If the check by Block 524 reveals that the pressure switch is in a position indicating a pressure greater than change-point pressure, this implies that the pressure switch is defective, since the pressure has reduced but the switch has not registered this change. Block 529 therefore sets the program-flag "SWT" to the value 1. Control is then reset by Block 530 and returns to the starting position through Block 531.

Continuing from Point A (Block 534), a check is made by Block 535, whether the program-flag "STRTP" is at 0. If this is the case, software clock No. 3 is started by Block 536 and the program-flag STRTP is set to the value 1. Additionally, clocks No. 1 and No. 2 are reset by Block 537, and the program-flags PREST and JUMP are set to 0. Then, control returns to the starting position through Block 540.

If the check by Block 535 indicates that the program-flag STRTP does not have the value 0, a check is made by Block 538 whether the system has been inoperative for more than 1 hour. In this case, clocks No. 1 and No. 2 are reset by Block 539, and the program-flag PREST, JUMP and STRTP are set to the value 0.

Summarizing the events thus far, for the normal brake release which occurs without system faults valves 1,2,3,4 are energized and the pressure begins to fall. During the first release of this type, flag STRTP has the value zero and the falling pressure is monitored by Blocks 517, 518, 521, 524 and 525 to the re-evaluation of this flag by Block 535. Since STRTP has the value zero it is reset to the value 1 and the flag PREST is assigned the value zero. Thus, until the pressure switch state shows high pressure, control is continually returned to the start by Blocks 504, 508 and 509. When the state of the pressure switch changes i.e. the brakes are re-applied, the flag PREST is set to the value 1 and control is returned to the main flow at point B, Block 507. With the flag STRTP having the value 1, the one hour timer, clock 3, is continually restarted and program flow continues to the transducer check. If the clock time exceeds one hour, control must not reset the transducer output and the appropriate flags PREST and STRTP are reset by Block 539 to ensure that the above described pre-release occurs again before any further action is taken.

If the time-out check by Block 538 has a negative result, clock No. 3 is again restarted by Block 541, and a check is made by Block 532, whether the time elasped $t_1$, since the starting of the clock No. 2 is greater than 20 seconds. Until this is the case, control returns to the starting position through Block 543.

If the check by Block 542 shows that more than 20 seconds have elapsed since the start of clock No. 2 the following is calculated by Block 544:

$$Z_1 = (V-V_1)T_s$$

where $Z_1$ represents the pressure indicated by the transducer, V is the output voltage of the transducer, $V_1$ is the offset voltage of the transducer at the system residual pressure and $T_s$ is the sensitivity of the pressure transducer in bar/volt.

In Blocks 545, 547, 548 and 549 a consecutive check is made of: whether $Z_1$ is less than 0.8 Z, greater than 1.2 Z, greater than $+0.5$, or, respectively, less than $-0.5$, where $Z_0$ is the previous transducer reading of the system residual pressure. If any of these conditions are met, control continues through Block 546 to Block 550, which determines that the transducer may be defective. Control is reset through Block 551 and returns through Block 552 to the starting position.

If checks of Blocks 545, 547, 548, and 549, each have a negative result however, the variable $V_o$, representing the offset voltage of the pressure transducer, is assigned the value $V_1$ and the offset pressure $Z_0$ is given the value $Z_1$, by Block 553. The system clocks and flags are reset through Block 554 and the following expression is used for future measurements by the transducer:

$$Z = (V-V_0)T_s$$

Control returns to the starting position through Block 556. By using the above equation, variations in the offset of the pressure transducer will be compensated.

Supervisory function No. 6, which is described in detail in connection with FIG. 11F, monitores the open loop mode of control. This supervisory function therefore operates only when the system is operating under open loop. To summarize, this routine checks that the state of the actuator pressure switch is in agreement with the expected condition of the system, read from the look-up table. If this is not the case, the initiation routine for open loop (control function No. 3 of FIG. 9C) is influenced by resetting of the program-flag "OLOOP" to 0.

FIG. 11F shows in detail, the check of open loop control (see Block 325 of FIG. 10).

First, a check is made by Block 552 that fault 3 has been raised. If this is not the case, control returns through Block 453 to the starting position. If this is the case, Block 454 checks whether the demanded pressure $P_{dem}$ is greater than the change-point of the pressure switch plus a tolerance. If demand is greater than the pressure switching point, the pressure switch condition is checked by Block 455. If the switch indicates a pressure greater than its change-point, control returns through Block 456A to the starting position, resetting all system clocks in Block 456. If, however, this is not the case, control continues to Block 457.

Similarly, if the check by Block 454 determines that the demanded pressure is less than or equal to the pressure switch setting, Block 458 checks whether demanded pressure also is less than the change-point of the pressure switch, minus a tolerance. If this condition is not met, fault 3 continues to be set by Block 459, and control returns to the starting position (Block 460). If the check by Block 458 has a positive result i.e. demand is less than the switch setting, Block 461 once more checks the condition of the pressure switch. If the pressure switch is in a position corresponding to a pressure less than its change-point, control returns to the starting position through Block 462A, resetting all clocks in Block 462. If, however, the pressure switch is in its alternative position, control continues to the aforementioned Block 457. This initial series of decisions compares the state of the pressure switch with the demand. If there is agreement, control is returned, however if there is a discrepancy the routine continues with the system evaluation. A third condition in the region of ambiguity resulting from the tolerance of the switch setting, also returns control to the start.

A check is made in Block 463 whether the program-flag OLOOP is set to the value 2. If it is, a check is made by Block 464 whether the first software clock is running, and, if necessary the clock is started by Block 465. Control with the clock running, continues through Block 466 to Block 467, where a check is made whether a preset time delay of, for example, 2 seconds, has elapsed. If this is the case, the program-flag OLOOP is set to the value 1, by Block 468. Clock 1 is reset by Block 469 and control returns through Block 470 to the starting position. If the time-out by Block 467 is not fulfilled, however, the remaining clocks (2,3,4) are reset by Block 471 and control returns through Block 470.

Thus, if open loop control has been able to reset from the minimum pressure datum and consequently raise the flag OLOOP status to 2, system response should follow demand very closely. Consequently a relatively short duration timer (2 seconds) is allowed for correlation between demand and the status of the pressure switch. The following describes similar logic for the condition where flag OLOOP is at condition 1. Under these circumstances the open loop control system has used the pressure switch change point as a temporary datum and consequently a longer period of time is allowed (12 seconds) before a degradation is performance is considered.

Continuing therefore with the condition where Block 463 determines that the program-flag OLOOP is not set at 2, Block 472 undertakes a further check. If OLOOP has the value 1, Block 473 checks whether the demanded pressure $P_{dem}$ is greater than 2% of maximum. If this is the case, all clocks are reset through Block 474 and control returns to the starting position through Block 475. If the demand is less than 2% of maximum Block 476 checks whether the second clock is running. If necessary this is started by Block 477 and control continues through Block 478 to Block 479. Block 479 allows a delay of 12 seconds and, of this is allowed to time out without the pressure switch condition agreeing with the demand, all clocks are reset by Block 480, and fault 4 is raised by Block 481. Control returns through Block 483. If the time-out Block 479 is not fulfilled, clocks 1,3 and 4 are reset by Block 482, and control returns to the starting position through Block 483.

If the check by Block 472 reveals that the program-flag OLOOP does not have value 1; its value must therefore be 0. The following checks therefore allow time for the open loop initiation routine to complete its cycle. A check is made by Block 484 whether the demanded pressure $P_{dem}$ is greater than 30% of maximum pressure. If this is the case, Block 485 check whether clock No. 4 is running. If it is not, it is started through Block 486. With clock No. 4 running, control continues through Block 487 to Block 487', where a check of the pressure switch is again made. If this is the case, all clocks are reset by Block 487 and control returns to the starting position. If, however, the pressure switch has not changed state, a check is made whether, since the starting of clock No. 4 more than 2 seconds have passed (Block 496). If this time-out occurs all clocks are reset, Block 498 indicates a fault 4 condition and control returns to the starting position. Until this delay is achieved clocks 1, 2, and 3 are reset by Block 499, and control returns to the starting position.

If OLOOP is zero and demand is less than 30% of maximum, as checked by decision Block 484, the open loop initiation routine shown by FIG. 9C should be attempting to set system pressure to a reference value. The following checks and timer therefore allow time for these conditions to be achieved before considering that the system is at fault.

If the condition of Block 484 is not met, i.e. if the demanded pressure is less than 30%, Block 487 checks whether clock No. 3 is running. If necessary this is started through Block 488, and with the clock running, control goes through Block 489 to Block 490, where a check is made on the elapsed time since the start of the clock. If more than 12 seconds have passed fault 4 is raised by Block 491, all clocks are reset by Block 492 and control returns to the starting position through Block 493.

Until this period of time has elapsed, clocks 1 and 2 are reset (Block 494) and control returns to the starting position through Block 495.

Supervisory check function No. 7 of FIG. 11G is able to check defects of the brake control valve in more detail. This supervisory function can be called up by supervisory function No. 2, the monitor routine for brake applications supervisory function No. 3, the monitor routine for brake holding. Provided that the other truck system is not isolated, by actuation of the cutout valve and that the brake control valve solenoid current is in order, the cutout valve is energized to allow this supervisory function to proceed. Pressure downstream of the brake control valve is raised, held stable and reduced by operation of the solenoids of the brake control valve. By evaluation of the response of the system to this input it is possible to detect faults upstream or downstream of the cutout valve for the respective truck of the vehicle. If the fault is downstream of the cut out valve, the cutout valve remains closed and system is isolated, since a hose may have failed and the whole system fluid would eventually escape; continued use of the system would therefore affect the other system of the car.

If the fault is upstream, it is assumed that the fault is within the brake control valve and an attempt is made to clear this fault by means of a flush routine. Here, valves V1 and V3, and valves V2 and V4 respectively, are opened in sequence, to allow fluid to flush across the valve seats. The routine of pressure increase, pressure hold and pressure reduction is then repeated and the system returns to its normal operative condition if the fault has been cleared. If the fault should remain, the faulty system remains isolated by the cutout valve and the problem is annunciated.

FIG. 11 (FIGS. 11G/1–11G/4) shows in greater detail the individual procedures of supervisory function No. 7 for checking the brake control valve. First, a check is made in check Block 201, whether the cut out valve of the other truck of the vehicle is energized. If it is, control returns through Block 202 to the starting position, since the brake control valve check must not be performed under this condition. If, however, the check is negative, Block 203 checks whether the current flowing through the solenoids of the brake control valve is normal. If not, control continues through Block 205 to Block 206, where the cutout valve is energized. Through Block 207, fault 4 is indicated, control is reset through Block 208 and returns to the starting position through Block 209.

If, however, the solenoid valve current is in order, control continues from Block 203 to Block 204, where a check is made whether the program-flag LEAK is at 0. If this is not the case, i.e. a system leak exists, control continues to the above mentioned Block 206.

If the program-flag LEAK is at 0, the cutout valve is energized by Block 210 to allow the brake control valve check to proceed, and Block 211 checks whether the routine software clock is running. With the clock running, control proceeds through Block 213 to Block 214, where a check is made, whether the program-flag SKIP has the value 1. If this is not the case, Block 215 checks whether since the start of the clock a preset time of, say 50 milliseconds has passed. Until this is the case, control returns to the starting position through Block 216. This allows time for the cutout valve to respond. When this time has elapsed, valves 1, 2, 3 and 4 are de-energized by Block 217, i.e. the inlet valves are opened and the outlet valves are closed. Thus the pressure is allowed to rise. A check is then made in Block 218, whether a total of more than 0.1 seconds has elapsed. Until this is the case, control returns through Block 219 to the starting position. When this delay has elapsed, valves 1, 2, 3 and 4 are energized, so that the pressure, increased by way of Block 217 and 218 is held stable. In order to allow time for the system to stabilize a further delay of 0.1 seconds is allowed to elapse by Block 211. Until this delay has timed-out, control returns through Block 222 to the starting position. When this is the case, i.e. there was sufficient time for the pressure to stabilize, a value $P_1$ is assigned to the system pressure, in Block 223. A check is then made in Blocks 224 and 227 whether pressure $P_1$ is greater than 5% of maximum or, respectively, less than 95% of maximum. If the pressure is less than 5% program-flag VFLT is set to 1 by Block 225, control continuing through Block 226 to Block 226'. In a similar manner, program-flag VFLT is set to valve 2 by Block 228, if the pressure $P_1$ is greater than 95% of maximum. Control again goes through Block 226 to Block 226'.

If the checks by Block 224, and 227 respectively, show that the pressure lies within the range of 5 to 95% of maximum, program-flag SKIP is set at 1 by Block 229. Control continues by Block 230 to Block 231 and from there to Block 232 (FIG. 11G/3). Here a further delay is allowed until the 1.1 seconds has elapsed since the start of the clock. Until this is the case, control returns through Block 234 to the starting position. When this time has elapsed, value $P_2$ is assigned to the system pressure $P_s$, through Block 235. Block 236 checks whether the above mentioned pressure $P_1$ is greater than the pressure $P_2$, plus a tolerance. If this is the case, the program-flag VFLT in Block 237 is set to 1, control continuing through Block 238. If the check by Block 236 is negative, a check is made by Block 239, whether $P_2$ is greater than $P_1$, plus a tolerance. If this is the case, program-flag VFLT is set at 2 (Block 240), and control continues to Block 238. If the check by Block 239 is also negative, control continues to Block 241.

Assuming control continues, through Block 226 or via Blocks 237 or 240, a check is made by Block 250 on the status of program-flag FLSH.

If, this has the value 0, i.e. not 1, a flushing routine is initiated through Block 254. This is performed by deenergizing valves 1 and 3 while valves 4 and 2 are energized, for 3 seconds. Then, valves 2 and 4 are de-energized and simultaneously valves 1 and 3 are energized, for 3 seconds. This causes flushing of all of the valves by allowing fluid from supply through valves 1 and 4 to return, followed by circulation through valves 2 and 3 to return. Following this flushing routine all four valves are energized by Block 255, i.e. the pressure is held stable. In Block 256 a time delay of 0.2 seconds is allowed for the system to stabilize and until this time has elapsed, control goes through Block 257 to the starting position. When the delay has elapsed, program-flag FLSH is set to value 1 by Block 258, program-flag SKIP is set to 0 the program-flag VFLT is also set to 0. The clock is reset by Block 259, and control returns through Block 260 to the starting position. As a result of the status of program-flag SKIP, the brake control valve check is repeated.

Program flag FLSH now has the valve 1. If the test conducted by Blocks 224, 227, 236 and 239 continues to show the system at fault, there is potentially a system leak between the brake control valve and the cutout valve. Control is therefore directed to Block 251 which continues to isolate the system and raise program flag VFLT to condition 4. If the test described above (Blocks 224–239) finds the system now performing satisfactorily, control passes to Block 247, by virtue of the status of FLSH at Block 241. The cutout valve is therefore de-energized and the system returned to operational status again. Control returns by Blocks 248 and 249.

If however the tests at Blocks 224–239 show the system to be performing satisfactorily with program flag FLSH not equal to 1 (i.e. before the flushing routine has been exercised), this implies that the system fault is beyond the cutout valve, a potential cause being a burst hose. Flag LEAK is therefore set to the valve 1, by Block 244 and control returns through Blocks 245, 246. The system therefore remains isolated. Under all circumstances the status of the flag VFLT remain at its assigned value in order to assist in subsequent system maintenance. This flag may be used to illuminate appropriate local warnings. It therefore can be readily seen that it was necessary to exercise the flushing routine i.e. the fluid is becoming contaminated, or that alternative system faults, such as a burst hose or an internal leak, exist.

The check of the brake control valve solenoid current, mentioned in connection with FIG. 10, monitors constantly that, with the exception of the flushing routine the inlet and the outlet valves are not open simultaneously. This routine, therefore, ensures that valves V3 or V4 are not energized when inlet valves V1 and V2 are deenergized. If this should happen, the cutout valve can be actuated provided that the system of the other truck of the vehicle is not already isolated by its cutout valve.

The supervisory function for the wheel slip protection system, as mentioned in connection with FIG. 10, ensures that pressure is not less than 40% of its nominal value for more than 5 seconds. If this is the case, fault 1 is indicated, the wheel slip protection system is isolated and the brake system returns to its normal operation.

As mentioned initially, additional checks can also be provided, such as, a cross checking respectively between systems, together with monitoring of the hydraulic pumps. As shown in connection with FIG. 3A, the supply pressure of the hydraulic pump is controlled by a pressure switch. If several hydraulic pumps are provided, one of these pumps may be given preference and a check can be made whether the supply pressure output is below a preset value, determined by a pressure switch. If this is the case, an alternative pump can be activated.

In conclusion, it should be pointed out that the system described can be applied not only to brake systems for vehicles, but also where pressure is to be controlled in a cylinder with great reliability and great accuracy. This pressure need not necessarily be controlled by a liquid, but also a gas, for example, air, can be used for that purpose.

Anyone skilled in the art will have no problem in achieving the function of this control system using the logic diagrams provided, with appropriate electronic components. The aforementioned microprocessor can be suitably programmed for this purpose.

We claim:

1. A brake system for a rail vehicle comprising:
   a plurality of brake actuators for braking said rail vehicle, said actuators applying a braking force in response to an applied pressure;
   means for applying a predetermined pressure to said brake actuators including a plurality of valve means responsive to a plurality of electrical actuating signals;
   pressure monitor sensors associated with said actuators, each of said pressure monitor sensors providing a signal indicative of an applied pressure in a respective actuator;
   control unit connected to receive said sensors' signals, an operator-initiated demand pressure command for said brake system, and a plurality of brake operation parameters, said control unit providing a first set of actuating signals to said plurality of valve means, during normal brake operations said control unit forming a closed system with said sensors and brake actuators, said control unit further including a memory, and means for writing representative values of actuator pressure and respective control valve means parameters in said memory as memory contents during normal closed loop brake operations, said control unit further including:
   fault detection means connected to said pressure sensors for determining the existence of a fault in said brake system;
   means for reading out said stored memory contents in response to a fault detection; and
   means for forming a second set of actuating signals from said read out memory contents in response to a subsequent operator-initiated demand pressure command and applying said second set of actuating signals to said plurality of valve means, whereby said plurality of valve means are actuated in accordance with said control valve means parameters stored in said memory during closed loop operation.

2. The brake system of claim 1, wherein after detecting said fault, said control unit provides an actuating signal to an associated valve means for establishing a reference pressure for said brake actuators, said control unit further providing after the lapse of a predetermined time successive pressure setting signals to the associated valve means corresponding to stored memory pressure settings.

3. The brake system of claim 2 further comprising a pressure switch connected to each of said brake actuators, said pressure switch providing a change in state when the pressure level of a respective brake actuator is equal to a predetermined pressure level stored in said memory.

4. The brake system of claims 2 or 3, wherein said reference brake actuator pressure provided after detecting said fault is the minimum pressure of said brake system.

5. The brake system of claim 3, wherein said actuating signal for the associated valve means establishes a pressure corresponding to said predetermined pressure level subsequent to detection of a fault condition.

6. The brake system of claim 3, wherein subsequent to a fault detection, an initial reference pressure is established on said actuator, said initial reference pressure being either the pressure level producing a change in state of said pressure switch in the case where a demand pressure exceeds a first level, or a pressure level producing full release of said brake actuator when said demand is less than said first level.

7. The brake system of claim 1, wherein said control unit evaluates said pressure monitor sensors signals after a predetermined lapse of time from closing of the associated valve means.

8. The brake system of claim 3, wherein said control unit monitors the change in a brake actuator pressure and a change in state of said pressure switch.

9. The brake system of claim 8 wherein said brake actuator pressure is monitored depending on the condition of said valve means.

10. The brake system of claim 1 wherein said control unit includes means for determining whether any one of said pressure monitor sensors has a signal within a predetermined amplitude level.

11. The brake system according to claim 1 wherein said control unit includes signal correction means for correcting said pressure monitor sensors output signals according to $(V-V_o) T_s$, where V represents the output signal amplitude of said sensors, $V_o$ represents the sensors signal amplitude at zero pressure, and $T_s$ represents the sensitivity of said pressure monitor sensors.

12. The brake system according to claim 3 wherein said control unit includes means for comparing the pressure sensed by the associated one of said sensors at an instant at which said pressure switch changes state, with said stored predetermined pressure level, said control unit providing a signal indicating a fault when the result of said comparison exceeds a given tolerance.

13. The brake system of claim 1, wherein said control unit includes means for sensing a plurality of faults in said brake system, and
means for inhibiting a respective valve means in response to sensing of one of said plurality of faults.

14. A brake system according to claim 13, wherein said means for inhibiting includes a cutout valve associated with each valve means, said cutout valves being operatively connected with each other through circuit means, said circuit means preventing the simultaneous actuation of connected cutout valves.

15. A brake system according to claim 1, wherein said control unit includes means for flushing said valve means in response to a fault detection.

16. A fluid operated brake system comprising:
a plurality of individually controlled fluid pressurized brakes each connected with a pressurizing means operable in response to an electrical actuating signal, said signal determining an appropriate pressure level for a respective fluid pressurized brake;
a plurality of sensors, each sensor providing a signal indicating the fluid pressure exerted by an associated pressurizing means;
a control unit connected to receive each sensor's signal, an operator-initiated pressure demand and a plurality of operating parameter signals, said control unit providing a plurality of actuating signals to said plurality of pressurizing means, whereby said control unit, said plurality of sensors and said plurality of pressurizing means form a closed loop control circuit;
a memory for storing pressure levels and corresponding pressurizing means settings obtained during said closed loop operation;
means for detecting a fault in said brake system;
means for opening said closed loop control circuit in response to a fault detection; and
means for reading out from said memory said stored pressure levels and corresponding pressurizing means settings during open loop operations of said brake system in response to a pressure demand, said control unit providing a pressure level based upon said stored closed loop pressurizing means settings to said plurality of pressurizing means, whereby the effects of said fault on brake performance is minimized by operating said plurality of pressurizing means in an open loop operation according to previously stored closed loop pressurizing means settings.

17. The braking system for the rail vehicle of claim 16, wherein said control unit includes a microcomputer said microcomputer programmed to store during a closed loop operation incremental pressure levels of each of said pressurizing means during operation of said pressurizing means in response to an externally initiated pressure demand; and further programmed to read out said incremental pressure level during open loop operation when said pressure demand is again initiated.

18. The braking system of claim 16, further including:
means for establishing an initial pressure for said pressurizing means when said brake system changes from closed loop to open loop operation.

19. A brake system for a vehicle comprising:
a plurality of brake actuators for engaging the brakes of said vehicle, said brake actuators applying a braking force to said brakes in response to an applied fluid pressure;
means for applying a pressure to said brake actuators including a plurality of valve means, each valve means connected to control the pressure to a pair of actuators, and responsive to a plurality of electrical signals for individually controlling the pressure to a pair of actuators;

a plurality of pressure sensitive transducers for measuring the fluid pressure applied to each pair of brake actuators;

a pressure switch associated with each of said valve means having a predetermined pressure threshold for a switching state;

a control unit connected to receive signals from said transducers, and pressure switches, and to receive a plurality of brake operating parameters including a demand pressure command, said control unit providing a first set of actuating electrical signals to said valve means to provide a closed loop brake system at a pressure setting indicated by said demand pressure, said control unit including:

a first memory, and means for writing representative values of fluid pressure and valve means settings for a plurality of demand pressure settings during closed loop operation of said brake system in said first memory, and, a second memory for storing said predetermined pressure switch threshold;

means for detecting a fault in said brake system from said transducer signals, said means connected to disable said closed loop operation;

means for detecting the state of said pressure switches when a fault is detected;

means for establishing an initial open loop fluid pressure on said brake actuators, said initial pressure being determined in response to a comparison of the state of said pressure switch and a stored predetermined pressure level, said initial open loop pressure being selected in a direction to change the state of said pressure switch;

means for reading out of said first memory valve means setting data for obtaining a pressure setting indicated by a subsequently received demand pressure command; and means for providing a second set of actuating electrical signals to said valve means in response to said read out valve means setting data whereby said valve means are first operated in an open loop mode with said predetermined pressure level, and then with fluid pressure determined in response to earlier stored closed loop data from said transducers selected in response to a pressure demand signal.

20. In a brake system for a rail vehicle, including a pair of pressure actuated calipers for generating a braking force, apparatus for controlling said calipers comprising:

a brake valve assembly connected to provide a hydraulic fluid to said pair of calipers including a first pair of digital solenoid valves for increasing pressure to said calipers, and a second pair of digital solenoid valves to decrease pressure to said pair of calipers;

a transducer connected to monitor the hydraulic pressure to said calipers;

a microcomputer controller connected to receive a signal from said transducer, and an operator-initiated demand pressure command and providing actuating signals to said valves, said microcomputer controller including programming steps for generating actuating signals for increasing said pressure applied to said caliper along a predetermined pressure gradient in response to said demand pressure command, including:

opening and closing both valves of said first pair for an inshot time stored in a memory of said microcomputer controller related to a stored target pressure, measuring the pressure of said system indicated by said transducer after said opening and closing of said first pair of valves, storing said indicated pressure and valve operation time in a memory; and opening and closing one of said first pair of valves to increase said hydraulic pressure in increments, each increment opening said valve for a time which produces a system pressure within a predetermined tolerance of said pressure gradient; each closure of said valve permitting time for said hydraulic pressure to stablize, whereby said hydraulic pressure increases in increments along said pressure gradient.

21. The brake system of claim 20, wherein said microcomputer controller includes the additional steps of:

storing in memory the valve opening times and the pressure which results from each of said opening and closing steps.

22. The brake system of claim 21 further comprising: means for detecting a fault in said transducer.

23. The brake system of claim 22 wherein said brake system microcomputer controller includes programming steps for:

reading out of said memory said stored valve opening times in response to an operator-initiated demand pressure command and a fault which has been detected; and opening and closing said one of said first pair of valves according to said read out valve opening times.

24. The brake system of claims 20 wherein the microcomputer controller further includes the steps of:

calculating a new inshot time from the previous inshot valve operation time, pressure measurement obtained and said stored target pressure; and opening and closing said first pair of valves said new inshot time during the beginning of a new demand pressure command.

25. In a brake system for a rail vehicle, wherein a plurality of hydraulic brake actuators in response to a fluid pressure establish a braking force, the improvement comprising:

a plurality of pressure sensors connected to said actuators to provide a signal indicating the actual pressure of each of said actuators;

a plurality of digital control valves which open and close in response to actuating signals, whereby a system pressure is established based upon the on-off times selected for said digital control valves;

a microcomputer connected to receive signals from said sensors and an operator initiated pressure demand signal and providing said actuating signals to said digital control valves, said microcomputer including programming steps for changing the system pressure along a jerk limited pressure time gradient comprising the steps of:

sequentially operating said valves to produce a pressure change in a direction of said pressure demand until said pressure demand is obtained, each operation of said valve including a valve closure each time a pressure reading from said sensor indicates said system pressure is within a predetermined upper tolerance of said pressure-time grdient, said valve remaining closed a sufficient time to permit said system pressure to stablize and until a lower limit of said pressure time gradient is reached;

storing in memory valve operating data relating to the on-off time of said valves and storing each new corresponding pressure level resulting from each valve operation; and updating said memory content with new data derived from said pressure sensors and valve on-off times during subsequent system pressure changes which occur during subsequent pressure demand, whereby said memory contains new operating data for said valves.

26. In a brake system for a rail vehicle including a pair of pressure actuated calipers for generating a braking force, apparatus for controlling said calipers comprising:

a brake valve assembly connected to provide a hydraulic fluid to said pair of calipers including:

a first pair of digital solenoid valves for increasing pressure to said calipers, and a second pair of digital solenoid valves to decrease pressure to said pair of calipers;

a transducer connected to monitor the hydraulic pressure to said calipers;

a microcomputer controller connected to receive a signal from said transducer, and an operator-initiated demand pressure command, said microcomputer including programming steps for generating actuating signals for said digital solenoid valves for increasing the system pressure to the calipers along a pressure gradient line, said steps comprising:

opening and closing at least one of said first pair of valves to increase said system pressure in increments, each increment opening one of said first pair of valves for a time which produces a system pressure corresponding to a point along said gradient, and thence closing said at least one valve to permit sufficient time for said system to stabilize, whereby a plurality of pressure change increments occur until said demand pressure is reached; and storing in memory valve operating times during each opening and closing of said at least one valve, and the pressure sensed during said valve closure time, whereby a new set of time increments which produce a pressure change along said pressure gradient are available for use with future demand pressure commands.

27. The brake system of claim 26, wherein during a subsequent pressure demand command, at least one valve operation time of said increments is selected by comparing a previously stored valve operation time of said at least one valve and its associated sensed pressure level with a desired pressure.

28. A brake system for a rail vehicle comprising:
a pair of hydraulic fluid operated calipers for generating a brake force for said rail vehicle;
a brake valve assembly comprising first and second pairs of digital valves for supplying a hydraulic fluid to said calipers, said valves operating in response to actuating signals to increase or decrease hydraulic fluid pressure to said calipers;
a pressure transducer for measuring the hydraulic pressure applied to said calipers;
a microcomputer controller connected to receive said pressure transducer output signal, and an operator-initiated demand pressure command for establishing a system hydraulic pressure, said microcomputer controller providing actuating signals to said pairs of valves in response to the programming steps of:

generating a pressure versus time gradient signal for establishing a change in said hydraulic pressure in a direction of a demand pressure command;

operating a pair of said digital valves during an inshot operation for an inshot time period stored in a memory of said microcomputer controller;

measuring the system pressure at the end of said inshot time from a signal from said pressure transducer;

storing said measured system pressure as an inshot pressure, and the operating time of said digital valves; and opening and closing at least one valve of said pairs in increments, each of said increments maintaining said valve open until a system pressure is established from said pressure transducer within a predetermined first limit of said pressure versus time gradient and then closing said valve until said pressure versus time gradient is within a second limit of said system pressure; whereby each of said increments changes said system pressure until said demand pressure command is reached.

29. The brake system of claim 28 wherein said microcomputer controller further includes the programming step of:

calculating a new inshot time from said stored inshot pressure and target pressure; and operating said one pair of digital valves during a subsequent inshot operation for said new inshot time in response to a subsequent demand pressure command, whereby subsequent pressure demand commands initiate an inshot operation based upon stored previous inshot pressure data.

30. The brake system of claim 28 wherein said microcomputer controller further includes the programming step of:

measuring said system presure at the end of said inshot time period;

calculating a new inshot time from said measured pressure and a desired pressure; and operating said one digital valve means during a subsequent inshot operation for said new inshot time in response to a subsequent demand pressure command, whereby subsequent pressure demand commands initiate an inshot operation based upon previous inshot pressure data.

31. A brake system for a rail vehicle comprising:
a pair of hydraulic fluid operated calipers for generating a brake force for said rail vehicle;
a brake valve assembly comprising first and second digitial valve means for supplying a hydraulic fluid to said calipers, said first and second valve means operating in response to actuating signals to increase or decrease hydraulic fluid pressure to said calipers;
a pressure transducer for measuring the hydraulic pressure applied to said calipers;
a microcomputer controller connected to receive said pressure transducer output signal, and an operator-initiated demand pressure command for establishing a system hydraulic pressure, said microcomputer controller programmed to provide actuating signals to said valve means for:

opening and closing one of said digital valve means during an inshot operation for an inshot time period stored in a memory of said microcomputer controller; and opening and closing said one digital valve means in increments for a time different from said inshot time, each of said increments producing a pressure change in the direction of said demand pressure command whereby each of said increments changes said system pressure until said demand pressure command is reached.

* * * * *

UNITED STATES PATENT AND TRADEMARK OFFICE
CERTIFICATE OF CORRECTION

PATENT NO. : 4,538,228

DATED : August 27, 1985

INVENTOR(S) : Nicholas J. Brearey et al.

It is certified that error appears in the above-identified patent and that said Letters Patent is hereby corrected as shown below:

On the title page, Item [75] should read

-- [75] Inventors: Nicholas J. Brearey, Gaithersburg, Md., and Rolf Baumgarth, Neufahrn, Fed. Rep. of Germany --.

Insert Item [30] to read

-- [30] Foreign Application Priority Data

Fed. Rep. of Germany [DE] 3205846 2/18/82 --.

Signed and Sealed this

Fourth Day of March 1986

[SEAL]

Attest:

DONALD J. QUIGG

Attesting Officer

Commissioner of Patents and Trademarks